(12) United States Patent
Tran

(10) Patent No.: US 12,197,178 B2
(45) Date of Patent: Jan. 14, 2025

(54) AIR TRANSPORTATION SYSTEMS AND METHODS

(71) Applicant: Bao Tran, Saratoga, CA (US)

(72) Inventor: Bao Tran, Saratoga, CA (US)

( * ) Notice: Subject to any disclaimer, the term of this patent is extended or adjusted under 35 U.S.C. 154(b) by 187 days.

(21) Appl. No.: 18/135,071

(22) Filed: Apr. 14, 2023

(65) Prior Publication Data

US 2023/0280704 A1 Sep. 7, 2023

Related U.S. Application Data

(63) Continuation of application No. 16/575,981, filed on Sep. 19, 2019, now Pat. No. 11,675,324.

(51) Int. Cl.

| | |
|---|---|
| *G06F 17/00* | (2019.01) |
| *B64U 10/13* | (2023.01) |
| *B64U 30/12* | (2023.01) |
| *B64U 30/20* | (2023.01) |
| *G05B 17/02* | (2006.01) |
| *G05D 1/00* | (2006.01) |
| *G06N 3/088* | (2023.01) |
| *G06T 17/05* | (2011.01) |
| *G06V 20/13* | (2022.01) |
| *G06V 40/20* | (2022.01) |
| *B64U 101/60* | (2023.01) |

(52) U.S. Cl.
CPC ............. *G05B 17/02* (2013.01); *B64U 10/13* (2023.01); *B64U 30/12* (2023.01); *B64U 30/20* (2023.01); *G05D 1/101* (2013.01); *G06N 3/088* (2013.01); *G06T 17/05* (2013.01); *G06V 20/13* (2022.01); *G06V 40/28* (2022.01); *B64U 2101/60* (2023.01)

(58) Field of Classification Search
CPC ........ G05B 17/02; G05D 1/101; G05D 1/106; G06N 3/088; G06N 3/044; G06N 3/045; G06N 3/047; G06N 3/08; G06T 17/05; G06V 20/13; G06V 40/28; B64U 10/13; B64U 50/13; B64U 2101/60; B64U 10/30; B64U 30/20; B64C 27/20; B64C 39/024; G06F 3/017; G08G 5/0034; G08G 5/0039; G08G 5/0069; G08G 5/0078; G08G 5/0082; G08G 5/0086; G08G 5/0091
USPC ........................................................ 701/1, 3
See application file for complete search history.

(56) References Cited

U.S. PATENT DOCUMENTS

| | | | | |
|---|---|---|---|---|
| 5,499,785 | A * | 3/1996 | Roberts | B64D 1/12 244/3 |
| 6,655,631 | B2 * | 12/2003 | Austen-Brown | B64D 25/00 244/12.4 |
| 9,051,055 | B2 * | 6/2015 | Schaeffer | B64C 27/57 |
| 10,457,390 | B2 * | 10/2019 | McCullough | B64C 39/02 |
| 10,501,193 | B2 * | 12/2019 | Oldroyd | B64D 31/00 |
| 10,807,733 | B2 * | 10/2020 | Leachman | B64D 37/06 |
| 10,815,008 | B2 * | 10/2020 | Ross | G06F 30/15 |
| 11,001,374 | B2 * | 5/2021 | Kawiecki | B64C 27/022 |
| 11,018,755 | B2 * | 5/2021 | Stoufflet | H01Q 1/286 |
| 11,104,439 | B2 * | 8/2021 | Fenny | B64U 30/12 |
| 11,273,911 | B2 * | 3/2022 | Brand | B64C 39/022 |
| 11,279,473 | B2 * | 3/2022 | Mombrinie | B64D 35/02 |

(Continued)

OTHER PUBLICATIONS

Excalibur (Year: 2011).*

*Primary Examiner* — Ronnie M Mancho
(74) *Attorney, Agent, or Firm* — PatentPC PowerPatent

(57) ABSTRACT

Systems and methods are disclosed for transporting people using air vehicles.

20 Claims, 20 Drawing Sheets

(56) References Cited

U.S. PATENT DOCUMENTS

| | | | | |
|---|---|---|---|---|
| 11,292,585 | B2* | 4/2022 | Mombrinie | B64D 35/02 |
| 11,459,099 | B2* | 10/2022 | McCullough | B64C 39/08 |
| 11,498,673 | B2* | 11/2022 | Hull | B64C 27/32 |
| 11,505,302 | B2* | 11/2022 | McCullough | B64C 27/605 |
| 11,505,314 | B2* | 11/2022 | Tao | B64D 27/24 |
| 11,541,987 | B2* | 1/2023 | Landry | B64U 30/40 |
| 11,753,146 | B1* | 9/2023 | Pinto | B64C 17/02 |
| | | | | 244/93 |
| 2018/0366090 | A1* | 12/2018 | Shatzki | G06F 3/011 |
| 2019/0031371 | A1* | 1/2019 | Ross | B64F 5/00 |
| 2019/0100313 | A1* | 4/2019 | Campbell | B64C 29/0033 |
| 2019/0367149 | A1* | 12/2019 | Leachman | F16B 37/14 |
| 2021/0024208 | A1* | 1/2021 | Tao | B64C 3/385 |

* cited by examiner

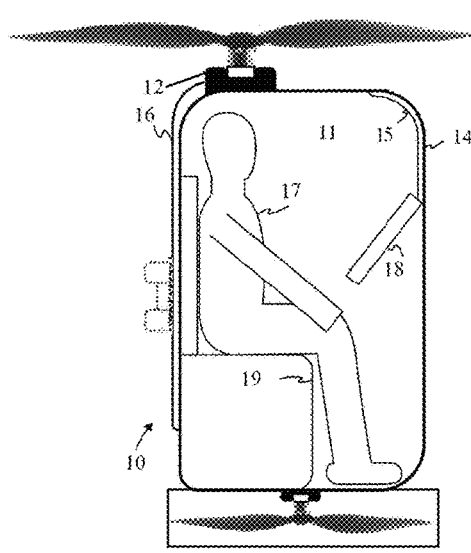

FIG. 1A

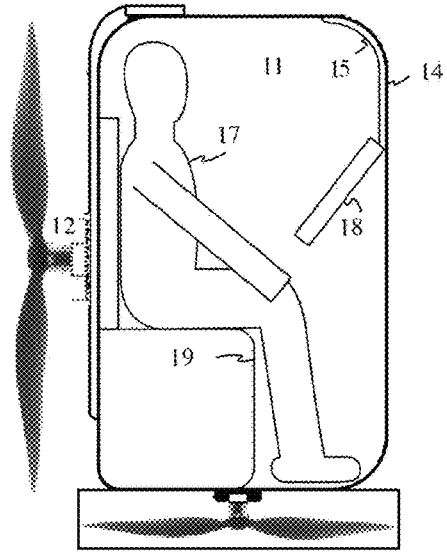

| |
|---|
| Upload a flight plan to the flight control system of the vehicle and get authorization (21) |
| Lift vehicle into the air in a vertical takeoff and landing mode (22) |
| Transition the vehicle from the vertical takeoff and landing mode to a forward flight mode (23) |
| Transport the vehicle to the desired destination location (24) |
| Transition vehicle from the forward flight mode to the vertical takeoff and landing mode (25) |
| Land vehicle at destination (26) |

FIG. 1H

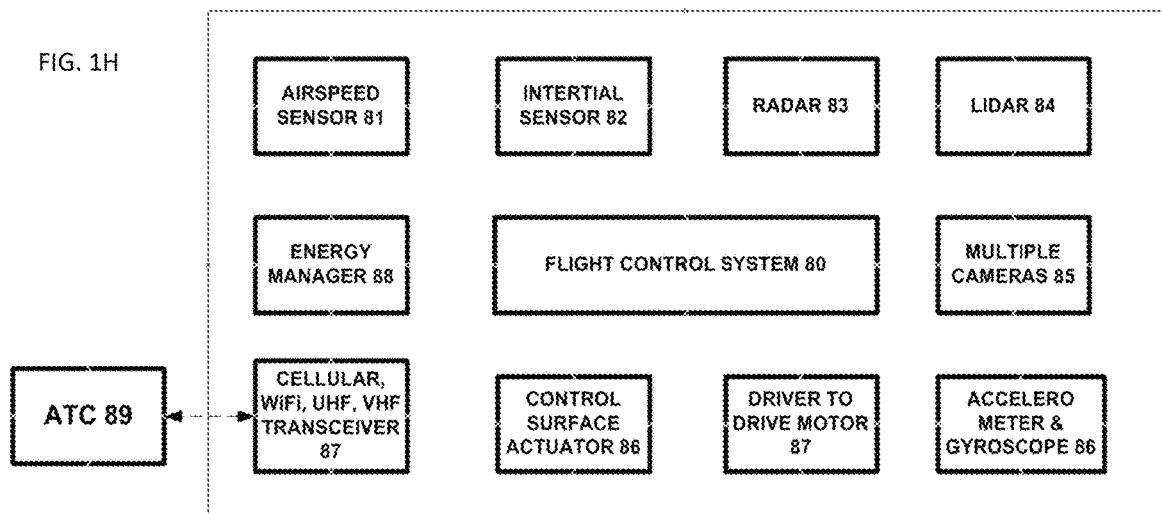

FIG. 1J

| |
|---|
| Start with a direct line between origin and destination (110) |
| Look up known obstacles and deviate around obstacles (112) |
| Look up weather issues and deviate around problematic weather (114) |
| Look up conflicting filed flight plans and deviate around conflicts with other vehicles (116) |
| Submit flight plan with origin and destination to approval service (118) |
| If rejected, provide revised plan and resubmit (120) |

FIG. 1K

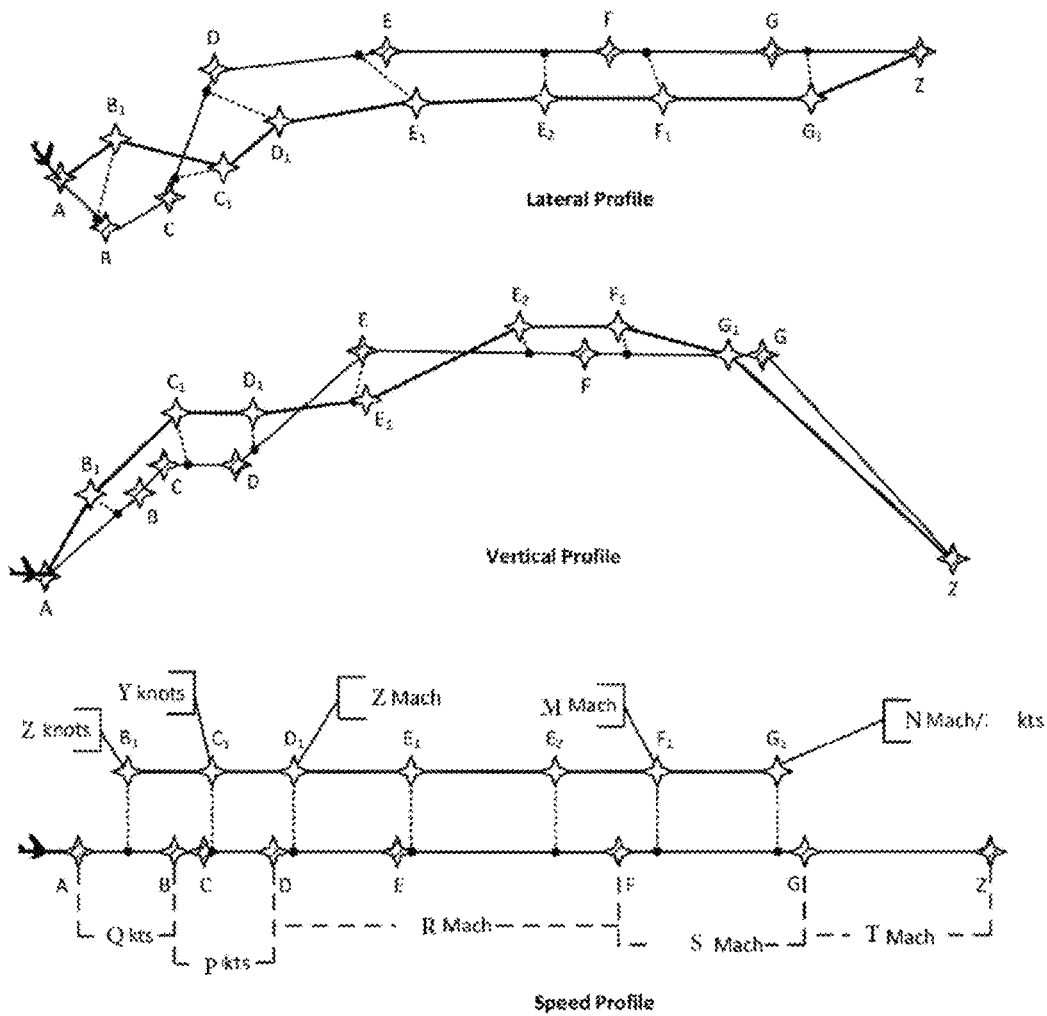

| |
|---|
| upload a flight plan to the flight control system of the vehicle and get authorization (68) |
| fly to the track location (70) |
| connect the vehicle to high speed rail track (72) |
| lift the vehicle into the air in a vertical takeoff and landing mode (74) |
| move the vehicle to a rail track exit point (76) |
| releasing vehicle from the track near destination (78) |
| transitioning vehicle off the track (80) |
| move vehicle to final destination (82) |

FIG. 2C

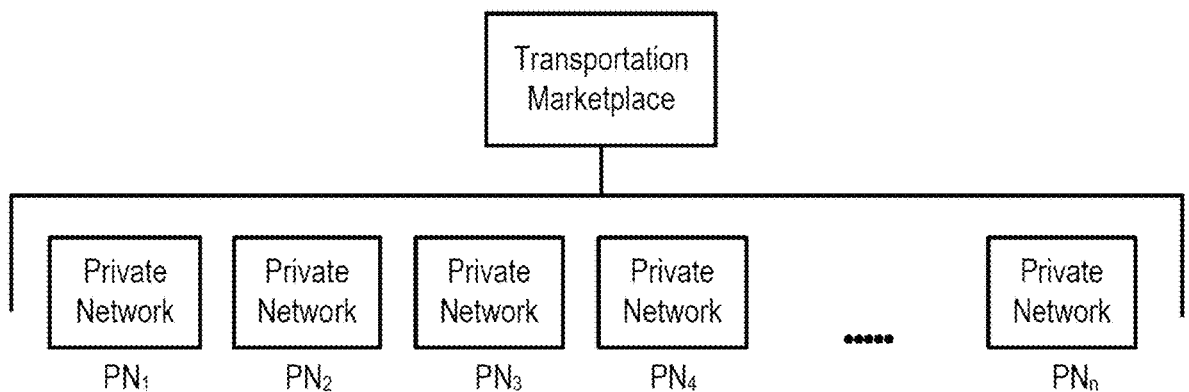

FIG. 3A

FIG. 4A
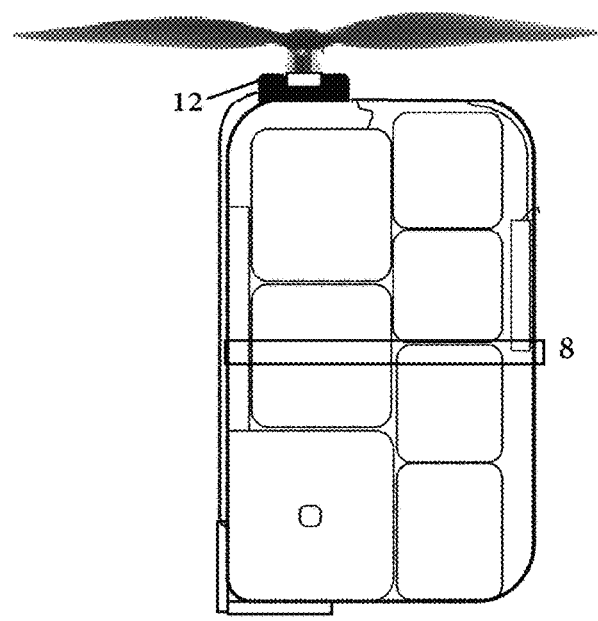
FIG. 4B
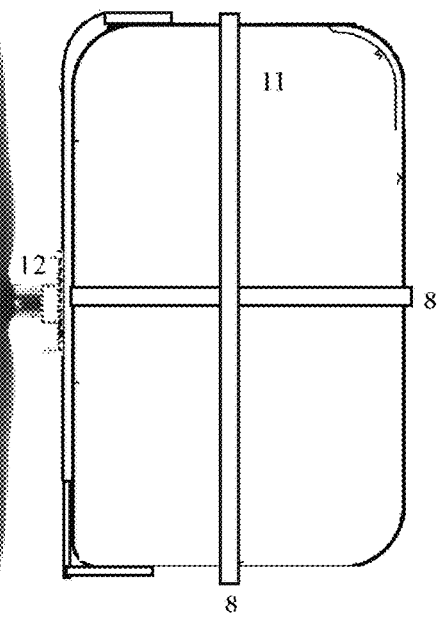
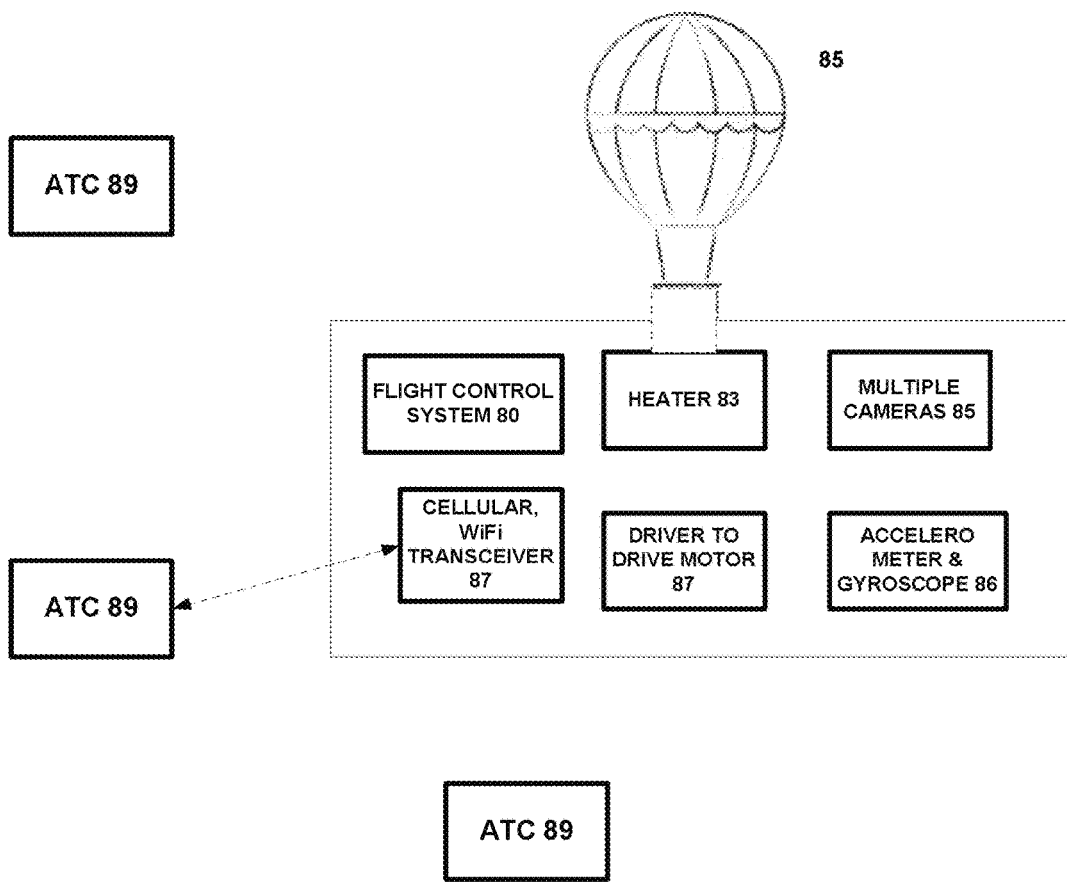
FIG. 4C

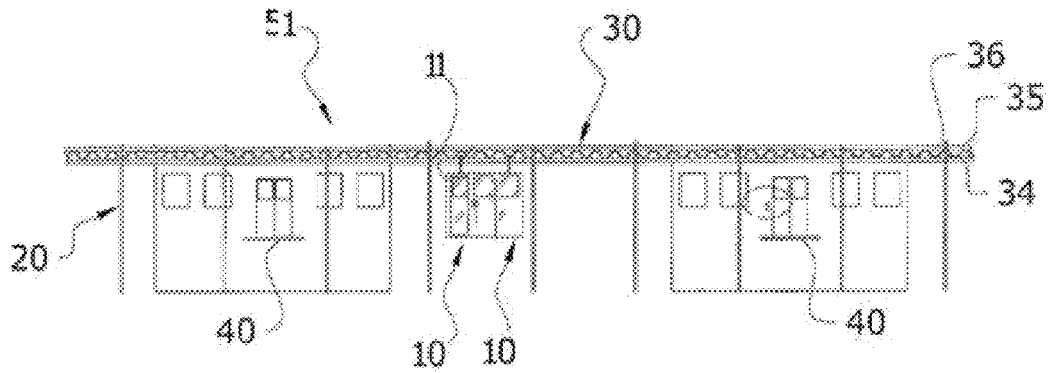

| |
|---|
| 202 - drone carrying content/pods arrives at a drone offload exchange station |
| 204 - drone flies towards a first loading bay where it may drop off one or more pods. |
| 206 - drone descends on the first loading bay and unlatches from pods that are designated for drop-off at the present loading bay |
| 208 - after unloading of pods is completed at the present loading bay, the drone ascends to a safe flying altitude |
| 210 - if the drone is still carrying pods, the process may return to step 204 and repeat steps 204 to 210 for as many different loading bays as necessary to drop off all pods |
| 212 - analysis is performed to decide whether the drone needs to be charge |
| 216 - if a charge is needed, drone may be directed to a charging bay, and docks into an open spot to receive a charge |

FIG. 4F

| |
|---|
| Upload a flight plan to the flight control system of the vehicle and get authorization (221) |
| Lift vehicle into the air in a vertical takeoff and landing mode (222) |
| Transition the vehicle from the vertical takeoff and landing mode to a forward flight mode (223) |
| Transport the vehicle to the desired destination location (224) |
| Use camera/computer vision to detect a door or a designated delivery spot and navigate drone to the door/designated landing spot (225) |
| Transition vehicle from the forward flight mode to the vertical takeoff and landing mode (226) |
| Land vehicle at destination, deliver the package and return to base (227) |

| |
|---|
| tracking a geographical location of a mobile device associated with the flying vehicle (110) |
| determining one or more shipping loads proximal to the geographical location of the mobile device, each shipping load having a shipping profile (112) |
| retrieving a vehicle profile (114) |
| comparing the vehicle profile with each shipping profile to identify one or more matching loads (116) |
| notifying a dispatching computer on the mobile device of matching loads (118) |

FIG. 5A

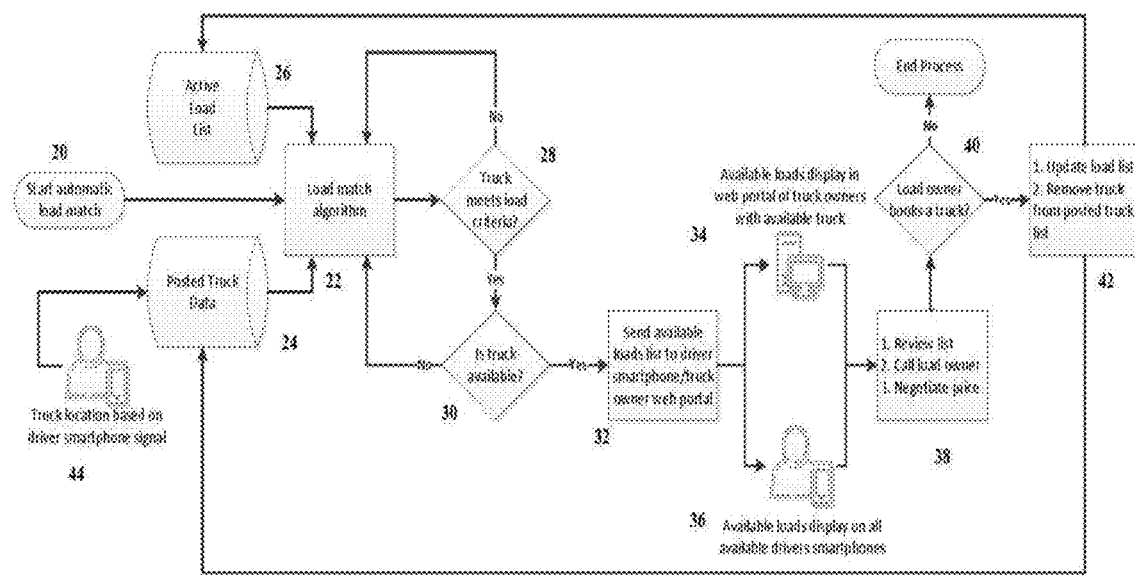

FIG. 5B

| |
|---|
| determining one or more flying vehicles proximal to a geographical location of a shipping load, each shipping load having a shipping profile (102) |
| retrieving a profile of each nearby vehicle and comparing the vehicle profile with the shipping profile to identify one or more matching vehicles (104) |
| contacting matching flight control system 80(s) on his or her mobile device about the shipping load (106) |

FIG. 5C

| |
|---|
| tracking a geographical location of a mobile device associated with a vehicle (110) |
| determining one or more shipping loads proximal to the geographical location of the mobile device, each shipping load having a shipping profile (112) |
| retrieving a vehicle profile (114) |
| comparing the vehicle profile with each shipping profile to identify one or more matching loads (116) |
| notifying a flight control system 80 on the mobile device of matching loads (118) |

FIG. 5D

FIG. 7A
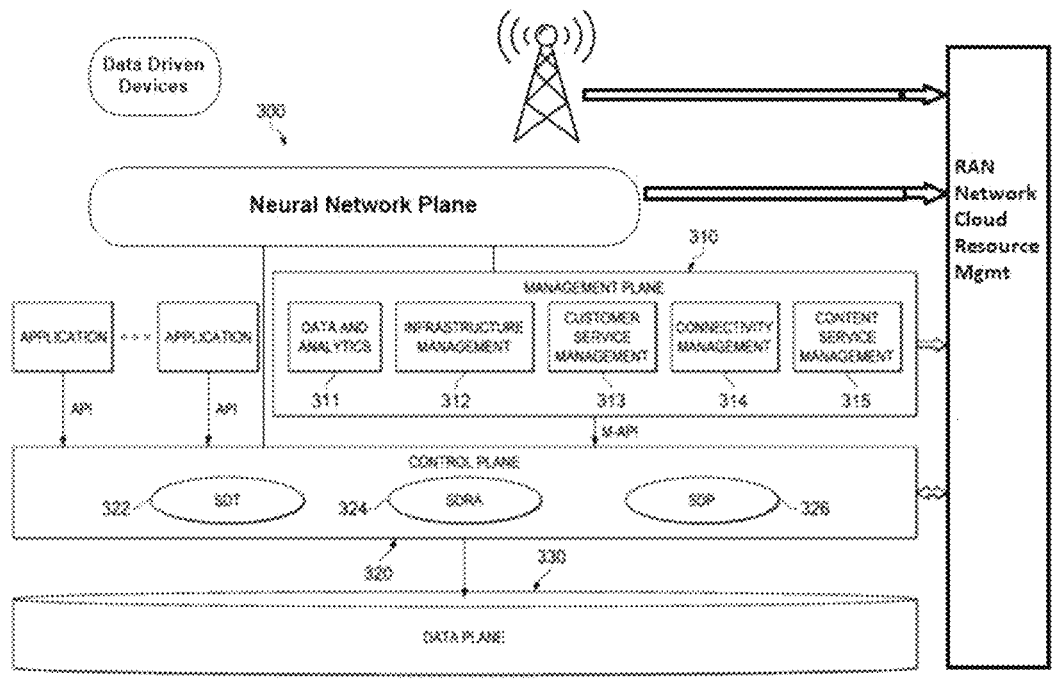
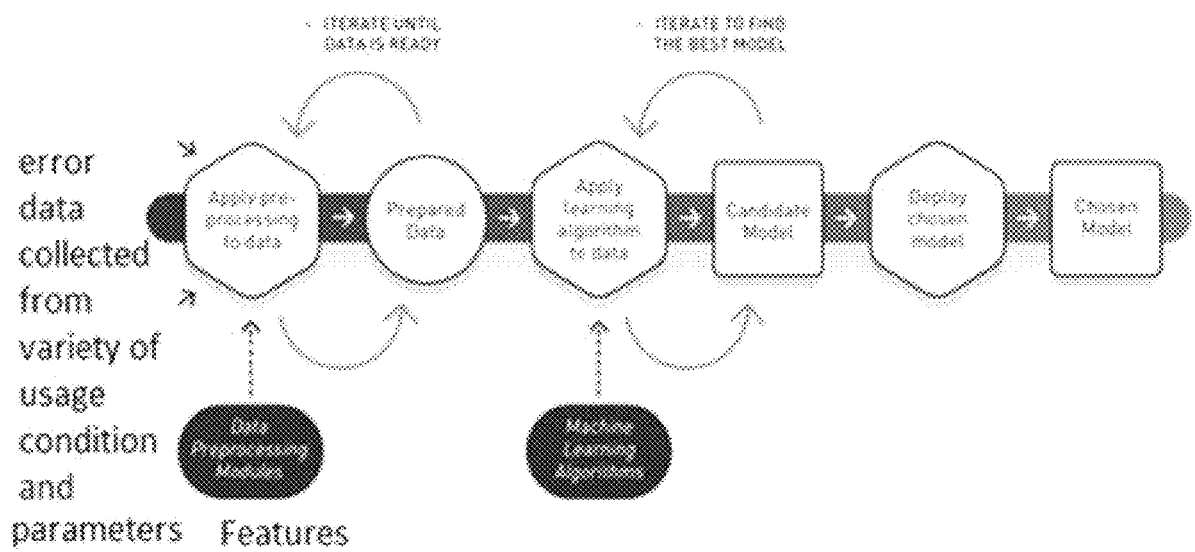
FIG. 7B

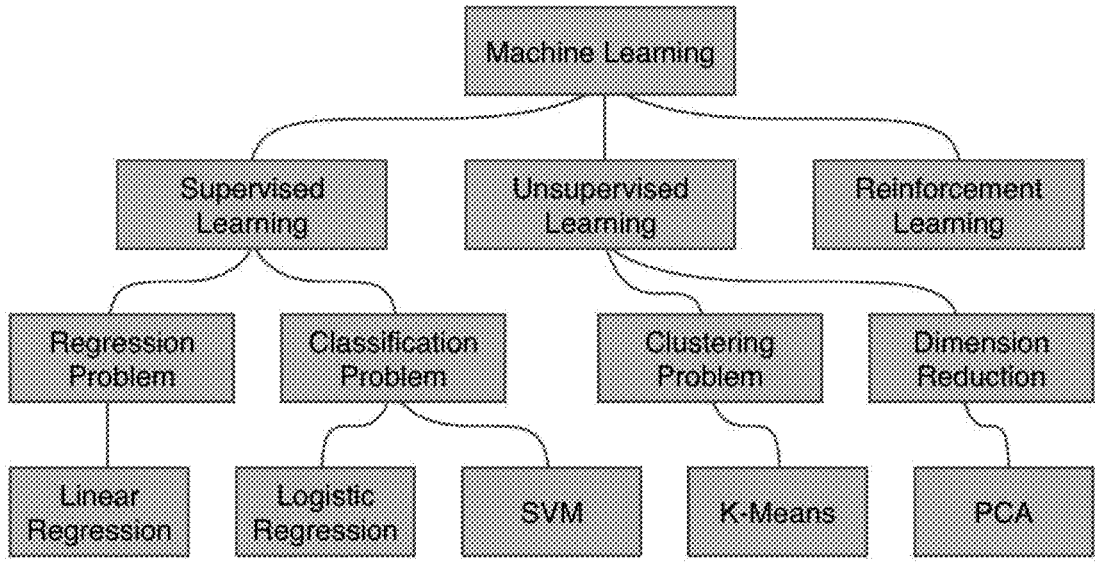
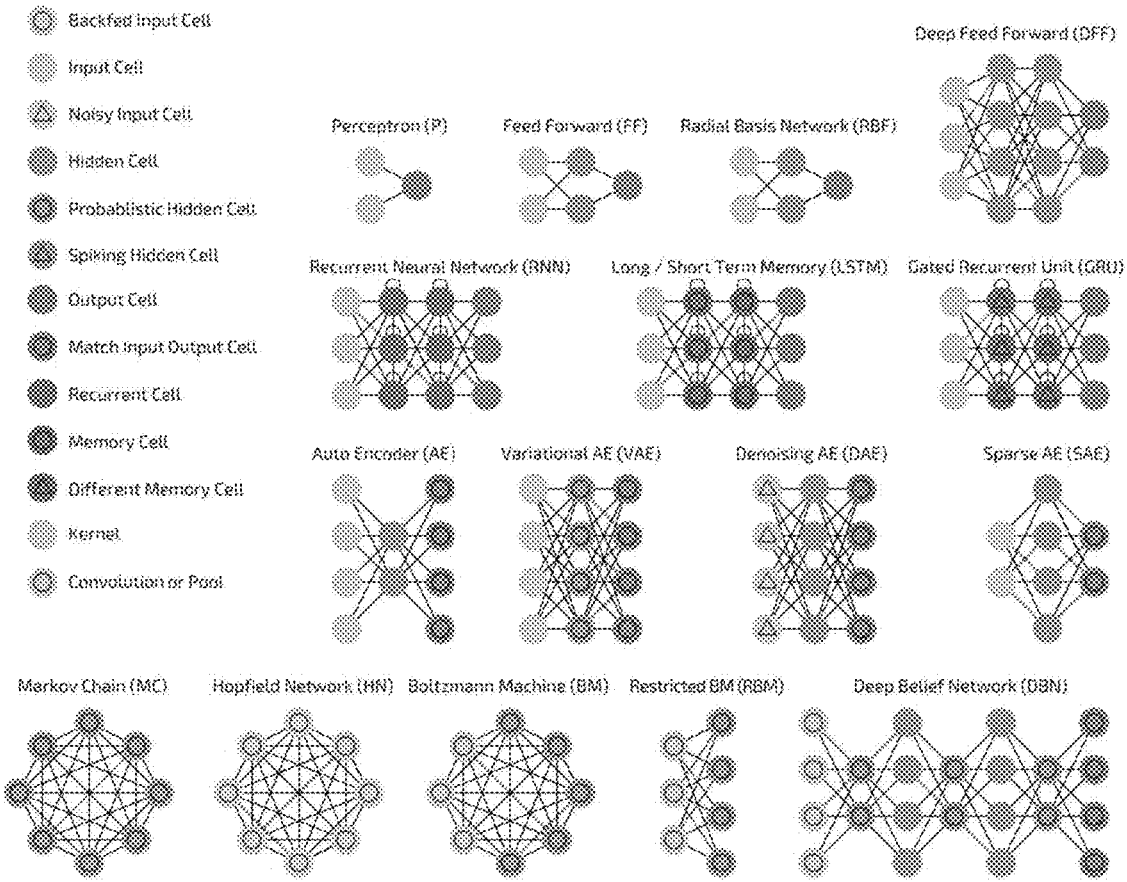
FIG. 7C

AIR TRANSPORTATION SYSTEMS AND METHODS

BACKGROUND

The present invention relates to air vehicles.

Smart cars offer consumers extra options on the road. However, well-publicized accidents and missteps show that even at a limited autonomy level, AI systems struggle on the road.

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, e.g., as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, a flying vehicle includes a cab having a moveable actuator coupled to the propulsion unit to move the propulsion unit between a first position above the cab during lift-off and a second position during lateral (forward or backward) flight. In another aspect, a method for controlling a vehicle, the method comprising: generating a multi-dimensional model of a vehicle operating in a 3D environment; determining a hand control gesture as captured by a plurality of cameras or sensors in the vehicle, wherein a sequence of finger, palm or hand movements represents a vehicle control request; determining vehicle control options based on the model, a current state of the vehicle and the environment of the vehicle; and controlling the vehicle to operate based on the model and the 3D environment. Based on LIDAR, radar, and camera images, the system can generate 3D models for navigation purposes. The 3D models are then crowd-sourced to the cloud and a high resolution 3D map of the region above the ground is generated. In one aspect, a method for controlling a vehicle, the method comprising: generating a multi-dimensional model of a vehicle operating in a 3D environment; determining a hand control gesture as captured by a plurality of cameras or sensors in the vehicle, wherein a sequence of finger, palm or hand movements represents a vehicle control request; determining vehicle control options based on the model, a current state of the vehicle and the environment of the vehicle; and controlling the vehicle to operate based on the model and the 3D environment. Based on LIDAR, radar, and camera images, the system can generate 3D models for navigation purposes. The 3D models are then crowd-sourced to the cloud and a high resolution 3D map of the region above the ground is generated. In another aspect, a mapping system for an air space includes: a plurality of air vehicles each having a plurality of environmental sensors; a processor in at least one vehicle or in at least one communication tower (edge processor) to receive sensor data and create a 3D model of the air space from successive air vehicle sensor outputs. In another aspect, processors and sensor located on 5G towers provide low latency edge processing capability, including machine learning processors to keep cost of vehicle low. Slice processing can also be done, where a slice of the network is dedicated to communications between vehicles. Numerous other aspects are discussed below as well.

BRIEF DESCRIPTION OF THE FIGURES

FIGS. 1A-1H show exemplary flying vehicles, vehicle controllers, and control processes.

FIG. 1J shows an exemplary flight plan and approval process.

FIG. 1K shows exemplary lateral, vertical, and speed profiles of the planned trip.

FIG. 2C shows an exemplary travel process using a combination of rails and vehicles.

FIG. 3A shows an exemplary transportation marketplace.

FIGS. 3B-3I show various exemplary load/vehicle match systems.

FIGS. 4A-4C show an exemplary air delivery vehicle/drone.

FIG. 4D shows an exemplary loading system for the delivery vehicles/drones in a warehouse, for example.

FIGS. 4E-4F show an exemplary process to use a combination of rail and air vehicle/drone to deliver packages to the door of customers.

FIGS. 5A-5D show exemplary processes to match delivery vehicles to loads.

FIG. 7A show exemplary neural control of 5G planes, while FIGS. 7B-7C show exemplary neural network training process and neural network architectures.

DETAILED DESCRIPTION

Figure 1D:
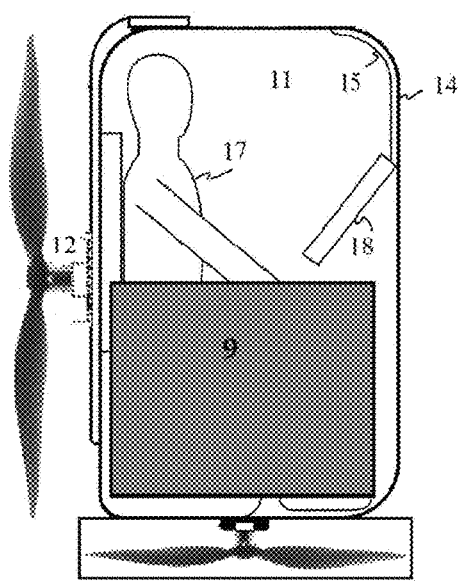

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Example embodiments, including some enumerated as Example Combinations (or ECs), are detailed for additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents. In the specification, reference may be made to the spatial relationships between various components and to the spatial orientation of various aspects of components as the devices are depicted in the attached drawings, but the components may be positioned in any desired orientation.

Flying Vehicle Architecture

In one aspect, a flying vehicle includes: a cab with an optional passenger seat with optional steering control; a propulsion unit having a rotating blade and an engine to rotate the blade; a rail from a cab top extending toward one external side of the cab, the cab having a moveable actuator coupled to the propulsion unit to move the propulsion unit between a first position above the cab during lift-off and a second position during lateral (forward or backward) flight.

Implementations may include one or more of the following. The propulsion can be a propeller driven or jet driven unit. The engine can be electric, gas, fuel cell, or hybrid. The windshield can be an AR port, a touch screen, or combination thereof. The blades or wings can be folded. The vehicle can be stored compactly. For lift off, the blades move from a storage position to the top of cab, extends itself a predetermined height above the other vehicles, and the blades rotate to lift the unit above the other parked unit, and then moves to the side of the vehicle while retracting toward the sidewall of the vehicle for normal flight operation to allow compact storage.

FIG. 1A-1B show an exemplary flying vehicle 10 that includes a frame or cab 11 with a passenger seat 19 with optional steering control 18. Besides being used to transport passengers, vehicle 10 may be used to transport parcels which may be loaded in at an approved parcel bay by a qualified loader. For parcel transport, numerous cabins can be linked together for increased capacity. The vehicle 10 has a propulsion unit 12 having a rotating blade and an engine to rotate the blade. The vehicle includes a rail 16 from a cab top extending toward one external side of the cab. The rail or the cab has a moveable actuator coupled to the propulsion unit 12 to move the propulsion unit 12 between a first position above the cab during lift-off and a second position behind or in front of the passenger during forward flight or backward flight. A view port 14 can be provided with touchscreen capability to receive user input. The view port 14 can be a windshield with projectors to provide augmented reality. FIG. 1A shows a lift-off configuration, while FIG. 1B shows a forward thrust configuration. In either configuration, a bottom propulsion unit provides lift as needed during take-off and is turned off during forward motion to conserve energy.

The engines of the propulsion unit 12 are preferably electric motors for quiet operation, or they may be liquid fuel powered engines such as fuel cell, gasoline, jet fuel or diesel powered engines including rotary engines such as dual rotor or tri rotor engines or other high power-to-weight ratio engines. Alternatively, some or all of the engines of propulsion may be electric motors operated responsive to a distributed electrical system wherein battery systems are housed within each nacelle or wherein electrical power is supplied to the electric motors from a common electrical source integral to or carried by the frame. As another alternative, some or all of the engines of propulsion unit 12 may be hydraulic motors operated responsive to distributed hydraulic fluid system wherein high pressure hydraulic sources or generators are provided or a common hydraulic fluid system integral to or carried by the vehicle with cab 11.

The cab 11 includes a cockpit display device configured to display information to an onboard pilot. Cockpit display device may be configured in any suitable form, including, for example, as one or more display screens such as liquid crystal displays, light emitting diode displays and the like or any other suitable display type including, for example, a display panel or dashboard display. Audio output and input devices such as a microphone, speakers and/or an audio port enable an onboard pilot to communicate with, for example, an operator at a transportation services provider facility. Cockpit display device may also serve as a pilot input device if a touch screen display implementation is used, however, other user interface devices may alternatively be used to allow an onboard pilot to provide control commands to a vehicle being operated responsive to onboard pilot control including, for example, a control panel, mechanical control devices or other control devices. As should be apparent to those that are skilled in the art, the vehicle 10 can be operated responsive to a flight control protocol including autonomous flight control, remote flight control, onboard pilot flight control and combinations thereof.

As vehicle 10 transitions from vertical takeoff and landing mode to forward flight mode, vehicle 10 is maintained in a generally horizontal attitude for the safety and comfort of passengers, crew and/or cargo carried in cab 11. This may be achieved due to the shape and the center of gravity of cab 11 wherein aerodynamic forces and gravity tend to bias cab 11 toward the generally horizontal attitude. Alternatively, or additionally, a gear assembly, a clutch assembly or other suitably controllable rotating assembly may be utilized that allows for pilot controlled, remote controlled or autonomously controlled rotation of cab 11 relative to vehicle 10 as vehicle 10 transitions from vertical takeoff and landing mode to forward flight mode. Once vehicle 10 has completed the transition to forward flight mode, it may be desirable to adjust the center of gravity of the aircraft to improve its stability and efficiency. Once cab 11 is in the desired forward position, certain propulsion assemblies of vehicle 10 may be shut down as the thrust requirements in forward flight mode are reduced compared to the thrust requirements of vertical takeoff and landing mode. When vehicle 10 begins its approaches to the destination, inboard propulsion of vehicle 10 are reengaged to provide full propulsion capabilities and the vehicle 10 can begin its transition from forward flight mode to vertical takeoff and landing mode. During the transition from forward flight mode to vertical takeoff and landing mode, cab 11 is maintained in a generally horizontal attitude for the safety and comfort of passengers, crew and/or cargo carried in cab 11. Once vehicle 10 has completed the transition to vertical takeoff and landing mode, vehicle 10 may complete its descent to a surface and cab 11 may now lower wheel assemblies (not shown) to provide ground support to cab 11.

In one embodiment, the blade can be folded for storage, and the folding system may include, for example, a series of rapidly attachable "pitch lock" or flap lock assemblies, that together may form a flap lock system, that are easily attached to the rotor hub of the helicopter during a blade fold or unfold operation that remain in place for transport or storage, and are fully removed prior to flight after the blades have been restored to flight position. In certain embodiments, these mechanisms may be attached to the hub using quick release pins and a piston-style toggle clamping mechanism, requiring no external tools for attachment. In potential addition to the flap lock assemblies, an overhead lifting system support structure may be attached to the flap lock assemblies using similar quick-lock pins or other fasteners. This overhead lifting system support structure then attaches to a blade support beam assembly that is used to attach to a blade using an appropriate blade clamp and then used to lift or lower the main rotor blades as necessary to remove loads transmitted to the blade pins because of their static weight and other forces. More details are shown in U.S. Pat. No. 10,287,009, the content of which is incorporated by reference. Further, when there are many other vehicles parked, when the vehicle lifts off, the blade can be extended above other vehicles during take-off, and then be retracted thereafter to save storage space.

A process for transporting the vehicle 10 performed by the flight control system of the vehicle is seen in FIG. 1C. The process includes: Upload a flight plan to the flight control system of the vehicle and get authorization (21); Lift vehicle into the air in a vertical takeoff and landing mode (22); Transition the vehicle from the vertical takeoff and landing mode to a forward flight mode (23); Transport the vehicle to the desired destination location (24); Transition vehicle from forward flight mode to vertical takeoff and landing mode (25); and Land vehicle at destination (26)

The first step involves uploading a flight plan to the flight control system of the vehicle 10 in 21. The authorization comes from a network of ground station ATCs, as detailed below. Once approved, the vehicle may then be operated responsive to autonomous flight control, remote flight control or a combination thereof. The vehicle then goes into the air in a vertical takeoff and landing mode, as indicated in block 22. During the vertical takeoff, the vehicle is preferably maintained in a generally horizontal attitude and each of the propulsion assemblies of the distributed propulsion system are independently operated using, for example, selective collective pitch and selective thrust vectoring as discussed herein. Once the vehicle has reached a desired altitude in vertical takeoff and landing mode, the next step is transitioning the vehicle from the vertical takeoff and landing mode to a forward flight mode, as indicate in block 23. Preferably, this transition involves rotating the vehicle to remain in the generally horizontal attitude. Once in forward flight mode, the next step is transporting the vehicle to the desired destination location, as indicated in block 24. Depending upon factors such as the distance of travel and environmental conditions, it may be desirable to shut down certain propulsion assemblies, as discussed herein, during forward flight. As the vehicle approaches the destination, the next step is transitioning the vehicle from the forward flight mode to the vertical takeoff and landing mode, as indicated in block 25. Preferably, this transition involves keeping the vehicle remains in the generally horizontal attitude. The next step is landing the vehicle at the destination, as indicated in block 26. This step may involve identifying a landing zone and performing an approach in the vertical takeoff and landing mode.

Foldable Wing

In one aspect, a vehicle includes: a cab with an optional passenger seat with optional steering control; a propulsion unit having a rotating blade and an engine to rotate the blade; a wing coupled to the vehicle having a folded arrangement for storage and an extended position for flight, the cab having a moveable actuator coupled to the propulsion unit to move the propulsion unit between a first position above the cab during lift-off and a second position during lateral flight.

Implementations may include one or more of the following. As shown in FIG. 1D, a pair of foldable, extensible wings 9 are connected to each side the main body of the vehicle 10 can convert the vehicle 10 into a plane. Each wing is multiply folded so that when fully extended, the wing is at least 2 times the vehicle width, 3 times the vehicle width, 4 times the vehicle width, 5 times the vehicle width, 6 times the vehicle width, 7 times the vehicle width in one embodiment, and 10 times vehicle width in various embodiments. In operation, for deploying the vehicle 10 from a vertical state to forward flight state, wing 9 rotates around an axis of a pivot pin for example counterclockwise until the wing is positioned perpendicular to the vehicle body and then the portions of the wing are unfolded using actuators to arrive at a fully extended position. A locking mechanism as known in the mechanical art can be used to place the foldable wings in a fully deployed position and to maintain the offset-x shaped wings during flight. In a fully deployed position each wing is arranged to be perpendicular to the vehicle body and each wing is arranged also perpendicular to its adjacent wing in one embodiment. The foldable/collapsible wings, propellers, stabilizers and flight control surfaces decrease the bulk of the vehicle during storage. The vehicle with foldable/collapsible wings, flight control surfaces, stabilizers, propellers and means to control and drive the wings, flight control surfaces, stabilizers, propellers and flight control surface can do rapid flights and rapid maneuvers/speed changes when the vehicle 10 is in a flight state. The wing can be a main wing or tail wing.

Amphibious Vehicle

In one aspect, a vehicle includes: a cab with an optional passenger seat with optional steering control; a propulsion unit having a rotating blade and an engine to rotate the blade; a float coupled to the cab; the cab having a moveable actuator coupled to the propulsion unit to move the propulsion unit between a first position above the cab during lift-off and a second position during lateral flight.

Figure 1E:
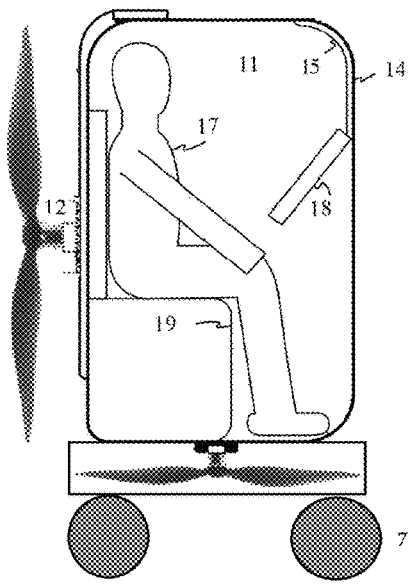

Implementations may include one or more of the following. For amphibious operation shown in FIG. 1E, the float can be pontoons 13 or outrigger floats which are used to provide lateral stability so as to avoid dipping a wingtip, which can destroy an aircraft if it happens at speed, or can cause the wingtip to fill with water and sink if stationary. Other embodiments use stub wings called sponsons, mounted with their own lower surfaces nearly even with the ventral "boat-hull" shaped fuselage surface to provide the needed stability, while floatplane amphibians usually avoid the problem by dividing their buoyancy requirements between two floats, much like a catamaran.

Flying Car

In one aspect, a vehicle includes: a cab with an optional passenger seat with optional steering control; a propulsion unit having a rotating blade and an engine to rotate the blade; wheel(s) coupled to the cab; the cab having a moveable actuator coupled to the propulsion unit to move the propulsion unit between a first position above the cab during lift-off and a second position during lateral flight.

Figure 1F:
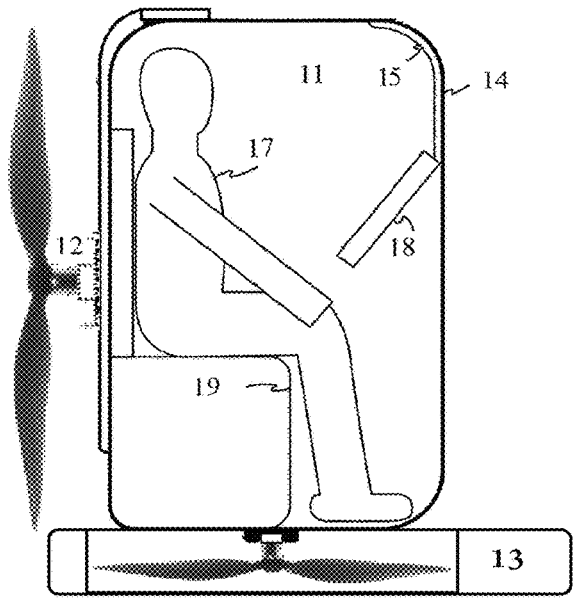
Figure 1G:
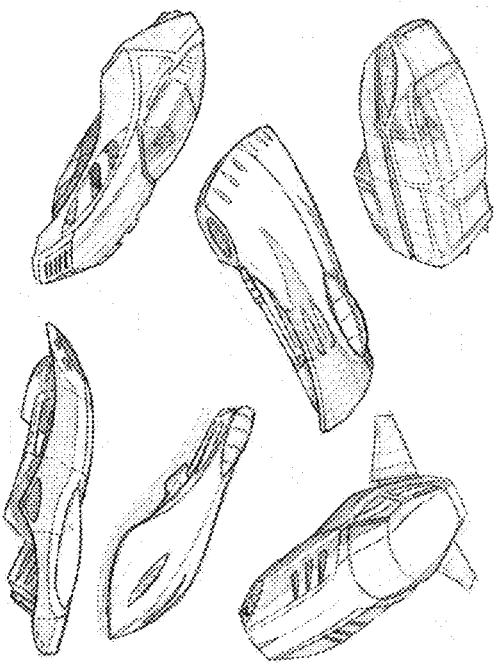

Implementations may include one or more of the following. FIG. 1F shows a car version with wheels 7. In this embodiment, the wheels are motorized and can be controlled by steering wheel for short range driving if needed. While the above discussion shows architectural block diagrams of the air vehicle, the shape of the vehicle can be aerodynamically optimized, such as that of FIG. 1G, for example.

Vehicle Sensors and Controllers

In one aspect, a vehicle includes: a cab with an optional passenger seat with optional steering control; a propulsion unit having a rotating blade and an engine to rotate the blade; autonomous flight electronics to control the propulsion unit; the cab having a moveable actuator coupled to the propulsion unit to move the propulsion unit between a first position above the cab during lift-off and a second position during lateral flight.

Implementations may include one or more of the following. FIG. 1H shows exemplary control system for the vehicle 10. The vehicle 10 includes a flight control system 80 that may be disposed within the cab 11 that communicates with the electronics nodes of each propulsion assembly receiving sensor data from and sending flight command information to the electronics nodes, thereby individually and independently controlling and operating each propulsion assembly. The flight control system 80 receives data from various sensors such as air speed sensor 81, inertial sensor 82, radar 83, LIDAR 84, a plurality of cameras 85 positioned at various spots on the vehicle, accelerometer/gyroscope 86, and altimeter to determine height. The sensors provide orientation measurements and readings, including pitch angle, roll angle and heading of the vehicle and inertial measurements, including accelerations and angular rates of the vehicle. The control system 80 in turn drives the motors 87 with the propellers. The control system 80 also actuates the control surfaces (foldable wings, canards, etc) through actuator(s) 86. The control system receives communications from cellular, WiFi or 802.X protocol, and VHF/UHF transceivers through transceiver 87. Cellular communication can be 4G, 5G, or 6G, for example. Power for the vehicle is managed by an energy manager 88. In operation, the flight control system 80 under the control of flight control software, senses the flight control sensors and moves the control surfaces using the control surface actuators to maintain the vehicle on a desired trajectory. The vehicle can be guided via the cameras, radar, lidar, and can also be directed to coordinates using the Global Positioning System (GPS). Each vehicle 10 is configured with a unique identifier, such as a SIM card or the like. Similar to standard mobile phones, each device 10 is configured to maintain an association with a plurality of cell towers 90 based on a current geographic location. Using triangulation or other location identification techniques (GPS, GLONASS, etc.), the location, altitude, speed, and direction of each vehicle 10 can be continuously monitored and reported back to the servers to manage this data in real-time in an automated fashion to track and control all vehicles 10 in a geographic region. For example, the servers can manage and store the data in the data store.

In an embodiment, at least one vehicle may comprise various components including, but not limited to, an engine, a power source such as a battery, a memory unit, a clock, a Global Positioning System (GPS), a compass and a configuration of sensors. Specifically, the battery may provide electrical power to the various components of the at least one vehicle. In one embodiment, the configuration of sensors may comprise altimeters, accelerometers, gyroscopes, magnetometers, infrared sensors, LiDAR sensors, corona detectors, radiation detectors and so forth. According to an embodiment, the flight parameters may include at least one of a temperature of the engine of vehicle, a power consumption of the vehicle, a charging level of the battery of the vehicle, and sensor data measured by the configuration of sensors of the vehicle. In an embodiment, the plurality of flight parameters may further include Global Positioning System parameters (or GPS parameters) of the at least one vehicle. In an example, the statistical data may pertain to the GPS parameters obtained using the Global Positioning System (GPS) of the at least one vehicle. Examples of the GPS parameters include, but are not limited to, latitudinal and longitudinal coordinates of the at least one vehicle, uncertainty of estimated geo location of the at least one vehicle, and number of GPS satellites visible to the at least one vehicle for identifying the geo location thereof. In an example, the statistical data may pertain parameters and measurements of the radio communication path between the vehicle and GCS such as latency, signal strength, bandwidth, jitter and/or bit error rate. In another example, the statistical data may comprise navigation data of the at least one vehicle. Specifically, the navigation data may comprise various parameters captured through the flight duration such as compass reading, accelerometer reading, height above ground, angular velocity, angular acceleration, magnetic field and so forth.

During the flight, the ATC 89 can provide feedback such as speed, altitude, and heading, and the feedback can further include one or more of temperature, humidity, wind, and detected obstructions. The instructions, when executed, can further cause the one or more processors to: provide updates to the flying lane based on the feedback and based on feedback from other devices. The instructions, when executed, can further cause the one or more processors to based on the feedback, determine the one or more vehicles 10 at ready to descend or fly to the destination and providing authorization to the one or more vehicles 10 for a descent. The instructions, when executed, can further cause the one or more processors to—based on the feedback—detect a new obstruction and update the flying lane based on adjustments made by the one or more vehicles 10 due to the obstruction. The adjustments and/or the updated flying lane can include a buffer distance from the new obstruction. The new obstruction can be detected by the one or more vehicles 10 based on hardware thereon and communicated to the ATC.

3D Models for Navigation

In one aspect, a method for controlling a vehicle, the method comprising: generating a multi-dimensional model of a vehicle operating in a 3D environment; determining a hand control gesture as captured by a plurality of cameras or sensors in the vehicle, wherein a sequence of finger, palm or hand movements represents a vehicle control request; determining vehicle control options based on the model, a current state of the vehicle and the environment of the vehicle; and controlling the vehicle to operate based on the model and the 3D environment. Based on LIDAR, radar, and camera images, the system can generate 3D models for navigation purposes. The 3D models are then crowd-sourced to the cloud and a high resolution 3D map of the region above the ground is generated.

Implementations may include one or more of the following. In another aspect, a vehicle includes: a cab with an optional passenger seat with optional steering control; a propulsion unit having a rotating blade and an engine to rotate the blade; sensors to capture 3D data around the vehicle; a processor on-board the vehicle or located near a communication tower to receive sensor outputs and create a high definition 3D map; the cab having a moveable actuator coupled to the propulsion unit to move the propulsion unit between a first position above the cab during lift-off and a second position during lateral flight.

Figure 1I:
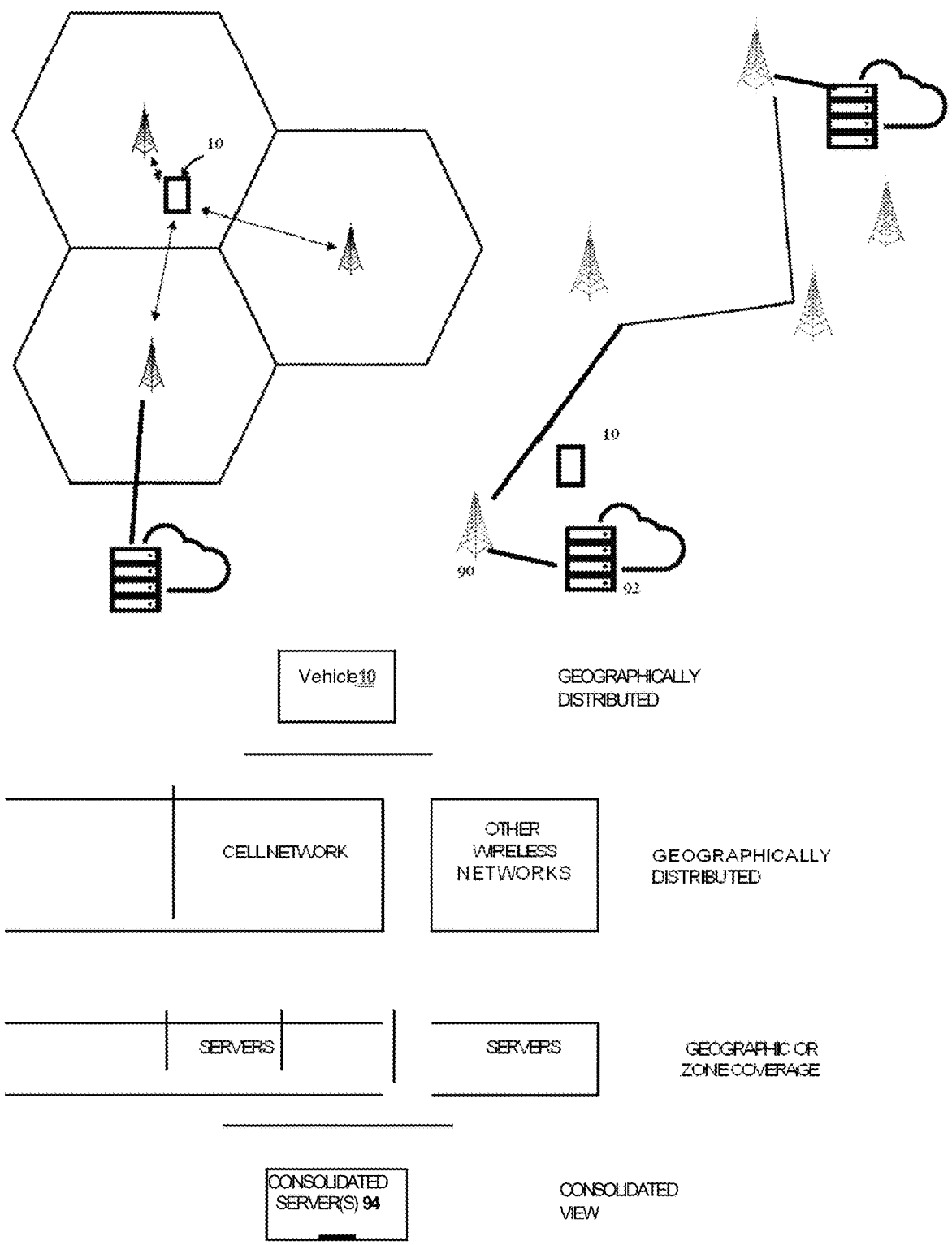
FIG. 1I shows an exemplary network environment supporting the vehicle.
Figure 1L:
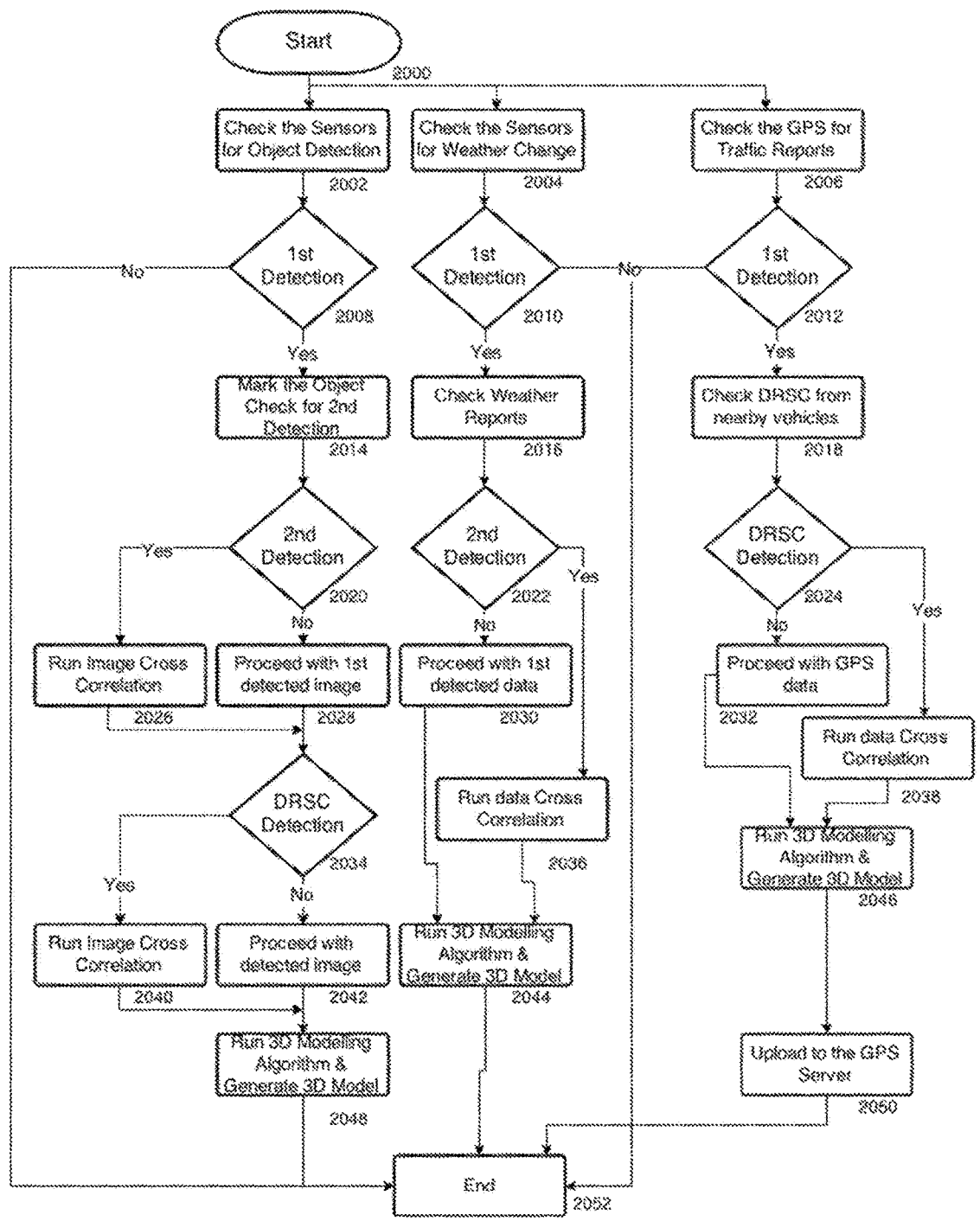
FIG. 1L shows an exemplary obstacle detection process.

FIG. 1L illustrates an exemplary process to fuse data for 3D models used for car navigation. FIG. 1L shows an exemplary system that performs data fusion based on sensor based detection of objects, change in weather and traffic, and holiday/emergency conditions, among others. The process checks all the sensors for change in weather (2004), detection of object (2002) and the GPS for current traffic conditions (2006). For each given sensor for detecting objects in a vehicle's environment, the process generates a 3D model of the given sensor's field of view; obstacle information from front cars using vehicle-vehicle communication (DRSC); neighboring car driver preference information; traffic information including emergency information. The process can adjust one or more characteristics of the plurality of 3D models based on the received weather information to account for an impact of the actual or expected weather conditions on one or more of the plurality of sensors. After the adjusting, aggregating, by a processor, the plurality of 3D models to generate a comprehensive 3D model; combining the comprehensive 3D model with detailed map information; and using the combined comprehensive 3D model with detailed map information to maneuver the vehicle. In FIG. 7A, the process checks sensors for object detection (2008) and then checks for confirmations from other vehicles over V2V communication such as DSRC and then generates 3D model therefrom. The process can also check for weather change (2004) and correlate the weather change to generate an updated 3D model. Similarly, the process integrates traffic flow information (2006) and updates the 3D model as needed.

Obstacle Recognition

In one aspect, an obstacle detection system for an air space includes: one or more air vehicles each having a plurality of environmental sensors; a processor with a neural network in at least one vehicle or in at least one communication tower (edge processor) to receive sensor data and identify the obstacle in the air space from sensor outputs.

In another aspect, a method for controlling a vehicle includes generating a multi-dimensional model of a vehicle operating in a 3D environment; identifying an obstacle; determining vehicle control options based on the model, a current state of the vehicle and the environment of the vehicle; and controlling the vehicle to operate based on the model and the 3D environment. Based on LIDAR, radar, and camera images, the system can generate 3D models for navigation purposes.

Implementations may include one or more of the following. The obstacle can be detected by radar when the vehicle is in an approved lane that is not aware of the obstacle in advance. Non-limiting examples of static obstructions which are permanent include buildings, mountains, cell towers, utility lines, bridges, etc. Non-limiting examples of static obstructions which are temporary include tents, parked utility vehicles, etc. Temporary and permanent static obstructions can be managed the same with the temporary obstructions having a Time To Remove (TTR) parameter which can remove it from the database. Moving vehicles 10 are one example of dynamic obstructions. The ATC 89 can notify the vehicles 10 of other vehicles 10 and the vehicles 10 can also communicate the detection of the vehicles 10 as well as other dynamic and static obstructions to the ATC. The obstructions can include dynamic obstructions, and the characteristics comprise size, shape, speed, direction, altitude, and heading. The characteristics can be determined based on analyzing multiple images or video over time. The vehicle 10 method 1200 can further include receiving notifications from the air traffic control system related to previously detected obstructions; and updating the air traffic control system based on the detection of the previously detected obstructions. The characteristics are for an obstruction database maintained by the air traffic control system.

The vehicle's cameras, along with radar and lidar, automatically capture and classify dynamic/static obstacles encountered and classify the obstacles using neural networks (NN). The NN receives camera images along with radar/lidar data to help distinguish obstacles to avoid during the flight. One NN used is generative adversarial networks (GANs) are deep neural net architectures comprised of two nets, pitting one against the other (thus the "adversarial"). One neural network, called the generator, generates new data instances, while the other, the discriminator, evaluates them for authenticity; i.e. the discriminator decides whether each instance of data that it reviews belongs to the actual training dataset or not. The generator is creating new, synthetic images that it passes to the discriminator. It does so in the hopes that they, too, will be deemed authentic, even though they are fake. The goal of the generator is to generate passable obstacles. The goal of the discriminator is to identify images coming from the generator as obstacles. Here are the steps a GAN takes: The generator takes in random numbers and returns an image. This generated image is fed into the discriminator alongside a stream of images taken from the actual, ground-truth dataset. The discriminator takes in both real and fake images and returns probabilities, a number between 0 and 1, with 1 representing a prediction of authenticity and 0 representing fake, resulting in a double feedback loop. The discriminator is in a feedback loop with the ground truth of the images. The generator is in a feedback loop with the discriminator.

In yet another aspect, a flight obstacle detector includes: sensors including radar or lidar; a noise vector provided to a generator network to provide synthesized obstacles; camera(s) providing images; a discriminator network coupled to the camera and the generator network, the discriminator network and generator network iteratively trained to identify a flight obstacle; abstract the obstacle to a bounding box such as a pyramid (mountain), cylinder (building), rectangle (building) with parameters of each object and location and height of the obstacle; search obstacle DB based on location and parameters and if no entry matches the obstacle, then add a new entry with the abstraction along with location/height of obstacle, and an image and 360 deg video.

The systems and methods provide a mechanism in the ATC 89 to characterize detected obstructions at or near the ground. In an embodiment, the detected obstructions are dynamic obstructions, i.e., moving at or near the ground. Examples of dynamic obstructions can include, without limitation, other vehicles 10, vehicles on the ground, cranes on the ground, and the like. Generally, dynamic obstruction management includes managing other vehicles 10 at or near the ground and managing objects on the ground which are moving which could either interfere with landing or with low-flying vehicles 10. In an embodiment, the vehicles 10 are equipped to locally detect and identify dynamic obstructions for avoidance thereof and to notify the ATC 89 for management thereof to update the obstacle database.

Further, the detected obstructions can be static obstructions, i.e., not moving, which can be temporary or permanent. The ATC 89 can accurately define the location of the detected obstructions, for example, a virtual rectangle, pyramid, cylinder, etc. defined by location coordinates and altitude. The defined location can be managed and determined between the ATC 89 and the vehicles 10 as well as communicated to the vehicles 10 for flight avoidance. That is, the defined location can be a "no-fly" zone for the vehicles 10. Importantly, the defined location can be precise since it is expected that there are a significant number of obstructions at or near the ground and the vehicles 10 need to coordinate their flight to avoid these obstructions. In this manner, the systems and methods seek to minimize the no-fly zones.

Further, the present disclosure relates to obstruction detection systems and methods with air traffic control systems for vehicles 10. Specifically, the systems and methods use a framework of an air traffic control system which uses wireless (cell) networks to communicate with various vehicles 10. Through such communication, the air traffic control system receives continuous updates related to existing obstructions whether temporary or permanent, maintains a database of present obstructions, and updates the various vehicles 10 with associated obstructions in their flight plan. The systems and methods can further direct vehicles 10 to investigate, capture data, and provide such data for analysis to detect and identify obstructions for addition in the database. The systems and methods can make use of the vast data collection equipment on vehicles 10, such as cameras, radar, etc. to properly identify and classify obstructions.

Through the data capture equipment, the vehicles 10 are adapted to detect potential obstructions and detect operational data (speed, direction, altitude, heading, location, etc.). For newly detected obstacles, the vehicles 10 are adapted to transfer the operational data to the servers 92. Sensors on the vehicles 10 can capture identification data, photos, video, etc. and upload. In an embodiment, the vehicles 10 are provided advanced notification of obstructions and capable of local data processing of the identification data to verify the obstructions. If the local data processing determines an obstruction is already known, i.e., provided in a notification from the servers 92, the vehicle 10 does not require any further processing or data transfer of the identification data, i.e., this obstruction is already detected. On the other hand, if the vehicle 10 detects a potential obstruction, i.e., one that it has not been notified of, based on the local data processing, the vehicle 10 can perform data transfer of newly identified obstruction data to the servers 92.

The servers 92 are configured to manage the obstruction DB 820, namely to update the entries therein. The servers 92 are configured to receive operational data from the vehicles 10 under control for management thereof. Specifically, the servers 92 are configured to manage the flight plans of the vehicles 10 200, and, in particular with respect to obstructions, for advanced notification of future obstructions in the flight plan.

The servers 92 are configured to receive the detection of potential obstructions. The vehicles 10 can either simply notify the servers 92 of a potential obstruction as well as provide the identification data for the servers 92 to perform identification and analysis. Upon receipt of any data from the vehicles 10 200 related to obstructions (a mere notification, actual photos, etc.), the servers 92 are configured to correlate this data with the DB 820. If the data matches an entry that exists in the DB, the servers 92 can update any information related to the obstruction such as last seen date.

If the servers 92 detect that the potential obstruction does not exist in the DB, the servers 92 add an entry in the DB, perform identification if possible from the identification data, and potentially instruct a vehicle 10 to identify in the future. For example, if the servers 92 can identify the potential obstruction from the identification data, the servers 92 can create the DB entry and populate it with the identified data. The servers 92 can analyze the identification data, as well as request human review, using pattern recognition to identify what the obstruction is, what its characteristics are (height, size, permanency, etc.). If the servers 92 do not have enough identification data, the servers 92 can instruct the identifying vehicle 10 or another vehicle 10 in proximity in the future to obtain specific identification data for the purposes of identification.

The obstructions can be stored and managed in an obstruction database (DB) communicatively coupled to the servers 92 and part of the Air traffic control system 300. Obstructions can be temporary or permanent and managed accordingly. Thus, the DB 820 can include an entry for each obstruction with location (e.g., GPS coordinates), size (height), and permanence. Temporary obstructions can be ones that are transient in nature, such as a scaffold, construction equipment, other vehicles 10 in flight, etc. Permanent obstructions can be buildings, power lines, cell towers, geographic (mountains), etc. For the permanence, each entry in the DB can either be marked as permanent or temporary with a Time to Remove (TTR). The TTR can be how long the entry remains in the DB. The permanence is determined by the servers 92 as described herein.

Crowd Sourcing 3D Models of Flight Lanes with Obstacles

In one aspect, a mapping system for an air space includes: a plurality of air vehicles each having a plurality of environmental sensors; a processor in at least one vehicle or in at least one communication tower (edge processor) to receive sensor data and create a 3D model of the air space from successive air vehicle sensor outputs.

Implementations may include one or more of the following. In another exemplary system for crowd-sourcing navigation data, a crowdsourcing server is in communication with a plurality of vehicles 1 . . . n. The vehicles performs peer-to-peer discovery and crowd-sourced navigation. The system receives proximity services for a group of vehicles traveling a predetermined route using peer-to-peer discovery, receives crowdsourcing data from said plurality of vehicles, sharing crowdsourcing data to the group of vehicles (or a subsequent group of vehicles) traveling the route of interest. Such information can be used in providing navigation guidance to the vehicle traveling the route using the crowdsourced data. In one aspect, the vehicles traveling the same route can be determined using a vehicle to vehicle communication protocol that facilitate identifying peers based upon encoded signals during peer discovery in a peer to peer network. The system can be WiFi or cellular based such as the Proximity Services, among others. In one embodiment, the identification of peers based upon encoded signals during peer discovery in a peer to peer network can be done. For example, direct signaling that partitions a time-frequency resource into a number of segments can be utilized to communicate an identifier within a peer discovery interval; thus, a particular segment selected for transmission can signal a portion of the identifier, while the remainder can be signaled based upon tones communicated within the selected segment. Moreover, a subset of symbols within the resource can be reserved (e.g., unused) to enable identifying and/or correcting timing offset. Further, signaling can be effectuated over a plurality of peer discovery intervals such that partial identifiers communicated during each of the peer discovery intervals can be linked (e.g., based upon overlapping bits and/or bloom filter information). The method can include transmitting a first partial identifier during a first peer discovery interval. Also, the method can comprise transmitting a second partial identifier during a second peer discovery interval. Further, the method can include generating bloom filter information based upon the combination of the first partial identifier and the second partial identifier. Moreover, the method can comprise transmitting the bloom filter information to enable a peer to link the first partial identifier and the second partial identifier. Another embodiment communicates using LTE Direct, a device-to-device technology that enables discovering thousands of devices and their services in the proximity of ~500 m, in a privacy sensitive and battery efficient way. This allows the discovery to be "Always ON" and autonomous, without drastically affecting the device battery life. LTE Direct uses radio signals—called 'expressions'—which can be private and discreet (targeted securely for certain audiences only) or public (transmitted so that any application can receive them). Public expressions are a common language available to any application to discover each other, and this is the door to consumer utility and adoption. Public expressions exponentially expand the field of value. For example, vehicles that share same driving segments can broadcast expressions indicating their path(s). The system detects vehicles in the same segment as part of the proximity services for capturing and sharing crowd-sourced navigation data. Public expressions combine all applications—all value—into one single network, thereby expanding the utility of the system.

In one aspect, the process includes detecting the closing of a lane using the crowdsourcing data; predicting an avoidance maneuver using the crowdsourcing data; predicting a congestion with respect to a segment of the route of the at least one vehicle using the crowdsourcing data; and predicting traffic light patterns using the crowdsourcing data. Implementation can include one of the following. The system can determine the presence of obstacles in a flight lane by monitoring a pattern of vehicle avoidance of a particular location of the lane. The obstacles can be a new tower or smoke from a recent volcano eruption, among others. The vehicular avoidance information can be sent to vehicles that are planning to use that particular road section to optimize. The system can share prior vehicle's avoidance maneuver by monitoring change of vehicle direction and distance traveled at a close vicinity of a location on the route of a lead vehicle; and determining an avoidance maneuver in response to a ratio of change of vehicle direction and distance traveled being less than a predetermined threshold value. The system can determine a route based at least in part on an amount of time predicted for travelling from a starting location to a destination location of the route using the crowdsourcing data; and determining a route based at least in part on a predicted fuel consumption of the route using the crowdsourcing data. The determining information corresponding to a route of interest to at least one vehicle further can include monitoring a distance traveled by the at least one vehicle after reaching a destination, and predicting availability of parking spaces at the destination based at least in part on the distance traveled; and monitoring an amount of time traveled by the at least one vehicle after reaching a destination, and predicting availability of parking spaces at the destination based at least in part on the amount of time traveled. The determining information corresponding to a route of interest to at least one vehicle further comprises: measuring a time taken to travel a predefined percent of the route until the at least one vehicle comes to a halt at a predetermined location; and predicting an average amount of time used to find parking at the predetermined location using the time taken to travel a predefined percent of the route. The determining information corresponding to a route of interest to at least one vehicle further comprises at least one of: determining popularity of a fueling station along the route; determining type of fuel sold at the fueling station along the route; determining popularity of a business along the route; and determining popularity of a rest area along the route.

Next, a system to crowd-source the updates of precision maps with data from smart vehicles is detailed. In embodiments, crowd-sourced obstacle data can be used to update a map with precision. Obstacles can be trees, poles, new buildings, among others. Crowd-sourced information is updated into the map and annotated by time, weather and periodicity. The detected obstacle information may include a geographic location of the vehicle and a predetermined map of the lane. The computer system may determine the geographic location of the obstacle by, for example, using a laser rangefinder or light detection and ranging (LIDAR) unit to estimate a distance from the obstacle to the at least two objects near the vehicle and determining the geographic location of the obstacle using triangulation, for example. Such information is updated into the map system and marked as temporal. During use, if recent vehicles take defensive driving around the temporary obstacle, the map adds the obstacles to the map for the route guidance module. If recent vehicles drive the lane as though the obstacle does not exist, the system removes the obstacle from the map database, but keeps track of the history in case it is a periodic obstacle. The obstacle information is also reported to government agency for repair/maintenance. In another embodiment, if vehicles fly through the lane with a smooth line or curve, but abruptly brakes, the system infers that the lane has obstacles, for example, and the bad infrastructure is reported for path planning (to add more travel time, or to change the route to avoid the bad lane infrastructure if it is long. The new information is used to update a digital map that lacks the current information or that contains inaccuracies or may be incomplete. The digital map stored in the map database may be updated using the information processed by a map matching module, matched segment module, and unmatched segment module. The map matching module, once it has received obstacle location and GPS traces, processes obstacle locations and GPS traces by matching them to a lane defined in the digital map. The map matching module matches the obstacles and the GPS traces with the most likely lane positions corresponding to a viable route through the digital map by using the processor to execute a matching algorithm. In one example, the matching algorithm may be a Viterbi matching algorithm. Where the GPS traces do match a lane defined in the digital map, the matched trace to which the GPS traces match and obstacle information are sent to the matched segment module for further processing as will be described below. Where the GPS traces do not match a lane defined in the digital map, the unmatched trace to which the GPS traces are correlated with and the obstacle position information are sent to the unmatched segment module for further processing. The matched segment module and unmatched segment module both provide metadata to the map updating module. The metadata may include obstacle metadata lane geometry refinement metadata, lane closure and reopening metadata, missing intersection metadata, missing lane data and one-way correction metadata. The map updating module updates the digital map in the map database.

The process to update maps using crowd-sourced data may begin with the unmatched segment module clustering the unmatched GPS traces received from the map matching module. Many available algorithms may be suitable for this process, but in one example, an agglomerative clustering algorithm that iteratively compares GPS traces with each other and combines those that fall within a predetermined tolerance into a cluster may be used. One example of such and algorithm uses the Hausdorff distance as its distance measure in the clustering algorithm. Once the cluster is selected, the unmatched segment module may produce a single lane geometry for a cluster of unmatched GPS traces using a centerline fitting procedure in which the single lane geometry describes a new lane segment with the obstacle which is not described in the current map database. In one example, a polygonal principal curve algorithm or a Trace Clustering Algorithm (TCl) algorithm can be used. The digital map can be modified to include the new lane, including possibly new intersections in the base map and any associated pointers or indices updated.

Autonomous Navigation with Unplanned Events or Obstacles

In one aspect, an obstacle detection system for an air space includes: one or more air vehicles each having a plurality of environmental sensors; a processor with a neural network in at least one vehicle or in at least one communication tower (edge processor) to receive sensor data and avoid the obstacle in the air space from sensor outputs.

Implementations may include one or more of the following. The vehicle generally follows its planned path, which is initially a linear path from point A to point B as guided by cameras, GPS, lidar/radar and the flight computer. The linear path becomes zig-zags or other non linear paths to handle known obstacles and then the linear path is resumed as that is the shortest distance, until the vehicle 10 encounters an unexpected obstacle as detected by cameras and sensors. Based mainly on camera detection but also through lidar/radar, the system can detect new obstacles that require a workaround of the flight plan. Once the unexpected obstacle (not in the flight plan submitted for approval) is detected, the system attempts to communicate with the obstacle using vehicle-to-vehicle ("V2V") communication. If there is no reply from the unknown obstacle, the obstacle may be a large bird or a human controlled drone whose intent can't be ascertained. If so, the system provides collision avoidance by modeling potential collisions based on algorithms taking into account vehicle size, speed, direction and wind load; and wind speed and direction. The operational data can include speed, direction, altitude, heading, and location of the vehicle, and wherein the future flight plan can be determined based on the size of the vehicle 10 and the vehicle 10 speed, direction, and wind load. The process can further include providing the flying lane assignment to the vehicle 10, wherein the flying lane assignment is selected from a plurality of flying lane assignments to maximize collision-free trajectories based on the static or dynamic obstruction. The vehicle 10 performs an evasive maneuver by slowing down, reversing course, moving above or below the obstacle, or a combination thereof, and the process can further include managing ground hold time for a plurality of vehicles 10 to manage airspace, i.e., minimize ground hold time for vehicles, safely maximize flight time for all airspace users. The evasive maneuver instructions utilize six degrees of freedom in movement of the vehicle. The changes can include instructions to change direction, instructions to change flying lane(s), instruction to land and where the vehicle should target for landing, full route modification with an emphasis on route optimization while avoiding the negative impact of the conflicting vehicles, instructions to speed up or slow down, instructions to change altitude, instructions to hold position for a specific or indefinite time period, instructions to move to a safe position away from the potential collision and either hold in the air or on the ground for a specific or indefinite time period, instructions to land very quickly, instructions to land very slowly, instructions to circle, and the like. When the obstacle is safely behind the vehicle 10, then the vehicle resumes its planned path.

The unplanned obstacle can be unexpected weather or terrorist attack, for example. The changes can include instructions to change direction, instructions to change flying lane(s), instruction to land and where the drone should target for landing, full route modification with an emphasis on route optimization while avoiding the negative impact of the weather event, instructions to speed up or slow down, instructions to change altitude, instructions to hold position for a specific or indefinite time period, instructions to move to a safe position away from the weather event and either hold in the air or on the ground for a specific or indefinite time period, instructions to land very quickly, instructions to land very slowly, instructions to circle, and the like. When the obstacle is safely behind the vehicle 10, the vehicle resumes its planned path.

If the obstacle can communicate via V2V, the vehicles can collaborate in a self-organizing traffic control system by creating an ad-hoc vehicle-based network facilitated by V2V communication. In this context, V2V communication enables development of an inter-vehicle control plan ("IVCP") that can resolve a travel-priority conflict in the potential-conflict zone which, if left unresolved, could result in a collision for flying vehicles. Generally, An IVCP includes a set of travel instructions that is communicated to vehicles participating in the ad-hoc network for the particular potential-conflict zone. For example, these instructions can include a sequence by which vehicles approaching from different directions may proceed through a potential-conflict zone, the speed at which vehicles approaching a conflict zone should be traveling, the lateral/vertical profiles of the flying vehicle so that conflict may be avoided using 3D solutions, and so forth. One important aspect of the IVCP is that the instructions are tailored for the specific vehicles participating in a conflict and are also coordinated with the other vehicles participating in the conflict so as to resolve the conflict without incident. Additionally, this coordination can assist with optimizing vehicle flow through a potential-travel-priority conflict zone as a function of traffic volume, flight lane conditions, known or predicted travel routes for vehicles near the conflict zone, and/or a priority status of one or more of such vehicles.

The method for autonomous navigation with unknown obstacle handling includes: submit a flight plan handling known obstacles for approval; obtain approval and travel using approved flight lane; detect incoming unexpected obstacle using camera, lidar, radar, and other sensors; interrogate approaching obstacle with V2V communication; if no reply, take evasive action to bypass obstacle, and else select a traffic coordinator TC (the selected communication tower or a lead vehicle if there is no communication tower); TC broadcasts status as the traffic coordinator and establishes an inter-vehicle traffic control plan ("IVCP"); TC communicates IVCP to the other vehicles approaching the potential-flight-conflict zone. Optionally, TC periodically re-broadcast its identity and re-broadcast the IVCP to confirm control of the potential-conflict zone and inform any newly arrived vehicles.

In one embodiment, a V2V communications system may be designed and configured to receive signals from at least one other vehicle within the ad-hoc vehicle-based network at issue that have the same or a similar V2V communications system. These signals can include information characterizing the type of vehicle, its weight, its speed, relevant traffic and weather conditions, the manner of approach of a vehicle, direction, latitude/longitude position, and a priority status for the vehicle, among many others. A V2V communications system may also be designed and configured to provide a communications link between vehicles approaching a potential travel-priority conflict zone in order to elect a traffic coordinator (or leader), collect data, and perform analyses so as to create the IVCP, as well as to communicate the IVCP to the participating vehicles.

In an example, if the obstacle causes a discontinuity to arise with respect to the planned flight lanes of one or more vehicles in the ad-hoc network, the system takes the following steps:
1. The discontinuity is identified;
2. Limitations are identified applicable to the end user's system and the source;
3. A navigational database is accessed to determine known waypoints that can be used to remove the discontinuity;
4. Create unique waypoint and maneuver instructions specific to each vehicle; and
5. Determine real time operational restrictions, and user preference, to generate specific communications protocols to invoke a flight information message free from discontinuities for all vehicles in the adhoc network.

Solutions by the TC can use Time-Based Flow Management, or TBFM, predicts what time all the flights will get to the point in the air where they start to change travel path a predetermined time before they get there. This key point in accurately predicting the arrival enables the TC to determine the most efficient schedule to get each flight to this spot. TBFM then builds a 4-dimensional (latitude, longitude, altitude and time) trajectory for each flight. That is, it decides the exact times the vehicle needs to be at certain intermediate points along the way in order to get to its scheduled time to begin to make its path change. Controllers receive these scheduled times and guide the flights so that each vehicle reaches its intermediate points at the right time while maintaining the required separation between the vehicles (time-based metering). The TC can delay flights slightly by assigning them a slower speed or a different altitude. Time-based metering is more effective the more airspace controllers have available. Adjacent Center Metering (ACM) increases the amount of airspace and time controllers can use to maneuver aircraft to meet their scheduled times of arrival and expands the benefits of time-based metering to aircraft that are farther away from the arrival airport.

Another implementation to solve the discontinuity facing members of the adhoc network is detailed next. This implementation plans a flight path of an aircraft based on a pigeon-inspired optimization (PIO) method as follows: establish trajectory prediction model with uncertainty; initialize the route to be optimized by the pigeon-inspired algorithm according to the route information in the specified area, and initialize the parameters such as the dimension D of the search space, pigeon population, iteration number, and geomagnetic factor R in the pigeon-inspired optimization algorithm; set the speed and position of each pigeon at random, calculate the fitness value according to the fitness function, find the current optimal path, and store each parameter of the current optimal path and solve the minimization problem of costs for a particular path; apply map and compass operator to update the speed and position of each pigeon; perform landmark operations, sort all pigeons according to fitness values, lower-adapted pigeons follow the adapted pigeons and find the center of the flock (destination), all pigeons will fly directly to their destination; determine whether the maximum number of iterations is reached, and if not, repeat the operation of map and compass and landmark until the number of iterations reaches the maximum number of iterations of landmark operator. More details are in Application 20190035286, the content of which is incorporated by reference.

Once the traffic coordinator creates the IVCP and communicates to vehicles approaching a potential-travel-priority-conflict zone in the above-described steps, the vehicles can then participate in the IVCP. In one example, IVCP instructions are communicated to the vehicles participating in the ad-hoc vehicle-based network corresponding to the potential-travel-priority-conflict zone by providing each vehicle with a virtual traffic control to change speed, lateral/vertical profile of the vehicle.

There are occasions that all vehicles must yield to a priority vehicle (fire/ambulance, among others). The method includes resolving a potential vehicular travel-priority conflict by: communicating with approaching vehicles so as to collect data relevant to an incipient conflict, creating an IVCP to avoid or resolve the conflict, communicating the IVCP to the vehicles participating in the potential conflict, receiving a priority-request message from a priority vehicle proximate to the potential conflict, and transmitting a priority-granted message to the priority vehicle.

The navigation may be implemented in the IVC system with a processor in communication with a network that is generally: 1) programmed with instructions for performing steps of a method of the present disclosure; 2) capable of transmitting, receiving, and/or storing data necessary to execute such steps; and 3) capable of providing any user interface that may be needed for a user to interact with the system, including setting the system up for a vehicle priority managing session, among other things. Those skilled in the art will readily appreciate that aspects of the present disclosure can be implemented with and/or within any one or more of numerous devices, ranging from self-contained devices, such as dedicated IVC devices that are either mobile or permanently mounted to vehicles, mobile phones, smartphones, tablet computers, laptop computers, to networks each having two or more of any of these devices, among others. Fundamentally, there is no limitation on the physical construct of An IVC system, as long as it can provide one or more of the features and functionality described herein. In some embodiments, depending on specific implementation, one or more steps of method and/or any other method(s) incorporating features/functionality disclosed herein may be implemented substantially in real-time. The network can be a Cellular V2X (C-V2X) is a 3GPP standard describing a technology to achieve the V2X requirements. C-V2X is an alternative to 802.11p, the IEEE specified standard for V2V and other forms of V2X communications. An alternative to cellular V2X technology is dedicated short-range communications ("DSRC") technology. The system can also use both or any other V2V communication standards.

The IVC system may include, for example, a V2V communications system, a processor, IVC software, a physical memory, a user interface, and an optional vehicle interface. These elements can be used together, in whole or in part, to create an IVCP, communicate An IVCP to other vehicles, receive An IVCP from another vehicle, and execute the instructions supplied by the IVCP, depending on the configuration of the IVC system and the needs of the particular IVCP ad-hoc vehicle-based network under consideration. The IVC system can also optionally include an on-board location database and/or a travel-route database. The V2V communications system may be configured to transmit and receive signals communicating IVCP instructions using any one or more of a variety of protocols. For example, a V2V communications system may broadcast signals transmitting IVCP instructions periodically from a vehicle through a process known in the art as "beaconing." As part of the beaconing process, the information described above is communicated at regular intervals and throughout a given geographic area surrounding the vehicle performing the beaconing. Beaconing signals may include, for example, velocity, heading, vehicle type, acceleration (using an in-vehicle accelerometer), vehicle priority status, a network address or other network identifier for the originator, a unique beacon-signal identifier, a timestamp, a lane identifier, and/or an indication of whether the originator is currently a traffic coordinator, among others. In one specific example, beaconing can utilize a beacon packet with the following composition: ||Packet Type|Unique Packet ID|Timestamp|Unique Vehicle Address ID|Coordinates|Direction|Vertical Profile|Horizontal Profile|Speed|VTL Leader||. These beaconing signals (e.g., packets) can be received and/or retransmitted by another IVC system similar to the originating system through a V2V system. Furthermore, beaconing signals can be used in cooperation with an onboard location database. The use of a location database with periodically repeated beaconing signals can permit an IVC system to track the location of proximate vehicles. Even further, when a location database and beaconing signals are used along with a travel-route database, An IVC system can anticipate travel-priority conflict zones because the system is informed of, at the minimum, the location and velocity of proximate vehicles in the context of known travel-routes. In some examples, this can permit An IVC system to adapt to local vehicle densities and to anticipate, and accommodate, density trends.

The V2V communications system may also or alternatively be designed and configured to transmit and receive signals using non-beaconing protocols as well, such as signals transmitted to or from another proximate vehicle directly, for example using a handshake, push, or pull protocol, among others. Or, in yet another example, the above-described signals can be communicated between vehicles using a method known in the art as "Geocasting." In this method, vehicles can communicate with other vehicles regionally proximate but out of DSRC range by using intervening vehicles as transponders that propagate the DSRC signal. Those skilled in the art will appreciate that beaconing, Geocasting, and direct transmission are but a selection of the many existing techniques that can be used in connection with the teachings of the present disclosure.

As noted above, IVC system may optionally include a vehicle interface that can interact directly with the operative functionality of the vehicle, such as in a semi-autonomous or fully autonomous vehicle or in autonomous flying methods, thereby automatically implementing the IVCP little to no input from the vehicle operator, if any. For example, upon receipt or creation of An IVCP, a vehicle interface may, through operative connections to the various vehicle systems (e.g., propulsion, steering, braking, directional signal, etc.) direct the vehicle to conform to the IVCP. A vehicle interface can also provide vehicle data and information in order to better inform an IVC system in the creation of the IVCP. For example, a vehicle interface can provide velocity, heading, vertical/lateral profile, vehicle type, acceleration (using an in-vehicle accelerometer), vehicle priority status, and other information relevant to the creation of the IVCP to a processor in the IVC system. This information can then be used by the processor in cooperation with IVC software to create an IVCP. Of course, this information may also be communicated via a V2V communications system to another vehicle, such as one that has been elected as a traffic coordinator and charged with creating the IVCP.

When two or more vehicles meet at a conflict zone, the IVC systems of the vehicles communicate with each other in order to establish an IVCP that utilizes an ad-hoc communication network usable to resolve travel-priority conflicts. In one example, the vehicles communicate with each other using DSRC that can use IEEE 802.11(p) communication protocol via DSRC-capable radios in order to receive and transmit relevant information. Other examples of methods by which vehicles can communicate include other radio-frequency communication protocols, cellular communications (including 1G-5G, etc.), Wi-Fi, Wi-Fi enabled internet, WiMAX, laser or other light-based communication or data transfer, and others, as well as combinations thereof.

A variety of inputs can be used to identify anticipated priority conflicts and establish the IVCP that is subsequently communicated to the other vehicles approaching the travel-priority conflict zone. For example, one type of input includes vehicle-specific metrics. Such metrics may include, but are not limited to, velocity of travel, vertical/lateral profile, distance from the conflict zone, vehicle weight, indicia of traffic congestion, vehicle type, vehicle priority, and direction of travel. Other types of inputs can include known travel-route features stored in a travel-route database and/or predicted travel-route features derived therefrom. Flying vehicles approaching a potential travel-conflict zone communicate with each other, using one or more of the methods and systems described above, to get commands from a designated cell tower that can provide a coordinated set of IVCP instructions to vehicles participating in the ad-hoc vehicle-based network established to avoid any real conflicts that could occur in the potential travel-priority conflict (traffic coordinator). Alternatively, the traffic coordinator can be elected from among candidates in the ad-hoc vehicle-based network based on any one or more of a number of different factors, including those factors that indicate the ability to stop safely before a conflict zone, the ability to influence the traffic flow through the conflict zone, the traffic density on the various approaches to the travel-priority conflict zone, past waiting times, and others. For example, a subset of candidates for coordinators may be identified as those leading their respective queue of vehicles on a given approach to a priority-conflict zone. In this example, these vehicles will be the first to arrive at the conflict zone, and are therefore more likely to be in communicative contact with vehicles approaching the conflict zone from other directions. This arrangement facilitates, but is not required for, V2V communication. Furthermore, those vehicles leading their respective queues can prevent the vehicles trailing them from proceeding further, thereby controlling the vehicular traffic flow if so required by the IVCP. Other factors that can be used to elect the coordinator include, for example, the ability to hover safely before entering the potential travel-priority-conflict zone, the presence of possible barriers to V2V communication, a priority status of one or more vehicles approaching the potential conflict zone, referred to herein as a "priority vehicle" (e.g., emergency-service vehicles, mass-transit vehicles, vehicles involved in a funeral procession, etc.), traffic planning policies favoring higher traffic flow in a given direction.

In one embodiment to optimize traffic flow over a geographic area containing many actual, anticipated, or potential travel priority conflicts, an intersection-based communication device/sensor can inform the IVC system by providing traffic-related information or by providing recommended route information, as supplied by a central coordinator (ground control or lead vehicle, among others). For example, either through communication methods described above (including beaconing and Geocasting, among others), or through information collected directly using techniques well known to those skilled in the art, an intersection-based communication device/sensor can gauge the degree of proximate congestion. This information can then be communicated using any communication method known to those skilled in the art, including both wired and wireless techniques, to the central coordinator. The central coordinator, having been provided with analogous information from other travel-priority conflict zones over a geographic area containing a plurality of such zones, can provide one or more intersection-based communication devices/sensors with, for example, recommended directions for some or all of associated IVCPs, which may be determined as a function of one or more priority vehicles' travel-routes, positions, and/or other information received from and/or otherwise regarding one or more priority vehicles. These recommendations can then be communicated from the intersection-based communication device/sensor to one or more IVC systems using the techniques and methods previously described. Furthermore, the central coordinator can use information collected not only to provide information to An IVC system to inform its decision making process, such as by providing a known route for a priority vehicle received from an independent entity, such as a fire-house, police station, or municipal government, but the central coordinator can also dictate instructions to IVC systems, thereby centralizing coordination of traffic flow.

The traffic coordinator (the selected communication tower or a lead vehicle if there is no communication tower) can broadcast its status as the traffic coordinator and once elected, the coordinator can establish an IVCP, as described above, and communicate it to the other vehicles approaching the potential-travel-priority-conflict zone. Optionally, the coordinator can periodically re-broadcast its identity as traffic coordinator and re-broadcast the IVCP to confirm control of the potential-conflict zone and inform any newly arrived vehicles.

Once the traffic coordinator creates the IVCP and communicates to vehicles approaching a potential-travel-priority-conflict zone in the above-described steps, the vehicles can then participate in the IVCP. In one example, IVCP instructions are communicated to the vehicles participating in the ad-hoc vehicle-based network corresponding to the potential-travel-priority-conflict zone by providing each vehicle with a virtual traffic control to change speed, lateral/vertical profile of the vehicle to establish the IVCP.

In some embodiments, IVC systems can include mechanisms that allow certain vehicles to have higher priority than other vehicles in having the right of way at intersections. This embodiment would, for example, facilitate and expedite the motion of priority vehicles through traffic in urban areas in the case of an emergency and/or in another type priority situation. To enable such a priority scheme, one or more of two mechanisms may be utilized: detection of a priority vehicle when it approaches and leaves an intersection and a priority assignment scheme. In some embodiments, prioritization may involve three or more levels of priority. For example, in one scheme, three priority levels are provided: a highest priority for emergency vehicles en route to an emergency, an intermediate priority for mass-transit vehicles carrying multiple passengers, and lowest priority for private passenger cars. In this example, the IVC system clears the route for the highest priority vehicles as quickly and efficiently as possible, overriding any normal IVCP to create a high-priority IVCP. For intermediate-priority vehicles, the IVC system may weigh the travel directions and/or lanes containing mass-transit vehicles in a manner that allows each of those travel directions and/or lanes to clear more quickly than they would if a non-priority vehicle were present in place of each mass-transit vehicle.

In order to allow for detection of a priority vehicle, upon approaching a travel-priority conflict zone, a priority vehicle may periodically broadcast a priority-request message to announce its presence and demand for priority until it receives a priority-granted message from a traffic coordinator.

The IVC system, such as an IVC system of an elected traffic coordinator, may receive a priority-request message from the priority vehicle, and, the IVC system may transmit a priority-granted message to the priority vehicle. Priority-request messages and priority-granted messages may contain substantially the same or similar information to a beaconing signal, though they may additionally or alternatively contain an indication of the priority level of the priority vehicle (e.g., emergency priority status, public transit priority status, funeral procession priority status, etc.), travel-route information for the priority vehicle, network identifiers for any current and/or past priority vehicles that have been granted priority and/or traffic coordinators that have granted priority, and/or one or more potential-conflict zone identifiers. Notably, in some embodiments, a traffic coordinator may additionally or alternatively detect the presence of the priority vehicle by analyzing beaconing signals originating from the priority vehicle, which may in some embodiments contain any of the information that may otherwise be contained in priority-request messages. After receiving a priority-granted message, the priority vehicle may be required to inform one or more other vehicles, such as a current traffic coordinator, of its departure from a given potential-conflict zone via a priority-clear message so that any vehicles proximate to the zone can resume standard IVCP operation. Priority-clear messages may contain substantially the same or similar information to a beaconing signal, though either may additionally include a potential-conflict zone identifier. In order to provide a priority-clear message, when a priority vehicle exits or is within a certain time or distance of exiting a potential-conflict zone, it may periodically broadcast a priority-clear message for a period of time, which An IVC system on the priority vehicle may determine as a function of the priority vehicle's location and/or velocity, the nature of the potential-conflict zone, and/or other similar parameters. If priority-clear messages do not reach the intended recipient(s), such as an elected traffic coordinator, the IVC system of the traffic coordinator can deduce the departure of the priority vehicle by detecting an absence of beaconing signals originating from the priority vehicle for a certain period of time (i.e., a time-out period).

Tiered Ground Control and Air Traffic Control

In one aspect, an air control system includes a network of communication towers with ground control modules thereon; a traffic control computer; a plurality of air vehicles each providing flight plans with travel segments in advance to the traffic control computer for approval, wherein the traffic control computer shares approved flight plans to the ground control modules positioned in each travel segment for tracking the vehicle and performing local air traffic control.

Implementations may include one or more of the following. The control is hierarchical, from national to state to city to city zones. The flight plan can include flight lanes as defined below. A flight plan conflict controller can arbitrate conflicting plans whose paths collide.

The ATC can include obstacle detection system for an air space includes: one or more air vehicles each having a plurality of environmental sensors; a processor with a neural network in at least one vehicle or in at least one communication tower (edge processor) to receive sensor data and identify the obstacle in the air space from sensor outputs.

FIG. 1I shows an exemplary ground based communication towers with air traffic control (ATC) capability for the vehicles 10 using the electronics of FIG. 1H. Together, the ATC 89 and flight control of the vehicles 10 can provide flight management, for example, separation assurance between vehicles 10; navigation assistance; weather and obstacle reporting; monitoring of speed, altitude, location, direction, etc.; traffic management; landing services; and real-time control.

The ATC 89 can be part of the flight control in the vehicle, and also can be external operated by the local ground control station (GCS), or a combination of internal and external ATC 89 for redundancy in coverage. The ATC 89 can be tiered where control can be done at the cell level, city level, state level, or national level, among others. One of the cellular towers can be the local ground control station communicably coupled to the at least one vehicle. Specifically, the GCS may include communication means (such as a transceiver) to communicate with the vehicle via a network, such as radio network. Optionally, the network may be a bidirectional network to facilitate two-way communication therethrough. In another embodiment, the GCS may be a mobile device (such as a remote-control device) communicably coupled to the at least one vehicle. According to an embodiment, the GCS may include equipment such as processors, memory, display screens, and so forth.

In an embodiment, operation of the at least one vehicle may be controlled completely autonomously using on-board computers. In another embodiment, operation of the at least one vehicle may be controlled at least partially by the Ground Control Station. In such embodiment, a human operator at the GCS may operate the at least one vehicle. In the external ATC 89 GCS embodiment, the vehicle 10 flies from cell to cell and receives navigation assistance/command from one of the cell towers designated as a controller. The controller communicates with one server 92. In FIG. 1I, exemplary three cell towers provide associated cell coverage areas for describing location determination of the vehicle 10. Typically, for a cell site, in rural locations, the coverage areas can be about 5 miles in radius whereas, in urban locations, the coverage areas can be about 0.5 to 2 miles in radius. One aspect of the ATC 89 is to maintain a precise location at all time of the vehicles. This can be accomplished in a plurality of ways, including a combination of techniques such as triangulation based on the multiple cell towers, location identifiers from GPS/GLONASS transmitted over the cell network from vehicles, sensors in the vehicle 10 for determining altitude, speed, etc., and the like.

Server 92 is distributed and shares information on each cell. The maintained data can include current battery and/or fuel status for each of the plurality of vehicles 10, and wherein the processing for the delivery application authorization and management can include checking the current battery and/or fuel status to ensure the sufficiency to provide a current delivery, for each of the plurality of vehicles 10. The maintained data can include photographs and/or video of a delivery location, and wherein the processing for the delivery application authorization and management can include checking the delivery location is clear for landing and/or dropping a package, for each of the plurality of vehicles 10. The maintained data can include photographs and/or video of a delivery location, and wherein the processing for the delivery application authorization and management comprises, for each of the plurality of vehicles 10, checking the delivery location for a delivery technique including one of landing, dropping via a tether, dropping to a doorstep, dropping to a mailbox, dropping to a porch, and dropping to a garage. The plurality of vehicles 10 can be configured to constrain flight based on coverage of the plurality of cell towers. The constrained flight can include one or more of pre-configuring the plurality of vehicles 10 to operate only where the coverage exists, monitoring cell signal strength by the plurality of vehicles 10 and adjusting flight based therein, and a combination thereof.

The server 92 can act as the ATC. One function performed by the ATC 89 is separation assurance through altitude and flying lane coordination in addition to the aforementioned air traffic control functions, package delivery authorization and management, landing authorization and management, etc. As the ATC 89 has monitored data from various vehicles 10, the ATC 89 can keep track of specific flight plans as well as cause changes in real time to ensure specific altitude and vector headings, i.e., a flight lane. For example, the ATC 89 can include a specific geography of interest, and there can be adjacent ATCs that communicate to one another and share some overlap in the geography for handoffs. The ATC 89 can make assumptions on future flight behavior based on the current data and then direct vehicles 10 based thereon. The ATC 89 can also communicate with commercial aviation air traffic control systems for limited data exchange to ensure the vehicles 10 does not interfere with commercial aircraft or fly in no-fly zones. The server's method of communicating flight data between a plurality of systems can include receiving data indicative of flight objects. Flight information is extracted from the flight objects and rendered for viewing and editing along with real time airspace environment data pertaining to the flight information. Modifications to the flight information are received and updates to the flight objects are generated. Messages representative of the updated flight objects are generated that are compatible with subscriber systems. The generated messages are communicated to the subscriber systems across the one or more networks.

The systems and methods provide a hierarchical monitoring approach where zones or geographic regions of coverage are aggregated into a consolidated view for monitoring and control. The zones or geographic regions can provide local monitoring and control while the consolidated view can provide national monitoring and control in addition to local monitoring and control through a drill-down process. A consolidated server can aggregate data from various sources of control for zones or geographic regions. From this consolidated server, monitoring and control can be performed for any vehicle 10 communicatively coupled to a wireless network.

In one embodiment, a national level server 92 runs code to: communicate with a plurality of local servers each configured to communicate with a plurality of vehicles 10 in a geographic or zone coverage; consolidate data from the plurality of local servers to provide a summary of successively larger geography having a plurality of geographic or zone coverages; provide the summary data via a Graphical User Interface (GUI); and perform one or more functions via the GUI for air traffic control and monitoring at an individual vehicle 10 level or group level as desired.

The geographic boundary can be based on zip codes, county or township boundaries, geometric shapes, etc. The process 2300 can include coordinating the data and analyzing between servers which manage adjacent regions. The process 2300 can include determining a plurality of flying lanes including lanes which are fully within a single geographic region and lanes which traverse a plurality of geographic regions; and routing the one or more vehicles 10 in corresponding flying lanes. The process can include handing off control of specific vehicles 10 between servers based on transit in the lanes which traverse a plurality of geographic regions. The one or more vehicles 10 are routed to corresponding flying lanes to maximize collision-free trajectories based on static obstructions, minimize travel time, and manage congestion in the geographic region. The process can include receiving flight data from the one or more vehicles 10; and updating air traffic, congestion, and obstructions based on the flight data. The one or more vehicles 10 each can include an antenna communicatively coupled to the one or more wireless networks, and wherein the flight is constrained based on the antenna monitoring cell signal strength during the flight and adjusting the flight based therein whenever the cell signal strength is lost or degraded.

In a further embodiment, a drone air traffic control system includes a processor and a network interface communicatively coupled to one another; and memory storing instructions that, when executed, cause the processor to: communicate to one or more Unmanned Aerial Vehicles (vehicles 10) via one or more wireless networks to manage vehicle 10 flight in a geographic region of a plurality of geographic regions, wherein the air traffic control system has one or more servers configured to manage each geographic region which is predetermined based on a geographic boundary, wherein the one or more vehicles 10 are configured to maintain their flight in the plurality of geographic regions based on coverage or connectivity to the one or more wireless networks; obtain data related to the one or more vehicles 10, wherein the data includes flight operational data, flight plan data, and sensor data related to obstructions and other vehicles 10; analyze and storing the data for each geographic region; and manage flight of the one or more vehicles 10 in corresponding geographic regions based on the data.

Waypoint Management

In one aspect, a flight management system includes: a flight planning system that defines a trip as composed of one or more waypoints connected by one or more flight lanes, and wherein each vehicle has a plurality of environmental sensors; a processor with a neural network in at least one vehicle or in at least one communication tower (edge processor) to receive sensor data and to monitor vehicle passage through planned waypoint(s).

In another aspect, a flight management system for an air space includes: a map system that divides air space into layers of grids, each grid supporting a lane of air travel for one or more air vehicles; a processor with a neural network in at least one vehicle or in at least one communication tower (edge processor) to receive sensor data and to center the vehicle in the lane from sensor outputs, and further to navigate all waypoints in a flight plan.

Implementations may include one or more of the following. A waypoint is a reference point in physical space used for purposes of navigation for vehicles 10. Waypoints on mapping programs provide a convenient mechanism to show location, start and end points, etc. The plurality of waypoints each includes a latitude and longitude coordinate defining a point about which an area is defined for covering a portion of the geographic region. The size of the area can be based on whether the area covers an urban region, a suburban region, and a rural region in the geographic area, wherein the size is smaller for the urban region than for the suburban region and the rural region, and wherein the size is smaller for the suburban region than for the rural region. Each of the plurality of waypoints can include an altitude range set based on flight altitudes of the plurality of vehicles 10.

The waypoints can be used to provide operators and pilots visual information related to one or more vehicles 10. The waypoints can also be managed by the ATC 89 which uses one or more wireless networks and by associated vehicles 10 in communication with the air traffic control system. The waypoints can be defined based on the geography, e.g., different sizes for dense urban areas, suburban metro areas, and rural areas. The ATC 89 can maintain a status of each waypoint, e.g., clear, obstructed, or unknown. The status can be continually updated and managed with the vehicles 10 and used for routing the vehicles 10.

In an embodiment, the ATC uses a plurality of waypoints to manage air traffic in a geographic region. Again, waypoints are sets of coordinates that identify a point in physical space. The waypoints can include longitude and latitude as well as an altitude. For example, waypoints can be defined over some area, for example, a square, rectangle, hexagon, or some other geometric shape, covering some amount of area. The waypoints can cover a set area, such as every foot to hundred feet or some other distance. In an embodiment, waypoints can be set between 1' to 50' in dense urban regions, between 1' to 100' in metropolitan or suburban regions, and between 1' to 1000' in rural regions. Waypoints can also include an altitude. For UAV flights generally constrained to several hundred feet, the waypoints can either altitude or segment the altitude in a similar manner as the area. For example, the altitude can be separated in 100' increments, etc. Accordingly, the defined waypoints can blanket an entire geographic region for management. The waypoints can be detected by the vehicles 10 using location identification components such as GPS. A typical GPS receiver can locate a waypoint with an accuracy of three meters or better when used with land-based assisting technologies such as the Wide Area Augmentation System (WAAS).

The flight plan includes defining the flight paths based on specifying two or more waypoints of the plurality of waypoints. A flight path can be defined by one of specifying a start waypoint and an end waypoint and allowing a vehicle 10 to determine a path therebetween locally; and specifying a start waypoint and an end waypoint and a plurality of intermediate waypoints between the start waypoint and the end waypoint. The waypoint management method can score for the plurality of waypoints to determine the reliability and accuracy of the updates. The ATC 89 can include an obstruction database comprising a data structure for each of the plurality of waypoints defining a unique identifier of a location and the obstruction status, and wherein the obstruction status comprises one of clear, obstructed, and unknown. The waypoint management can update the obstruction status for each of the plurality of waypoints in the obstruction database based on the received updates.

The ATC 89 and the vehicles 10 can use the waypoints for various purposes including i) flight path definition, ii) start and end point definition, iii) tracking of vehicles 10 in flight, iv) measuring the reliability and accuracy of information from particular vehicles 10, v) visualizations of vehicle 10 flight, and the like. For flight path definition, the waypoints can be a collection of points defining how a particular vehicle 10 should fly. In an embodiment, the flight path can be defined with waypoints across the entire flight path. In another embodiment, the flight path can be defined by various marker waypoints allowing the particular vehicle 10 the opportunity to determine flight paths between the marker waypoints locally. In a further embodiment, the flight path is defined solely by the start and end waypoints, and the vehicle 10 locally determines the flight path based thereon.

The intermediate waypoints are monitored and used to manage the vehicle 10 in flight. In an embodiment, the vehicle 10 can provide updates to the ATC 89 based on obstruction detection as described herein. These updates can be used to update the status of the waypoint directory in the DB. The ATC 89 can use the waypoints as a mechanism to track the vehicles 10. This can include waypoint rules such as no vehicle 10 can be in a certain proximity to another vehicle 10 based on the waypoints, speed, and direction. This can include proactive notifications based on the current waypoint, speed, and direction, and the like.

In an embodiment, waypoints can be used for measuring the reliability and accuracy of information from particular vehicles 10. Again, the waypoints provide a mechanism to define the geography. The Air traffic control system 300 is configured to receive updates from vehicles 10 about the waypoints. The ATC 89 can determine the reliability and accuracy of the updates based on crowd-sourcing the updates. Specifically, the Air traffic control system 300 can receive an update which either confirms the current status or changes the current status. For example, assume a waypoint is currently clear, and an update is provided which says the waypoint is clear, then this vehicle 10 providing the update is likely accurate. Conversely, assume a waypoint is currently clear, and an update is provided which says the waypoint is now obstructed, but a short time later, another update from another vehicle 10 says the waypoint is clear, this may reflect inaccurate information. Based on comparisons between vehicles 10 and their associated waypoint updates, scoring can occur for the vehicles 10 to determine reliability and accuracy. This is useful for the ATC 89 to implement status update changes—preference may be given to vehicles 10 with higher priority.

In another embodiment, an Air Traffic Control (ATC) system for Aerial Vehicles 10 includes a network interface and one or more processors communicatively coupled to one another, wherein the network interface is communicatively coupled to a plurality of vehicles 10 via one or more wireless networks; and memory storing instructions that, when executed, cause the one or more processors to communicate with a plurality of vehicles 10 via one or more wireless networks comprising at least one cellular network; receive updates related to an obstruction status of each of a plurality of waypoints from the plurality of vehicles 10, wherein the plurality of waypoints are defined over a geographic region under control of the ATC 89 system; and manage flight paths, landing, and take-off of the plurality of vehicles 10 in the geographic region based on the obstruction status of each of the plurality of waypoints.

In a further embodiment, a non-transitory computer-readable medium comprising instructions that, when executed, cause one or more processors to perform steps of communicating with a plurality of vehicles 10 via one or more wireless networks comprising at least one cellular network; receiving updates related to an obstruction status of each of a plurality of waypoints from the plurality of vehicles 10, wherein the plurality of waypoints are defined over a geographic region under control of the ATC 89 system; and managing flight paths, landing, and take-off of the plurality of vehicles 10 in the geographic region based on the obstruction status of each of the plurality of waypoints.

Airway Management

In one aspect, an airway management system for an air space includes: a map system that divides air space into layers of grids, each grid supporting an airway of air travel for one or more air vehicles each having a plurality of environmental sensors; a processor with a neural network in at least one vehicle or in at least one communication tower (edge processor) to receive sensor data and to center the vehicle in the airway from sensor outputs.

Implementations may include one or more of the following. Each airway can be registered to landmarks on a physical map for recognition and correlation. For example, 3D airspace maps from 3Dairspace.org can be used. Google Earth is loaded on your computer, you only need to double-click to launch the map inside Google Earth and see airspace classifications in 2D or 3D. The system can use the FAA's geoTIFF files of its sectional charts. Inserting the geoTIFF into a CAD program can provide the exact position of a project on the sectional chart with the FAA file containing the geoTIFF, an HTML help file, and a TFW positioning file.

The vehicle 10 can use data from camera and lidar/radar to center itself in the assigned airway. The airway is specified in 3D coordinates as a series of vectors that the vehicle 10 can follow. Airways are geographical paths for flight and are created, managed, and assigned by the ATC 89. In an embodiment, the airway are based on Federal Aviation Administration (FAA) input, policies, and standards. The airway are dynamically managed and modified based on the FAA input, other air traffic, weather, obstructions, and the like. The ATC 89 can be configured to route vehicles 10 to and from airway including based on dynamically changing airway, and to keep lateral separations between vehicles operating in the same airway or at the same altitude and in the same proximity or geography, and with collision avoidance through ATC 89 over wireless networks.

In another embodiment, multiple ATC 89 systems can manage vehicles 10 over a geographic region with existing wireless networks providing connectivity to the vehicles 10. For example, the boundaries can be based on Zip code boundaries or some other existing boundary. The multiple ATC 89 systems can manage vehicles 10 in their region based on these boundaries, coordinate vehicle 10 traffic between regions, provide redundant coverage for adjacent regions, etc. Also, with the boundaries, the ATC 89 systems can develop, manage, and integrate airway with the boundaries.

For lateral separations between vehicles operating in the same airway or at the same altitude and in the same proximity or geography, the distance between vehicles 10 is standardized and set based on the purpose of a particular flying airway. For example, the airway may be an entry and exit airway allowing for vehicles 10 taking off to enter the ATC 89, an intermediate airway that allows for some speed but also puts vehicles 10 in a position to move into an entry/exit airway, a high-speed airway (express) at a higher altitude allowing for vehicles 10 to quickly reach their destination, and the like.

In an embodiment, standard distances between vehicles 10 may be closer in lower altitude/entry and exit airways where vehicle 10 speeds may be lower than higher altitude airways. Standard distances between vehicles 10 may be further in high altitude airways due to increased speed of the vehicles 10 and allow for more time for speed and course corrections and to avoid collisions.

The distance between vehicles 10 can be changed at any time and new instructions sent to vehicles 10, from the ATC 89 via the wireless networks 302, 304, to require speed changes or to hold position. The new instructions can be based on changes in weather and more specifically storms and rain, changes in wind speed and dealing with imprecise wind speed forecasts that impact drone speed and fuel usage (battery, gas), obstructions entering or expected to enter the flying airway(s), a vehicle 10 experiencing a problem such as limited battery power or fuel left, temporary flight restrictions that may include restricted airspace, and the like.

The lateral separation accounts for vehicles 10 entering and leaving airway to account for the required takeoff, landing, and possible hovering or delivery of products by vehicles 10 that must exit airway to achieve their objectives. All communications to and from vehicles 10 occur over the wireless networks to and from the ATC 89 and/or backup ATC centers. The airspeed for vehicles 10 can be measured and/or authorized in knots and/or miles per hour (mph) within and outside of the airway to achieve appropriate lateral separations within the airway. The objective of these procedures is to ensure safe and efficient drone flights in the United States airspace.

The plurality of airways can include airways for entry and exit allowing the one or more vehicles 10 to take off or land, airways for intermediate flight which are positioned adjacent to the airways for entry and exit, and airways for high speed at a higher altitude than the airways for intermediate flight. Distances between vehicles 10 can be set closer in the airways for entry and exit than in the airways for intermediate flight than in the airways for high speed. The new instruction can be based on a change in weather comprising storms or rain. The new instruction can be based on a change in wind speed and based on wind speed forecasts and associated impact on one or more vehicles 10 and their fuel usage. The new instruction can be based on obstructions entering or expected to enter the flying airway.

In another embodiment, an air traffic control system includes one or more servers each comprising a network interface, a processor, and memory; and a database communicatively coupled to the one or more servers, wherein the network interface in each of the one or more servers is communicatively coupled to one or more vehicles via a plurality of wireless networks at least one of which comprises a cellular network, wherein a plurality of airway are defined and standardized in the geographic region each based on a specific purpose, and wherein the one or more servers are configured to communicate to the one or more vehicles 10 over the one or more wireless networks; determine an associated airway of the plurality of airway for each of the one or more vehicles 10; communicate the associated airway to the one or more vehicles 10 over the one or more wireless networks; receive feedback from the one or more vehicles 10 via one or more wireless networks during flight in the associated flying airway; and provide a new instruction to the one or more vehicles 10 based on the feedback.

Navigation methods can receive an associated airway of the plurality of airway from the air traffic control system over the one or more wireless networks; provide feedback to the air traffic control system via the one or more wireless networks during flight in the associated flying airway; receive a new instruction from the air traffic control system based on the feedback; and implement the new instruction.

Flight Planning

In one aspect, a neural network is trained to generate flight plans from historical data. In another aspect, a vehicle includes: one or more air vehicles each having a plurality of environmental sensors; a processor with a neural network in at least one vehicle or in at least one communication tower (edge processor) to receive sensor data and follow a pre-approved flight plan based from sensor outputs.

Implementations may include one or more of the following.

Flight planning is the process of producing a flight plan to describe a proposed aircraft flight. It involves two safety-critical aspects: fuel calculation, to ensure that the aircraft can safely reach the destination, and compliance with air traffic control requirements, to minimize the risk of midair collision. In addition, flight planners normally wish to minimize flight cost through appropriate choice of route, height, and speed, and by loading the minimum necessary fuel on board. Air Traffic Services (ATS) use the completed flight plan for separation of aircraft in air traffic management services, including tracking and finding lost aircraft, during search and rescue (SAR) missions.

In one implementation, historical flight data, along with air traffic controller instructions are provided to a deep learning network, which after training, predicts the flight path based on history. The system predicts flown route based on direct-to and heading instructions as the training data follow reality that controllers like to minimize the number of instructions to pilots. The future trajectory of the vehicle is modeled as a sequence of 4D coordinates that are correlated with its realized trajectory, last filed flight plan, which is a sequence of 2D waypoints, and weather conditions in the vicinity. One implementation is designed as a "sequence to sequence learning" problem, in which the input sequence is the flight plan and the output is the actual flight trajectory. The sequential learning problem is solved by an encoder-decoder recurrent neural network structure, where the encoder learns from the flight plan and the decoder integrates the weather information and recursively "translates" the embedded flight plan information into a full 4D trajectory. Convolution layers can be used into the decoder network pipeline to extract representations from the high-dimension weather features.

A neural network examines flight data and is trained to generate one or more flight plan for a single flight. The system can generate an electronic plan for air traffic control and a plan for direct download into an onboard flight management system. The flight planning system is to calculate how much energy (battery or gas) is needed in the air navigation process by an aircraft when flying from an origin to a destination. The vehicle must also carry some reserve fuel to allow for unforeseen circumstances, such as an inaccurate weather forecast, or ATC traffic control requiring an aircraft to fly at a lower-than-optimal altitude due to congestion, or the addition of last-minute passengers whose weight was not accounted for when the flight plan was prepared. There is often more than one possible route between two airports. Subject to safety requirements, costs are minimized by appropriate choice of route, speed, and height.

Vehicles fly on airways under the direction of air traffic control. An airway has no physical existence, but can be thought of as a motorway in the sky. On an ordinary motorway, cars use different airways to avoid collisions, while on an airway, aircraft fly at different flight levels to avoid collisions. One can often see planes passing directly above or below one's own. Charts showing airways are published and are usually updated every 4 weeks, coinciding with the AIRAC cycle. AIRAC (Aeronautical Information Regulation and Control) occurs every fourth Thursday, when every country publishes its changes, which are usually to airways. Each airway starts and finishes at a waypoint, and may contain some intermediate waypoints as well. Waypoints use five letters (e.g., PILOX), and those that double as non-directional beacons use three or two (TNN, WK). Airways may cross or join at a waypoint, so an aircraft can change from one airway to another at such points. A complete route between airports often uses several airways. Where there is no suitable airway between two waypoints, and using airways would result in a somewhat roundabout route, air traffic control may allow a direct waypoint-to-waypoint routing, which does not use an airway (often abbreviated in flight plans as "DCT"). Most waypoints are classified as compulsory reporting points; that is, the onboard flight management system reports the aircraft's position to air traffic control as the aircraft passes a waypoint. Two main types of waypoints can be used: a named waypoint appears on aviation charts with a known latitude and longitude; and a geographic waypoint is a temporary position used in a flight plan, usually in an area where there are no named waypoints (e.g., most oceans in the Southern Hemisphere). The geographic waypoints have latitudes and longitudes that are a whole number of degrees. Complete routes are determined using airway(s) from origin to destination. Most flights over land fall into this category. Airway(s) from origin to an ocean edge, then an ocean track, then airway(s) from ocean edge to destination. Most flights over northern oceans fall into this category. Airway(s) from origin to an ocean edge, then a free-flight area across an ocean, then airway(s) from ocean edge to destination. Most flights over southern oceans fall into this category. Free-flight area from origin to destination can be done, air traffic control still requires a position report about once an hour. Flight planning systems organize this by inserting geographic waypoints at suitable intervals. The particular route to be flown determines the ground distance to cover, while winds on that route determine the air distance to be flown. Each inter-waypoint portion of an airway may have different rules as to which flight levels may be used. Total aircraft weight at any point determines the highest flight level which can be used. Cruising at a higher flight level generally requires less fuel than at a lower flight level, but extra climb fuel may be needed to get up to the higher flight level (it is this extra climb fuel and the different fuel consumption rate that cause discontinuities). The neural network determines a least-cost flight based only on time; fuel, fuel/time, or fuel costs and time costs and overflight charges. Despite all the effort taken to optimize flight plans, there are certain circumstances in which it is advantageous to file suboptimal plans. In busy airspace with a number of competing vehicles, the optimum routes and preferred altitudes may be oversubscribed. This problem can be worse in busy periods, such as when everyone wants to arrive as soon as it opens for the day. If all the aircraft file optimal flight plans then to avoid overloading, air traffic control may refuse permission for some of the flight plans or delay the allocated takeoff slots. To avoid this a suboptimal flight plan can be filed, asking for an inefficiently low altitude or a longer, less congested route.

The system automatically generates flight plans, secondary, or alternate flight plans, where the generated flight plans are free of obstacles or discontinuities. If obstacles, weather, or other vehicle's plans conflict with the present plan (discontinuity) exist, the discontinuities are automatically removed and a discontinuity-free flight plan is generated. In an example, if a discontinuity is identified the efficiency and operational flight object system is configured to perform the following steps: 1. The discontinuity is identified in the flight plan; 2. Limitations are identified applicable to the end user's system and the source; 3. A navigational database is accessed to determine known waypoints that can be used to remove the discontinuity; 4. Create unique waypoint and maneuver instructions specific to each vehicle; and 5. Determine real time operational restrictions, and user preference, to generate specific communications protocols to invoke a flight information message free from discontinuities for the user.

Additionally, a revision of a flight plan includes deleting or adding waypoints, modifying the position of waypoints, or modifying the characteristics pertaining to the waypoints or legs between waypoints, such as the manner in which the aircraft maneuvers, aircraft speed, time of arrival at the waypoint, or altitude. The characteristics for various waypoints or legs, segments joined by waypoints or fixes, further examples include weather bands. A weather band is a collection of environmental information for a specific or series of spatial points, such as a specific altitude or a series of three- or four-dimensional points in space and time. Starting from a line from origin to destination, the deviation includes flying over, under, or around the obstacles in 3D space and time (the $4^{th}$ dimension).

Once approved, the system can generate graphical depictions such as a depiction of a lateral profile of a flight plan, a vertical profile of a flight plan, and a speed profile associated with the lateral portion of the flight plan. FIG. 1K shows examples of graphical depictions of an active flight plan and actual flight information in conjunction with multiple flight plans, flight histories, and real time flight information. The UI highlights or annunciates specific flight information history such as past flight plans specific to that aircraft or flight, or flight information from any flight may be applied for comparison. Any flight, and its flight information, may be used for comparison as long as at least one flight information parameter can be correlated to the current flight selection. The correlation parameters can be manually selected or automated. Automation is the preferred method to detect the flights and flight information that is of closet match. For example, the options can be configured by similar flight route, portion of a flight route, speeds, altitude, aircraft type, date range, origin, destination, departure time, arrival time, tail number, pilot's name, or flight number. In one illustrative example, a flight plan includes an estimated time to reach a waypoint. When the aircraft actually crosses the waypoint, the event is captured by cell towers on the ground to determine the actual crossing time and send a message including the actual crossing time to the server. The actual crossing time can be displayed and recorded automatically on the user's computing device by mobile application, and an update to the original flight plan is generated and made available for viewing on the user's computing device.

An authorized user can dynamically make changes to a flight plan and communicate the changes across multiple or local systems and subscribers. The changes are synchronized across the multiple or local systems. In order to accomplish this synchronization, messages are automatically generated for each of the systems' and subscriber's communication protocols. The systems and subscribers include the on-board flight management system, mobile devices, local agencies, and ATC. The changes, their status, and associated information can be viewed in real-time. By providing a way to update flight plans from heterogeneous systems, dynamic updates to flight plans from various sources can be accommodated in an efficient manner.

An approved user (pilot, dispatcher, air traffic controller) can view a graphical depiction of an active flight plan in conjunction with multiple flight plans and flight histories. In one embodiment, specific flight history data, past flight plan, or flight history most related to the active flight plan is highlighted or annunciated. Various options are configurable by the user. For example, options can be configured by similar route, speeds, altitude, aircraft type, date range, origin, destination, departure time, arrival time, tail number, pilot's name, or flight number of one or more airline operators. In one embodiment, all data stored in the flight history database are searched, and the flights or flight data most analogous to the active flight plan are identified.

In one implementation, the ATC 89 is compatible with NASA's UTM system to enable safe and efficient low-altitude airspace operations by providing services such as airspace design, corridors, dynamic geofencing, severe weather and wind avoidance, congestion management, terrain avoidance, route planning and re-routing, separation management, sequencing and spacing, and contingency management. UTM could provide to human managers the data to make strategic decisions related to initiation, continuation, and termination of airspace operations to ensure that only authenticated vehicle could operate in the airspace. In its most mature form, the UTM system could be developed using autonomy characteristics that include self-configuration, self-optimization and self-protection. The self-configuration aspect could determine whether the operations should continue given the current and/or predicted wind/weather conditions.

One embodiment is a Portable ATC 89 system, which would move from between geographical areas and support operations such as precision agriculture and disaster relief. The second type of system would be a Persistent ATC 89 system, which would support low-altitude operations and provide continuous coverage for a geographical area. Either system would require persistent communication, navigation, and surveillance (CNS) coverage to track, ensure, and monitor conformance.

Flight plans may be used to document basic information such as departure and arrival points, estimated time en route, various waypoints that the aircraft must traverse enroute, information pertaining to those waypoints, such as actual or estimated altitude and speed of the aircraft at those waypoints, information relating to legs of the flight between those waypoints, and aircraft predicted performance. This type of flight plan may be used to construct a flight trajectory including the various legs of the flight, which are connected to the various waypoints along the route. Flight plans may be used to construct a flight trajectory including the various legs of the flight which are connected to various waypoints along the route. The flight trajectory may include a lateral trajectory defined in the horizontal plane and a vertical trajectory defined in the vertical plane. The flight trajectory may also include the element of time across the horizontal and vertical planes. Flight intent information generally refers to the future flight trajectory of an aircraft expressed as a four-dimensional profile until destination. Flight prediction information also relates to the future flight trajectory, however it is generally limited to a pilot's perspective of information pertinent to the flight. Flight intent information may contain additional flight parameters required by ground systems.

Flight Approval

In one aspect, a neural network is trained to generate flight plans from historical data, and such generated plans can be used to approve the flight based on cost factors, among others. In another aspect, a vehicle includes: one or more air vehicles each having a plurality of environmental sensors; a processor with a neural network in at least one vehicle or in at least one communication tower (edge processor) to receive sensor data and follow a pre-approved flight plan based from sensor outputs.

Implementations may include one or more of the following.

Ground systems would use the additional information to perform functions such as the issuance of speed or time clearances. FIG. 1J shows an exemplary flight approval process to the ATC 89 which includes:
 Start with a direct line between origin and destination and identify waypoints (110)
 Look up known obstacles and deviate around obstacles (112)
 Look up weather issues and deviate around problematic weather (114)
 Look up conflicting filed flight plans and deviate around conflicts with other vehicles (116)
 Submit flight plan with origin and destination to approval service (118)
 If rejected, provide revised plan and resubmit (120)
 During flight, if new obstacles are detected, deviate around new obstacle and update the ATC 89 with new info on the new obstacle (122).

Combining Flight Plan with Autonomous Flight Improves Safety

In one aspect, an air control system includes a network of communication towers with ground control modules thereon; a traffic control computer; a plurality of air vehicles each providing flight plans with travel segments in advance to the traffic control computer for approval, wherein the traffic control computer shares approved flight plans to the ground control modules positioned in each travel segment for tracking the vehicle and performing local air traffic control, and wherein each vehicle operates at a reduced power mode based on the approved plan until an unexpected obstacle is encountered, where additional sensors are powered on to help the vehicle navigate. The additional sensors can be on the communication towers to save cost in case of package delivery drones, where cost considerations outweigh the need for absolute perfection in anti collision (such as those for humans).

Implementations may include one or more of the following. The pre-approved flight plan reduces the surprises that may pop up during the flight, requiring fewer resources for continuous autonomous flight navigation which consumes power. Further, the pre-cleared flight plan means that other autonomous vehicles should not interfere with the present vehicle's travel, absent some abnormalities, in which case the autonomous system takes over to avoid the obstacle. Safety is improved. Safety is further enhanced when vehicles travel as a group. Further, fuel efficiency is improved as the lift is improved for all members of the flock traveling together.

Flock Travel

In one aspect, flight vehicles can travel as a flock of birds when their flight plans have at least one spatially and temporally common travel segment. Each vehicle runs a neural network trained to follow the other vehicles as a flock, and wherein a traffic control computer shares approved flight plans to the ground control modules positioned in each travel segment for tracking the vehicle and performing local air traffic control for the flock.

Implementations may include one or more of the following. Next a flock control behavior is detailed. Quite often users are going to a common destination. For example, a group of planes may want to go from point A to point B. A plurality of vehicles follow a leader case, who in turn is following a target vehicle or a target driving plan. The leader, or the first car in the group would automatically or manually take evasive actions to avoid an obstacle, and the information is transmitted via vehicle to vehicle communication such as Bluetooth, Wifi or even DSRC to following vehicles, and the driving path of the entire flock is adjusted according to the obstacle. "Flocking" is the collective motion of a large number of self-propelled entities and is a collective animal behavior exhibited by many living beings such as birds, fish, bacteria, and insects. It is considered an emergent behavior arising from simple rules that are followed by individuals and does not involve any central coordination. The vehicle communications would identify vehicles traveling as a flock, and the vehicles perform distributed flocking operation by communication over the wireless network.

The Vehicles Rules are discussed next. One embodiment simulates simple agents (vehicles) that are allowed to move according to a set of basic rules. The result is akin to a flock of birds, a school of fish, or a swarm of insects. In one embodiment, flocking behavior for each vehicle is controlled by three rules:

Separation—avoid crowding neighbors (short range repulsion)
Alignment—steer towards average heading of neighbors
Cohesion—steer towards average position of neighbors (long range attraction)

Rule 1: Vehicles try to go towards the center of mass of neighboring vehicles. The 'center of mass' is simply the average position of all the vehicles. Assume there are N vehicles, called b1, b2, . . . , bN. Also, the position of a vehicle b is denoted b.position. Then the 'center of mass' c of all N vehicles is given by: c=(b1.position+b2.position+ . . . +bN.position)/N However, the 'center of mass' is a property of the entire flock of vehicles; it is not something that would be considered by an individual vehicle. Each vehicle is moved toward its 'perceived center', which is the center of all the other vehicles, not including itself. Thus, for vehicleJ ($1<=J<=N$), the perceived center pcJ is given by:

$pcJ=(b1.position+b2.position+ . . . +bJ-1.position+bJ+1.position+ . . . +bN.position)/(N-1)$ Having calculated the perceived center, the system moves the vehicle towards it. To move it 1% of the way towards the center this is given by (pcJ−bJ.position)/100 as:

```
PROCEDURE rule1(vehicle bJ)
  Vector pcJ
  FOR EACH VEHICLE b
    IF b != bJ THEN  pcJ = pcJ + b.position
  pcJ = pcJ / N-1
  RETURN (pcJ - bJ.position) / 100
```

Rule 2: Vehicles try to keep a small distance away from other objects (including other vehicles). The rule ensures vehicles don't collide into each other. If each vehicle within a defined small distance (say 100 units) of another vehicle, the vehicle is moved away. This is done by subtracting from a vector c the displacement of each vehicle which is near by.

```
PROCEDURE rule2(vehicle bJ)
  Vector c = 0;
  FOR EACH VEHICLE b
    IF b != bJ THEN
      IF |b.position - bJ.position| < 100 THEN c = c - (b.position - bJ.position)
  RETURN c
```

If two vehicles are near each other, they will be slightly steered away from each other, and at the next time step if they are still near each other they will be pushed further apart. Hence, the resultant repulsion takes the form of a smooth acceleration. If two vehicles are very close to each other it's probably because they have been driving very quickly towards each other, considering that their previous motion has also been restrained by this rule. Suddenly jerking them away from each other is not comfortable for passengers and instead, the processes have them slow down and accelerate away from each other until they are far enough apart.

Rule 3: Vehicles try to match velocity with near vehicles.
This is similar to Rule 1, however instead of averaging the positions of the other vehicles we average the velocities. We calculate a 'perceived velocity', pvJ, then add a small portion (about an eighth) to the vehicle's current velocity.

```
PROCEDURE rule3(vehicle bJ)
  Vector pvJ
  FOR EACH VEHICLE b
    IF b != bJ THEN
      pvJ = pvJ + b.velocity
    END IF
  END
  pvJ = pvJ / N-1
  RETURN (pvJ - bJ.velocity) / 8
END PROCEDURE
```

Additional rules is implemented as a new procedure returning a vector to be added to a vehicle's velocity.

Action of a crowd or traffic is discussed next. For example, to handle strong traffic.

```
PROCEDURE strong_traffic(Vehicle b)
  Vector traffic
  RETURN traffic
END PROCEDURE
```

This function returns the same value independent of the vehicle being examined; hence the entire flock will have the same push due to the traffic or crowd.

Limiting the speed of vehicles is discussed next. For a limiting speed vlim:

```
PROCEDURE limit_velocity(Vehicle b)
  Integer vlim
  Vector v
  IF |b.velocity| > vlim THEN
    b.velocity = (b.velocity / |b.velocity|) * vlim
  END IF
END PROCEDURE
```

This procedure creates a unit vector by dividing b.velocity by its magnitude, then multiplies this unit vector by vlim.

The resulting velocity vector has the same direction as the original velocity but with magnitude vlim.

The procedure operates directly on b.velocity, rather than returning an offset vector. It is not used like the other rules; rather, this procedure is called after all the other rules have been applied and before calculating the new position, ie. within the procedure move_all_vehicles_to_new_positions:

$b.velocity=b.velocity+v1+v2+v3+\ldots$ limit_velocity($b$)

$b.position=b.position+b.velocity$

Bounding the position is discussed next. In order to keep the flock within a certain zone so that they can drive out of them, but then slowly turn back, avoiding any harsh motions.

```
PROCEDURE bound_position(Vehicle b)
    Integer Xmin, Xmax, Ymin, Ymax, Zmin, Zmax
    Vector v
    IF b.position.x < Xmin THEN v.x = 10
        ELSE IF b.position.x > Xmax THEN v.x = -10
    IF b.position.y < Ymin THEN v.y = 10
        ELSE IF b.position.y > Ymax THEN v.y = -10
    IF b.position.z < Zmin THEN v.z = 10
        ELSE IF b.position.z > Zmax THEN v.z = -10
    RETURN v
```

Here of course the value 10 is an arbitrary amount to encourage them to drive in a particular direction.

During the course of flock control, one may want to break up the flock for various reasons. For example the introduction of a predator may cause the flock to scatter in all directions. The predator can be an object on an impending collision course with the flock. Scattering the flock can be done. Here the flock can disperse; they are not necessarily moving away from any particular object, but to break the cohesion (for example, the flock encounters a dangerously driven vehicle). Thus the system negates part of the influence of the vehicles rules.

PROCEDURE move_all_vehicles_to_new_positions( )
FOR EACH VEHICLE b $v1=m1*rule1(b)$ $v2=m2*rule2(b)$ $v3=m3*rule3(b)$ $b.velocity=b.velocity+v1+v2+v3+\ldots$ $b.position=b.position+b.velocity$ When the risk of collision arises, the process can make m1 negative to scatter the flock. Setting m1 to a positive value again will cause the flock to spontaneously re-form.

Tendency away from a particular place is handled next. If the flock is to continue the flocking behavior but to move away from a particular place or object (such as a car that appears to collide with the flock), then we need to move each vehicle individually away from that point. The calculation required is identical to that of moving towards a particular place, implemented above as tend_to_place; all that is required is a negative multiplier: $v=-m*tend\_to\_place(b)$.

The vehicles can be organized into a V formation (sometimes called a skein) is the symmetric V-shaped formation for Drag Reduction and Fuel Saving where all the cars except the first drive in the upwash from the wingtip vortices of the car ahead. The upwash assists each car in supporting its own weight in flight, in the same way a glider can climb or maintain height indefinitely in rising air.

The flying vehicles of the flock establish a target vehicle a reference for flocking. The leading flying vehicle of the flock is established as the target flying vehicle by the flying vehicles of the flock. The target flying vehicle may be established before the flying vehicle start running in flock. In another embodiment, the first flying vehicle of the flock detects a preceding flying vehicle with the information from the radar or the camera on the leading flying vehicle or flock leader, and automatically establishes the detected preceding flying vehicle as a new target flying vehicle. By successively changing new target flying vehicles in this manner, new flying vehicles may automatically be added to the flock. Even if a flying vehicle is incapable of communication between flying vehicles, that flying vehicle may be established as a target flying vehicle according to an algorithm described later on.

In one embodiment, the leading flying vehicle of the flock establishes a hypothetical target flying vehicle, and transmits items of information of the hypothetical target flying vehicle to the other flying vehicles of the flock which follow the flock leader through camera visual tracking, Bluetooth or WiFi, among others.

Each vehicle in the flock is responsible for generating a speed plan which governs the relationship between the position in which the flying vehicle runs and the speed at which the flying vehicle runs. The vehicles perform determining, based on the speed plan, a planned position to be reached from the present position of the flying vehicle after a predetermined time t, e.g., 1.5 seconds, and a planned speed of the flying vehicle at the planned position in the flock. According to this function, if the speed plan from the present position of the flying vehicle is generated such that the flying vehicle is to maintain the speed of 80 km/h, i.e., 22.2 m/sec., then the planned position to be reached after the predetermined time t, e.g., 1.5 seconds, is 33.3 m spaced from the present position down the running path B, and the planned speed at the planned position to be reached is 80 km/h.

The function as the predicted value calculating means serves to determine a predicted position and a predicted speed to be reached by the flying vehicle after the predetermined time t. The predicted position is calculated from the present position, i.e., the traveled distance, the present speed, and the present acceleration of the flying vehicle which are given from the communication module 1, and the predicted speed is calculated from the present speed and the present acceleration of the flying vehicle.

The speed/acceleration of the vehicle, based on which the predicted position and the predicted speed will be determined, is basically determined from the speedometer. The predicted position and the predicted speed are determined using the speed and the acceleration of the flying vehicle and GPS position.

A distance deviation, i.e., a position error, between a planned position to be reached by the flying vehicle after the predetermined time t based on the speed plan and the predicted position, described above, to be reached by the flying vehicle, and a speed deviation, i.e., a speed error, between a planned speed to be reached by the flying vehicle after the predetermined time t based on the speed plan and the predicted speed, described above, to be reached by the flying vehicle are determined. These deviations are calculated by subtracting.

The target flying vehicle may be a flock leader. If, however, the target flying vehicle is not a flock leader, then the flock leader calculates a position, a speed, and an acceleration of the target flying vehicle using the laser radar, GPS, or triangulation of RF signals, for example.

Based on the above control algorithm, the engine throttle valve opening, the transmission, and the brake of each of plural following flying vehicles are controlled to control the flying vehicles in a flock.

The system detects the positional data of the preceding flying vehicle through inter-vehicular communications or the laser radar, and controls the following flying vehicle in the event that the preceding flying vehicle drops out of a normal control range of the vehicle flock control. Even when a flying vehicle drops out of the normal range of the vehicle flock control, the control algorithm controls a following flying vehicle to increase its inter-vehicular distance up to such a flying vehicle. Therefore, the vehicle platoon control will not be interrupted even when one or more flying vehicles drops out of the platoon.

If it is known that a group of flying vehicles will travel in platoon or flying vehicles are counted at a tollgate or the like and the incremental count is indicated to each flying vehicle to let it recognize its position in the platoon, then it is possible to establish the position i for each of the flying vehicles before they travel in platoon.

However, in order to handle a situation where another flying vehicle pulls in between flying vehicles running in platoon or another flying vehicle is added to a front or rear end of a platoon of flying vehicles, the process according to the present system makes it possible for each of the flying vehicles running in flock to recognize its position relative to a target flying vehicle through inter-vehicular communications.

There are two procedures available for each of the flying vehicles running in flock to recognize its position relative to a target flying vehicle. The first procedure is applicable to local inter-vehicular communications by which each of the flying vehicles of the flock can communicate with only those flying vehicles which run immediately in front of and behind the flying vehicle. If the flock leader of a flock is selected as a target flying vehicle, then the target flying vehicle transmits its own positional information i=0 to a next flying vehicle which immediately follows the target flying vehicle. The following flying vehicle adds 1 to i, producing its own positional information i=1, recognizes that it is the second flying vehicle from the target flying vehicle, and transmits its own positional information i=1 to a next flying vehicle which immediately follows the second flying vehicle. Having received the positional information i=1, the next immediately following flying vehicle adds 1 to i, producing its own positional information i=2, recognizes that it is the third flying vehicle from the target flying vehicle, and transmits its own positional information i=2 to a next flying vehicle which immediately follows the third flying vehicle. In this manner, each of the flying vehicles is able to recognize its position relative to the target flying vehicle with a means for counting its position and local inter-vehicular communications.

If a target flying vehicle is not the flock leader of a flock and the target flying vehicle and the flock leader cannot communicate with each other through inter-vehicular communications, then the flock leader sets its own positional information to i=1, and transmits the own positional information i=1 to a next flying vehicle which immediately follows the target flying vehicle.

According to the present system, as described above, a longitudinal acceleration correcting quantity of each of the flying vehicles of a flock is determined on the basis of predicted deviations of a position and a speed that are predicted after a predetermined time, from a speed plan, and the speed of the flying vehicle is controlled on the basis of the determined longitudinal acceleration correcting quantity. Therefore, the flying vehicles can smoothly be controlled to run in flock along a running path on a road.

A longitudinal acceleration correcting quantity of a flying vehicle following a target flying vehicle is determined on the basis of an inter-vehicular distance between the following flying vehicle and the target flying vehicle and a speed difference there-between after a predetermined time, and the speed of the following flying vehicle is controlled on the basis of the determined longitudinal acceleration correcting quantity. Consequently, the following flying vehicle can automatically be driven smoothly along a running path on a road while reliably keeping a proper inter-vehicular distance between the following flying vehicle and the target flying vehicle.

Since the system arrangements on a flock leader and a following flying vehicle of a flock are identical to each other, the flock leader and the following flying vehicle can automatically be driven in a manner to match them using slightly different software or program adaptations made therefor. Therefore, any one of the flying vehicles of the flock may become a flock reader or a following flying vehicle.

Each of following flying vehicles of a flock is not only controlled with respect to a flock leader, but also always monitors an inter-vehicular distance between itself and a preceding flying vehicle, so that it can increase the inter-vehicular distance even when a flying vehicle drops out of the flock. Therefore, it is not necessary to stop controlling the vehicle flock control when a flying vehicle drops out of the flock. Even when a flying vehicle drops out of a flock, the vehicle flock control system does not stop controlling the other flying vehicles to run in flock, and when the flying vehicle that has dropped out returns to the flock, the vehicle flock control system can continuously control the flying vehicles to run in flock. The vehicle flock control system allows different types of flying vehicles, such as vehicles of different lengths, smaller automobiles, larger automobiles, etc., to be mixed in a flock, and can control those flying vehicles to run in flock. Accordingly, the vehicle flock control system according to the present system is capable of stably controlling flying vehicles to run in flock on a road designed for flying vehicles to run automatically, and particularly of controlling the speeds of such flying vehicles smoothly.

In some embodiments, a lead vehicle identifies airway information that may include airway markings on the ground surface, and the computer system may use one or more sensors to sense the airway markings For example, the computer system may use an image-capture device to capture images of the road and may detect the airway markings by analyzing the images for predetermined colors, shapes, and/or brightness levels that are similar to a predetermined color, shape, and/or brightness of the airway markings. As another example, the computer system may project a laser onto the road and may detect the airway markings by analyzing reflections off the road for an intensity that is similar to a predetermined intensity of a reflection off the airway markings. The computer system may estimate the location of the airway based on the sensed airway markings and control the vehicle to follow the airway. The vehicles behind the lead vehicle can then simply follow the lead vehicle as part of a flock.

At some point, the lead vehicle may determine that the airway information has become unavailable or unreliable.

For example, severe fog may be present and severely affect the airway markings. In other examples, the vehicle may no longer be able to detect the airway markings on the road, the vehicle may detect contradictory airway markings on the road, the vehicle may no longer be able to determine the geographic location of the vehicle, and/or the vehicle may not be able to access a predetermined map of the road. Other examples are possible as well. In response to determining that the airway information has become unavailable or unreliable, the computer system may use at least one sensor to monitor at least one neighboring vehicle, such as a neighboring vehicle in a neighboring airway or a neighboring vehicle behind the vehicle that is part of the flock. The computer system may then control the vehicle to maintain a distance between the vehicle and the at least one neighboring vehicle to be at least a predetermined minimum distance and even if the vehicle is unable to rely on the airway information to estimate the location of the airway on the road, the vehicle may avoid colliding with the at least one neighboring vehicle.

In other embodiments, the airway information may include a geographic location of the vehicle and a predetermined map of the road. The computer system may determine the geographic location of the vehicle by, for example, querying a location server for the geographic location of the vehicle. Alternatively, if the predetermined map indicates a geographic location of at least two objects near the vehicle, the computer system may determine the geographic location of the vehicle by, for example, using a laser rangefinder or light detection and ranging (LIDAR) unit to estimate a distance from the vehicle to the at least two objects near the vehicle and determining the geographic location of the vehicle using triangulation. Other examples are possible as well. In any case, the computer system may then locate the geographic location of the vehicle on the predetermined map to determine the location of the airway relative to the geographic location of the vehicle.

In still other embodiments, the airway information may be derived from a leading vehicle that is in front of the vehicle in the airway and correlation with other information such as map data and independent airway analysis to prevent the blind-following-the blind situation. The computer system may estimate a path of the leading vehicle using, for example, a laser rangefinder and/or a LIDAR unit. Other examples are possible as well. Once the computer system has estimated the path of the leading vehicle, the computer system may estimate the location of the airway based on the estimated path. For example, the computer system may estimate the location of the airway to include the estimated path (e.g., extend by half of a predetermined airway width on either side of the estimated path). Other examples are possible as well.

In some embodiments, the computer system may maintain a predetermined threshold for the airway information, and the computer system may determine that the airway information has become unavailable or unreliable when the computer system detects that a confidence of the airway information (e.g., how confident the computer system is that the airway information is reliable) is below the predetermined threshold. In some embodiments, the computer system may additionally maintain a predetermined time period for the airway information, and the computer system may determine that the airway information has become unavailable or unreliable when the computer system detects that a confidence of the airway information is below the predetermined threshold for at least a predetermined amount of time.

Upon determining that the airway information has become unavailable or unreliable, the computer system may use at least one sensor to monitor at least one neighboring vehicle. The at least one neighboring vehicle may include, for example, a neighboring vehicle in an airway adjacent to the airway in which the vehicle is traveling. As another example, the at least one neighboring vehicle may include a neighboring vehicle behind the vehicle in the airway in which the vehicle is traveling. As still another example, the at least one neighboring vehicle may include a first neighboring vehicle and a second neighboring vehicle, each of which may be either in an airway adjacent to the airway in which the vehicle is traveling or behind the vehicle in the airway in which the vehicle is traveling. Other examples are possible as well.

When the airway information has become unavailable or unreliable, the computer system may control the vehicle to maintain a distance between the vehicle and the at least one neighboring vehicle to be at least a predetermined distance. The predetermined distance may be, for example, a distance determined to be a safe distance and/or a distance approximately equal to the difference between a predetermined airway width and a width of the vehicle. Other predetermined distances are possible as well.

In order to maintain the distance between the vehicle and the at least one neighboring vehicle to be at least the predetermined distance, the computer system may continuously or periodically use the at least one sensor on the vehicle to monitor the distance between the vehicle and the at least one neighboring vehicle. The computer system may monitor the distance between the vehicle and the at least one neighboring vehicle using, for example, a laser rangefinder and/or LIDAR unit. If the distance between the vehicle and the at least one neighboring vehicle becomes less than the predetermined distance, the computer system may move the vehicle away from the at least one neighboring vehicle in order to maintain the distance between the vehicle and the at least one neighboring vehicle to be at least the predetermined distance.

In some embodiments, in addition to maintaining the distance between the vehicle and the at least one neighboring vehicle to be at least the predetermined distance, the computer system may additionally maintain the distance between the vehicle and the at least one neighboring vehicle to be within a predetermined range of the predetermined distance. In these embodiments, if the distance between the vehicle and the at least one neighboring vehicle becomes too large (e.g., no longer within the predetermined range of the predetermined distance), the computer system may move the vehicle closer to the at least one neighboring vehicle. This may, for example, prevent the vehicle from drifting too far away from the neighboring vehicle that the vehicle drifts into an airway on the opposite side of the vehicle from the neighboring vehicle.

As noted above, in some embodiments the at least one vehicle may include a first neighboring vehicle and a second neighboring vehicle. In these embodiments, maintaining the distance between the vehicle and the at least one neighboring vehicle may involve maximizing both a first distance between the vehicle and the first neighboring vehicle and a second distance between the vehicle and the second neighboring vehicle (e.g., such that the vehicle remains approximately in the middle between the first neighboring vehicle and the second neighboring vehicle). Each of the first distance and the second distance may be at least the predetermined distance.

In some embodiments, in addition to maintaining the distance between the vehicle and the at least one neighboring vehicle to be at least the predetermined distance, the computer system may determine an updated estimated location of the airway. To this end, the computer system may use the at least one sensor to monitor at least a first distance to the at least one neighboring vehicle and a second distance to the at least one vehicle. Based on the first distance and the second distance, the computer system may determine a first relative position and a second relative position (e.g., relative to the vehicle) of the at least one neighboring vehicle. Based on the first relative position and the second relative position, the computer system may estimate a path for the at least one neighboring vehicle. The computer system may then use the estimated path to determine an updated estimated location of the airway. For example, in embodiments where the at least one neighboring vehicle is traveling in an airway adjacent to the airway in which the vehicle is traveling, the computer system may determine the estimated location of the airway to be substantially parallel to the estimated path (e.g., the airway may be centered on a path that is shifted from the estimated path by, e.g., a predetermined airway width and may extend by half of the predetermined airway width on either side of the path). As another example, in embodiments where the at least one neighboring vehicle is traveling behind the vehicle in the airway in which the vehicle is traveling, the computer system may determine the estimated location of the airway to be an extrapolation (e.g., with constant curvature) of the estimated path. Other examples are possible as well.

In some embodiments, the computer system may additionally use a speed sensor to monitor a speed of the at least one neighboring vehicle and may modify a speed of the vehicle to be less than the speed of the at least one neighboring vehicle. This may allow the vehicle to be passed by the at least one neighboring vehicle. Once the at least one neighboring vehicle has passed the vehicle, the at least one neighboring vehicle may become a leading vehicle, either in an airway adjacent to the airway in which the vehicle is traveling or a leading vehicle that is in front of the vehicle in the airway in which the vehicle is traveling, and the computer system may estimate the location of the airway of the road based on an estimated path of the leading vehicle, as described above.

In some embodiments, the computer system may begin to monitor the at least one neighboring vehicle only in response to determining that the airway information has become unavailable or unreliable. In these embodiments, prior to determining that the airway information has become unavailable or unreliable, the computer system may rely solely on the airway information to estimate the location of the airway. In other embodiments, however, the computer system may also monitor the at least one neighboring vehicle prior to determining that the airway information has become unavailable or unreliable. In these embodiments, the computer system may additionally use the distance to the at least one neighboring vehicle to estimate the location of the airway in which the vehicle is traveling. For example, if the at least one neighboring vehicle is traveling in an airway adjacent to the airway in which the vehicle is traveling, the computer system may determine that the airway does not extend to the at least one neighboring vehicle. As another example, if the at least one neighboring vehicle is traveling behind the vehicle in the airway in which the vehicle is traveling, the computer system may determine that the airway includes the at least one neighboring vehicle. Other examples are possible as well. Alternatively, in these embodiments, prior to determining that the airway information has become unavailable or unreliable, the computer system may simply use the distance to the at least one neighboring vehicle to avoid collisions with the at least one neighboring vehicle.

Further, in some embodiments, once the vehicle begins to monitor the at least one neighboring vehicle, the computer system may stop using the airway information to estimate the location of the airway in which the vehicle is traveling. In these embodiments, the computer system may rely solely on the distance to the at least one neighboring vehicle to avoid collisions with the at least one neighboring vehicle until the airway information becomes available or reliable. For example, the computer system may periodically attempt to obtain updated airway information. Once the computer system determines that the airway information has become available or reliable, the airway information has become available or reliable, the computer system may once again rely on the updated estimated location of the airway and less (or not at all) on the distance to the at least one neighboring vehicle. The computer system may determine that the updated airway information is reliable when, for example, the computer system determines that a confidence of the updated airway information is greater than a predetermined threshold. The predetermined threshold may be the same as or different than the predetermined threshold.

Another embodiment uses legs similar to horse legs and tromps through high grass and uneven terrain while using sensor technology to closely follow the user. The system can follow a sensor attached to an electronic device worn by a soldier, or can use object detection camera to follow the user. One embodiment uses electrical motor, and another uses a gas powered engine that drives a hydraulic pump, which in turn drives the hydraulic leg actuators. Each leg has four actuators (two for the hip joint, and one each for the knee and ankle joints). Each actuator unit consists of a hydraulic cylinder, servo valve, position sensor, and force sensor.

In some embodiments, the system identifies obstacles on the road, and the computer system may use one or more sensors to sense the obstacles. For example, the computer system may use an image-capture device to capture images of the road and may detect the obstacles by analyzing the images for predetermined colors, shapes, and/or brightness levels indicative of an obstacle. The computer system may estimate the location of the obstacle and control the vehicle to avoid the vehicle and yet maintain a predetermined distance from neighboring vehicles in both directions. Other vehicles behind the lead vehicle can then simply follow the lead vehicle as part of a flock. The computer system may then control the vehicle to maintain a distance between the vehicle and the at least one neighboring vehicle to be at least a predetermined minimum distance to avoid colliding with the at least one neighboring vehicle. In another embodiment, the obstacle can be the result of a car accident or emergency. The system automatically detects the occurrence of an emergency and provides safety at the scene. This is done by diverting traffic flow near the point of emergency to a point where traffic resumes normal flow. The system secures the incident site to protect emergency personnel, their equipment and the public, from hazardous conditions at the scene and throughout the traffic control zone. The system can establish a traffic control set-up that gives motorists adequate warning and reaction time. The system also separates pedestrians from vehicular traffic and limits access to the site to authorized persons only. One embodiment directs vehicles through an emergency traffic control zone with the following: Advance Warning Area should alert vehicles that there is a traffic situation or difficulty ahead which will require some action on its part; Approach area should identify the nature of the equipment or vehicle that is about to encounter and allow them to analyze the situation; Transition Area should provide an indication as to the expected action to be taken by the vehicle to decide on a course of action and execute safe driving techniques prior to entering the Activity Area; and Activity Area includes Fend Off Position of the emergency vehicle, Buffer Zone (refers to scene protection area between the first emergency vehicle and the incident site), Incident Site (Restricted to authorized personnel only), Traffic Space (Area where traffic is allowed to pass by the Activity Area), and Staging Area (Emergency Vehicles not immediately required to perform a function or shielding at the incident scene should be directed to stage in this area. The area should be downstream/upstream of the incident site and the location should not create a traffic hazard or obstruction). The system can determine a Termination Area from the downstream side of the Staging Area to the point where normal traffic is able to resume. The information for an emergency is incorporated into the 3D model for vehicular processing.

The system assists the flight control system 80 by identifying the objects as potential "threats" and recommend options for the flight control system 80. For example, the system can perform the following:

- detecting an object external to a vehicle using one or more sensors;
- determining a classification and a state of the detected object;
- estimating the destination of the object;
- predicting a likely behavior of the detected object based on prior behavior data and destination;
- responding with 3D evasive path options based at least in part on the likely behavior of the detected object by moving up to next plane, down below current plane, or around the object; and
- notifying the ground control or passenger of options based on the likely behavior.

The process may cause the vehicle to take particular actions in response to the predicted actions of the surrounding objects. For example, if other flying vehicle is turning at the next intersection, the process may slow the vehicle down as it approaches the intersection. In this regard, the predicted behavior of other objects is based not only on the type of object and its current trajectory, but also based on some likelihood that the object may obey traffic rules or predetermined behaviors. In another example, the process may include a library of rules about what objects will do in various situations. The library may be built manually, or by the vehicle's observation of other vehicles (autonomous or not) on the roadway. The library may begin as a human built set of rules which may be improved by the vehicle's observations. Similarly, the library may begin as rules learned from vehicle observation and have humans examine the rules and improve them manually. This observation and learning may be accomplished by, for example, tools and techniques of machine learning. In addition to processing data provided by the various sensors, the computer may rely on environmental data that was obtained at a previous point in time and is expected to persist regardless of the vehicle's presence in the environment. For example, the system can use highly detailed maps identifying the shape and elevation of roadways, airway lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another flying vehicle is expected to turn based on real-time data (e.g., using its sensors to determine the current GPS position of another flying vehicle) and other data (e.g., comparing the GPS position with previously-stored airway-specific map data to determine whether the other flying vehicle is within a turn airway). These objects may have particular behavior patterns that depend on the nature of the object. For example, a bicycle is likely to react differently than a motorcycle in a number of ways. Specifically, a bicycle is more likely to make erratic movements when compared with a motorcycle, but is much slower and thus can be handled with ease compared to a speeding motorcycle. For each classification, the object data may also contain behavior information that indicates how an object having a particular classification is likely to behave in a given situation. Vehicle may then autonomously respond to the object based, in part, on the predicted behavior.

Safety Monitoring

One function provided by the ATC 89 is safety. To provide safety with many vehicles in the air, a safety system includes
- a Ground control station to analyze flight data of a plurality of air vehicles, and
- at least one air vehicle communicably coupled to the Ground Control Station, the at least one vehicle being configured to:
- capture statistical data for a flight route whilst flying substantially along the flight route at least once, the statistical data pertaining to a plurality of flight parameters;
- transmit, to the Ground Control Station, the statistical data for the flight route from the at least one vehicle;
- capture flight data for the flight route and compare the flight data with reference data from other vehicles flying substantially along the flight route or from a math simulation of expected flight parameters;
- determine unexpected changes as prioritized by danger level and if an emergency exists, instructing the vehicle to go to a safe location.

Safety limits for various flight parameters during operation of the vehicle are captured. The system determines deviation of one or more flight parameters below or above the safety limits in real time or near-real time, thereby enabling execution of timely corrective action to avoid failure and loss of the vehicle. Also, the method and system of the present disclosure updates the safety limits in near-real time based on gathered flight data. Therefore, problems encountered during operation of the vehicle are detected promptly and addressed suitably. Furthermore, the use of various data (such as statistical data, reference data, flight data and environmental data) to update the flight parameters along the flight route, increases the reliability of operation of vehicle.

Optional Geo Restriction to Communication Towers

In one aspect, a flying vehicle includes: a cab with an optional passenger seat with optional steering control; a propulsion unit having a rotating blade and an engine to rotate the blade; and a flight control system that restricts the vehicle to communication range of a plurality of communication towers or cells.

Implementations may include one or more of the following.

To conform to FAA regulations, the system can constrain flight to zones and can include one or more of pre-configuring the plurality of vehicles 10 to operate only where cellular coverage or WiFi exists, monitoring cell signal strength by the plurality of vehicles 10 and adjusting flight based on signal strength to stay within a range of the communication (com) towers.

The system can include the plurality of vehicles 10 and/or the plurality of communication towers providing location, speed, direction, and altitude. The location can be determined based on a combination of triangulation by the plurality of cell towers and a determination by the vehicle 10 based on a location identification network. The plurality of function can include one or more of separation assurance between vehicles 10; navigation assistance; weather and obstacle reporting; monitoring of speed, altitude, location, and direction; traffic management; landing services; and real-time control. One or more of the plurality of vehicles 10 can be configured for autonomous operation through the air traffic control. The plurality of vehicles 10 can be configured with mobile device hardware configured to operate on a plurality of different cellular networks.

In an embodiment, the vehicle 10 maintains an association with at least three of the cell sites which perform triangulation to determine the location of the vehicle 10. In addition to the cell sites on the cell network, the vehicle 10 can also communicate to the other wireless networks 304. In an embodiment, the vehicle 10 can maintain its GPS and/or GLONASS location and report that over the cell network 302. In another embodiment, the other wireless networks 304 can include satellite networks or the like.

The method can further include, during the emergency instructions, reestablishing communication to the ATC 89 via one of the primary wireless network and the backup wireless network; and receiving instructions from the ATC 89 system. The primary wireless network can include a first wireless provider network and the backup wireless network can include a second wireless provider network. The first wireless provider network and the second wireless provider network can include a cellular network, such as LTE. The vehicle 10 can include a wireless interface configured to communicate to each of the first wireless provider network and the second wireless provider network. The communicating to the ATC 89 can include providing flight information to the ATC 89 system; and receiving instructions and updates from the ATC 89 for real-time control. The flight information can include weather and obstacle reporting, speed, altitude, location, and direction, and the instructions and updates can relate to separation assurance, traffic management, landing, and flight plan.

In another embodiment, the vehicle 10 is configured for network switchover to communicate with an Air Traffic Control (ATC) system. The vehicle 10 includes one or more rotors disposed to a body and configured for flight; wireless interfaces including hardware and antennas adapted to communicate with a primary wireless network and a backup wireless network of a plurality of wireless networks; a processor coupled to the wireless interfaces and the one or more rotors; and memory storing instructions that, when executed, cause the processor to: communicate to ATC 89 via the primary wireless network; receive and store emergency instructions from the ATC 89 system; detect communication disruption on the primary wireless network to the ATC 89 system; responsive to detection of the communication disruption, switch to the backup wireless network to reestablish communication to the ATC 89 system; and, responsive to failure to reestablish communication to the ATC 89 via the backup wireless network, implement the emergency instructions.

Mass Transit for Aerial Vehicles

In one aspect, aerial vehicles can land and hook to a mass transit system to be delivered at or near their destinations. This leverages the public transit infrastructure already present. In one embodiment, the transit infrastructure is a rail above ground, but in other embodiments can include maglev stations, for example. The vehicles would connect to cables on the rails.

Figure 2A:
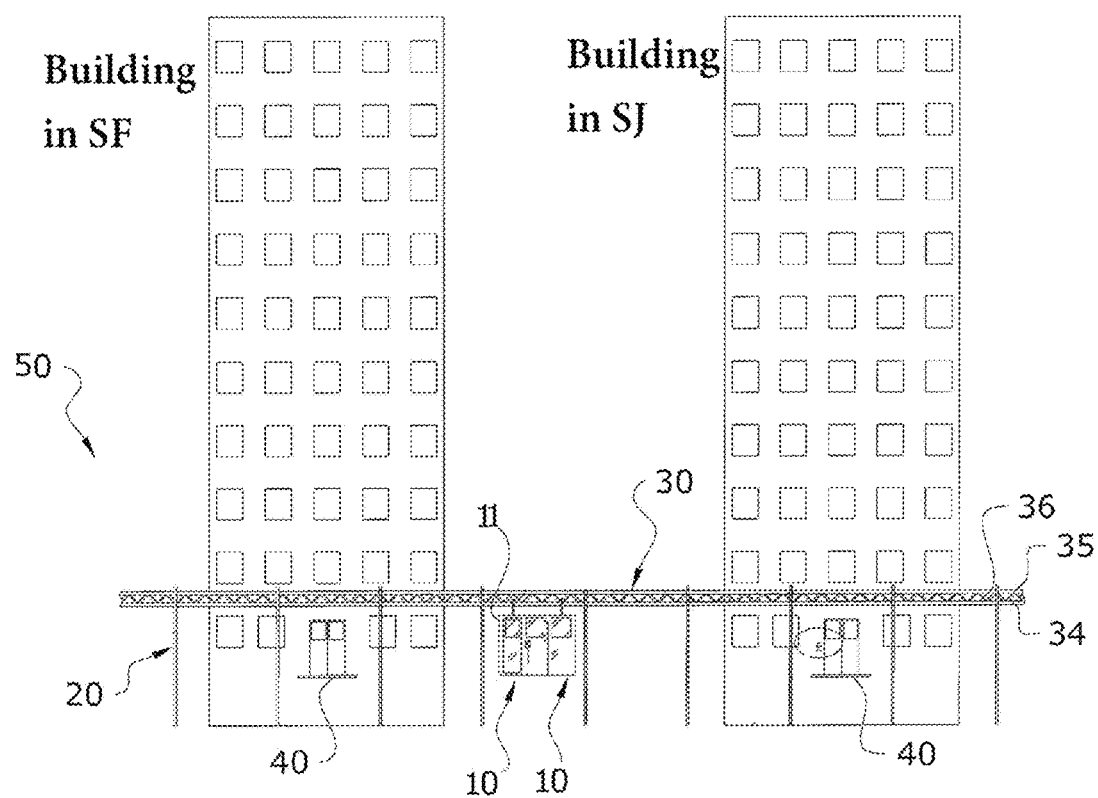
FIGS. 2A-2B show exemplary long range rail system for transporting the vehicles.

Implementations may include one or more of the following. FIG. 2A shows an exemplary accelerator 50 for the vehicle 10 to move quickly at long distances, for example from city to city, using little energy in an environmentally sustainable manner similar to a mass transit system. The system includes a support structure 20, a horizontal track 30 connected to the support structure 20, wherein the track 30 is positioned above ground level, wherein the track 30 includes a plurality of airways thereon including bypass airways. A loading station 40 is accessible from the first bypass airway and an unloading station accessible from the second bypass airway. The support structure 20 is used to support the track 30 above a ground level, which includes the ground surface, water surface, city obstructions, or various other structures extending from the ground. The support structure 20 may also be used to support the track 30 through a tunnel, mountain, building, or various other types of structures that may be considered desired destinations or stand in the way of the track 30. The support structure 20, because of the many types of terrain that the support structure 20 can encounter, may take on a variety of shapes and configurations, as well as be comprised of various types of materials. In one embodiment, the support structure 20 includes a pair of vertical columns spaced apart to allow a vehicle 10 to travel between. A horizontal structure or beam may be connected at upper end of the two columns 21, forming an inverted U-shaped configuration. The track 30 will be attached to the horizontal structure and the flying vehicle 10 suspended therefrom. It is appreciated that in this configuration, multiple structures may be located along the track 30, including a number of support structures 20 deemed necessary to support the track 30 and flying vehicles 10 traveling along the track 30. The support structure 20 may also include a cable support system supporting the vertical beams overhead. The support structure 20 may also be configured to stretch over water surfaces, similar to a bridge. The support structure 20 may further be integrated with surrounding structures, such as buildings, mountains, alternate cable supports, or various others, all which allow for the adequate support of the track 30.

Figure 2B:
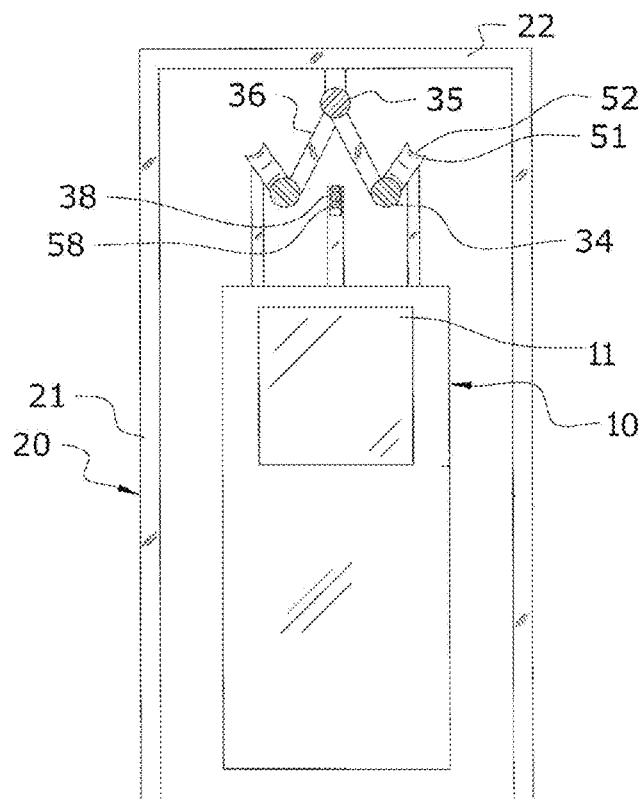

As shown in FIG. 2B, a plurality of vehicles 10 can be lifted onto the track 30 and then be flying by the accelerator 50 for travel along the track 30. Alternatively, the vehicle 10 can fly near the track 30 to be robotically hooked onto the track 30. It is appreciated that the flying vehicles 10 may travel in-line with other vehicles 10, be connected to other vehicles 10, travel side-by-side with other vehicles 10 or multiple other arrangements similar to highway systems and automobiles. The vehicles 10 are also preferably generally separated by a predetermined distance to prevent overloading of the support structures 20 and to prevent vehicles 10 from engaging one another. The vehicles 10 are further preferably automatically controlled to travel from location to location thus reducing the amount of staff or hired operators needed to effectively utilize the mass transit system 50. In one implementation, vehicle 10 is rolled or driven to the loading station 40 where it is loaded onto the horizontal track.

Turning back to FIG. 2B, an electrical contact 58 engages the elongated electrical cable 38 of the track 30 contact to provide electric power to the plurality of wheels 51 which travel along the track 30 and other electrical components of the vehicle 10. The cable 38 runs parallel with the track 30. Electrically powered vehicles 10 can then silently and cleanly travel within malls and office buildings for optimum convenience to the travelling public. Having the vehicles 10 electrically powered from a single supply source (or multiple supply sources) connected to the track 30 also allows for the control and synchronization of the multiple vehicles 10. Of course the vehicles 10 may also include motors or other power supplies. The wheels 51 generally extend from a wheel 51 support 35 extending from the top side of the cab 11 of the flying vehicle 10. Each of the wheels 51 are preferably angled inwards at similar orientations so that a groove 52 extending around the perimeter of the wheel 51 can receive the lower support cables 34 of the track 30 at least partially within to provide stability to the vehicle 10 traveling along the track 30. The wheels 51 thus are located above the support cables 34 of the track 30 and the cab 11 of the vehicle 10 is located below the support cables 34 of the track 30. It is appreciated that other connection mechanisms or arrangements may be used to secure the vehicle 51 to the track 30. The vehicles 10 are able to travel at various different speeds in an energy efficient manner matching those of mass transit systems. The speeds may be present at the installation of the vehicles 10 or may be adjusted via the passengers riding within the vehicles 10. The vehicles 10 are also preferably able to communicate with each other so that a vehicle 10 knows if another vehicle 10 is stopping at a requesting stop, slowing down, traveling at a different speed, crossing tracks 30, or various other actions.

FIG. 2C shows an exemplary process for traveling with the vehicle 10 as follows:
upload a flight plan to the flight control system of the vehicle (68)
fly to the track location (70)
connect the vehicle to high speed rail track (72)
lift the vehicle into the air in a vertical takeoff and landing mode (74)
move the vehicle to a rail track exit point (76)
releasing vehicle from the track near destination (78)
transitioning vehicle off the track (80)
move vehicle to final destination (82)

The first step involves uploading a flight plan to the flight control system of the vehicle 10 in 68. The vehicle may now be operated responsive to autonomous flight control, remote flight control or a combination thereof. Regardless of flight control mode, the next step is dispatching the selected vehicle from the transportation services provider location to the current location of the pod assembly to be transported, as indicated in block 70. This step may involve flying from the current location to the location of a track 30 provided by a transportation services provider, identifying a landing zone proximate the current location of the track 30, performing an approach and landing, then positioning the vehicle 10 relative to the track 30 to enable attachment therebetween. The next step is coupling the vehicle to track 30, as indicated in block 72. The process of coupling the vehicle to the track 30 may be autonomous, manual or a combination thereof. In any case, the coupling process including forming a mechanical connection and preferably establishing a communication channel therebetween. The vehicle may now be operated responsive to autonomous flight control, remote flight control, onboard pilot flight control or a combination thereof. Once the track 30 is properly coupled to the vehicle 10, the track lifts the vehicle into the air in a vertical takeoff and landing mode, as indicated in block 74. During the track travel, the vehicle 10 is preferably maintained in a generally horizontal attitude. Once the vehicle has reached track 30, the next step is moving the vehicle to a mass exit point, as indicate in block 76. In the example of FIG. 2A, the mass transit is from San Francisco to San Jose terminal. The process transports the vehicle to the desired intermediate destination location and then releasing the vehicle from the track, as indicated in block 78. As the vehicle approaches the destination, the next step is transitioning the vehicle off the track, as indicated in block 80. Preferably, this transition involves keeping the vehicle remains in the generally horizontal attitude. The next step is to traverse the vehicle to final destination (through driving or flying and landing the vehicle at the destination), as indicated in block 82. This step may involve identifying a landing zone and performing an approach in the vertical takeoff and landing mode.

Integration with Carriers

In one aspect, a flying vehicle includes: a cab to contain items to be delivered; a propulsion unit having a rotating blade and an engine to rotate the blade; a rail from a cab top extending toward one external side of the cab, the cab having a moveable actuator coupled to the propulsion unit to move the propulsion unit between a first position above the cab during lift-off and a second position during lateral (forward or backward) flight. The vehicle integrates with a freight transportation marketplace to easily transition legacy freight transportation with the drones.

Implementations may include one or more of the following.

A method and apparatus supporting an automated closed loop freight transportation marketplace are described. The system provides the ability for a broker to see on a map available carrier for transporting loads and conversely for carriers to see brokers or freight owners who need transportation services.

FIG. 3A shows an on-line autonomous freight marketplace with a plurality of private networks 1-n. Shippers and their agents prefer to offer loads directly to transport carriers they trusted with good safety records. Shippers also wanted an easy to use system that would eliminate multiple phone calls and paper work . . . all at a good price. The system allows each shipper and/or an agent a private network of pre-qualified, preferred safe transport carriers with good safety scores. To facilitate the transaction, the system allows freight quoting and bidding, electronic signature features, electronic freight document facilitation, exchange, transmission and data storage. Vehicle 10 with load offers reputable shippers with an affordable and easy to use system that simplified vehicle's busy schedules and give the carriers the credibility of being prequalified, preferred with a good safety rating. The transportation marketplace automatically matches a shipper's freight with empty transport vehicles in the private networks 1-n, giving shippers private fleet dependability at backhaul pricing. The system allows users to manage consistent and repetitive airways to ensure freight gets where it needs to be on time and vehicles return as needed. Shippers can move freight and business toward sustainability, cost savings, and transportation reliability with the private networks PN1-PNn.

Figure 3B:
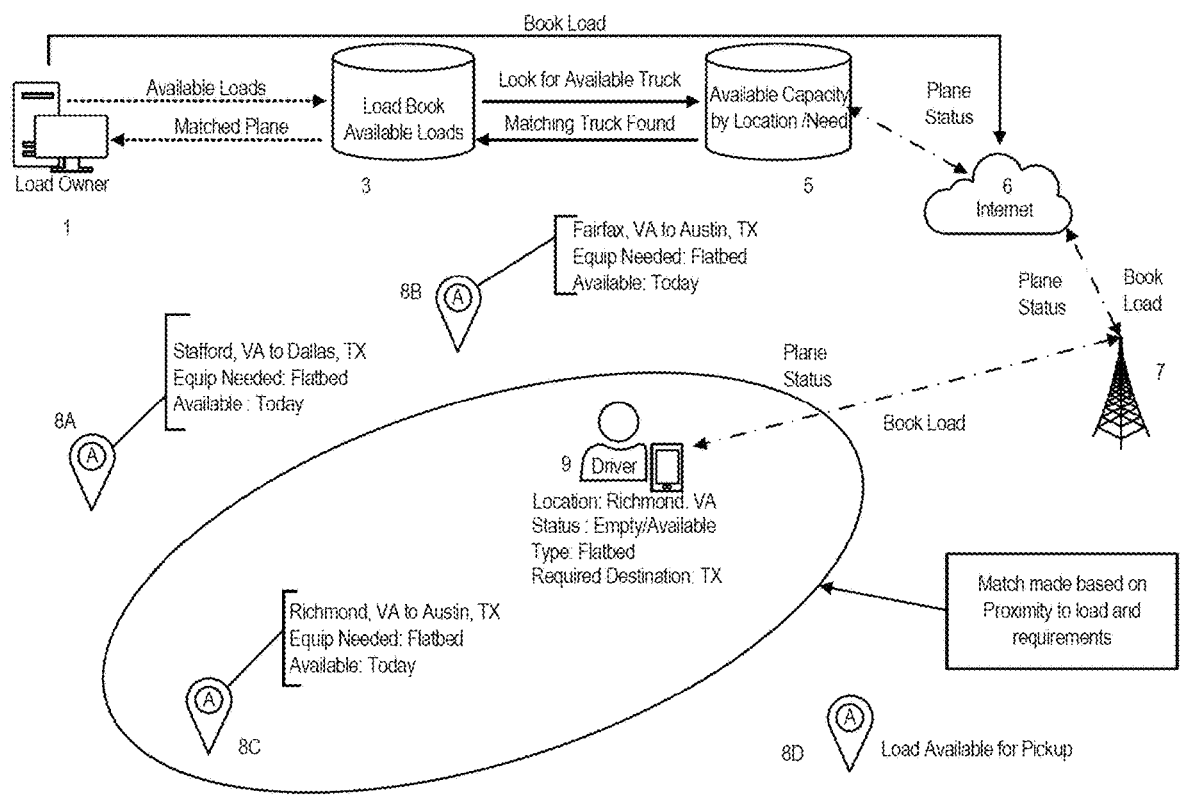

FIG. 3B shows an exemplary environment for matching vehicle 10s to loads. A load owner 1 (such as a manufacturer who needs to ship products) searches a load book database computer 3 for available load vehicles. The database computer 3 searches a second database computer 5 for available capacity by location and/or need. The database computer 3 looks for available vehicle from database computer 5, and in response the computer 5 returns matching vehicle(s). The database computer 5 communicates vehicle status over the Internet 6 and such vehicle status and book load information can be wireless communicated using cellular towers 7, for example to a plurality of subscribers 8A-8D in various locations. In this example, the system matches flight control system 80 9 to load 8C based on proximity to load and vehicle requirements.

Next an exemplary process to match shippers to vehicle 10 is disclosed. The process includes determining one or more vehicles 10 proximal to a geographical location of a shipping load, each shipping load having a shipping profile. The process then retrieves a profile of each nearby vehicle and compares the vehicle profile with the shipping profile to identify one or more matching vehicles. The process then contacts matching vehicle flight control system 80 about the shipping load. In a corresponding user interface for a vehicle 10 looking for a customer, a number of shipping prospects are offered to the vehicle computer, where the vehicle can retrieve each prospect's desired load capacity, type of load, the start and destination addresses, and desired delivery date and contact the prospect and/or provide a quote if there is a match. The process can include ratings by other vehicle owners and shippers of their respective delivery or payment performance. Posting capacity can be done without the time-consuming search of vehicle boards. The information is centralized so that once done, the vehicle 10 availability, profile, and capacity information can be viewed by a variety of users and available much sooner to the freight owner computer. The system helps vehicle 10s find perfect client ahead of time. Vehicle 10 can build loyalty with large shipper or freight brokerage who pays well and who needs services regularly. The rating system allows vehicle 10s and shippers to operate on the basis of quality and service rather than being completely focused on getting the cheapest rate all the time.

Figure 3C:
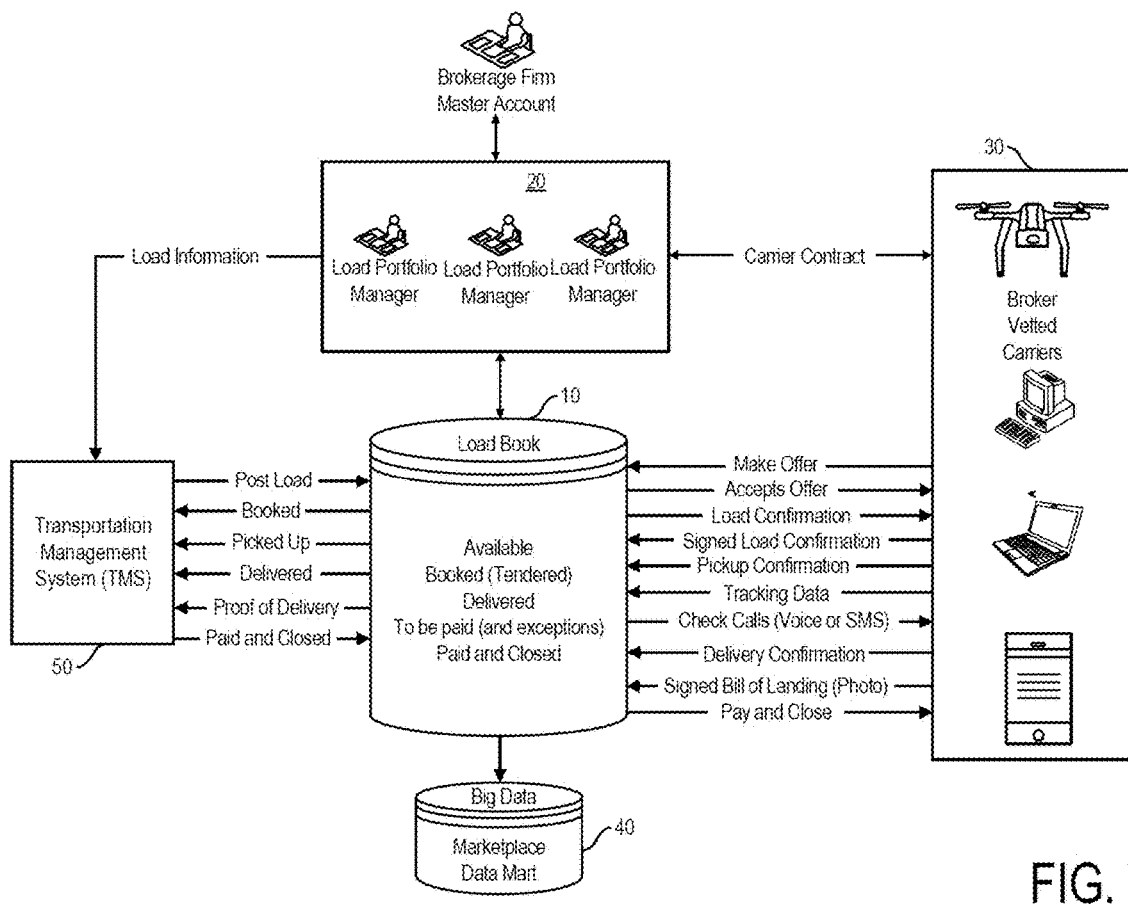

FIG. 3C is a network diagram depicting an online shipping service transaction processing system for an automated transportation marketplace. A load book 10 captures available loads for pick up, booked loads, delivered loads, deliveries waiting for payment, and paid/closed cases. The load book 10 is reviewed by a broker, which in turn can have sub-accounts each with a load portfolio manager, for example. The load book 10 also communicates with a plurality of carriers 30 through desktop computers, mobile computers, smart phones, among others. The carriers 30 can interact with the broker 20 to form contract directly, or can communicate through the load book 10 to offer and make/accept the offers. The carriers can also communicate load confirmation, pick up confirmation, provide tracking data, check calls, provide delivery confirmation, signs bill of lading, and receive payments to close out a contract, among others. The load book 10 and the broker 20 can load data into a customer transportation management system (TMS) 50 to post loads, receive load booking, receive pick-up and delivery information, and pay/close a shipping case. The load book 10 communicates with a marketplace data mart 40 which provides profiles of vehicle 10s, among others. The marketplace 40 receives location updates from each vehicle as the vehicle moves. Alternatively, the location can be communicated when a flight control system 80 posts his/her location using a post vehicle button 72 on a smartphone 70 running an application thereon. The application also captures vehicle capacity and owner profiles, and such information is wirelessly uploaded to the marketplace 40. The profile information is typically entered once, and the capacity information can be entered once, and available capacity can be periodically updated depending on the utilization of the vehicle during a particular trip, for example. Using wireless communication protocols, location update and capacity information can be updated in real-time. In one embodiment, the vehicle 10 inputs the information on his/her capacity into a template supplied by the load board and may include type of equipment, amount of deadhead mileage the owner is willing to travel to position the capacity to the origin of the load, current location of the capacity and where the owner of the capacity would like for the capacity to end up. The web client can access various marketplace and payment applications via the web interface supported by the load book 10. Similarly, a programmatic client accesses the various services and functions provided by the marketplace and payment. The programmatic client may, for example, be an application to enable vehicle 10s to author and manage vehicle service listings on the marketplace 40 in an off-line manner, and to perform batch-mode communications between the programmatic client 30 and the network-based marketplace 40.

Figure 3D:
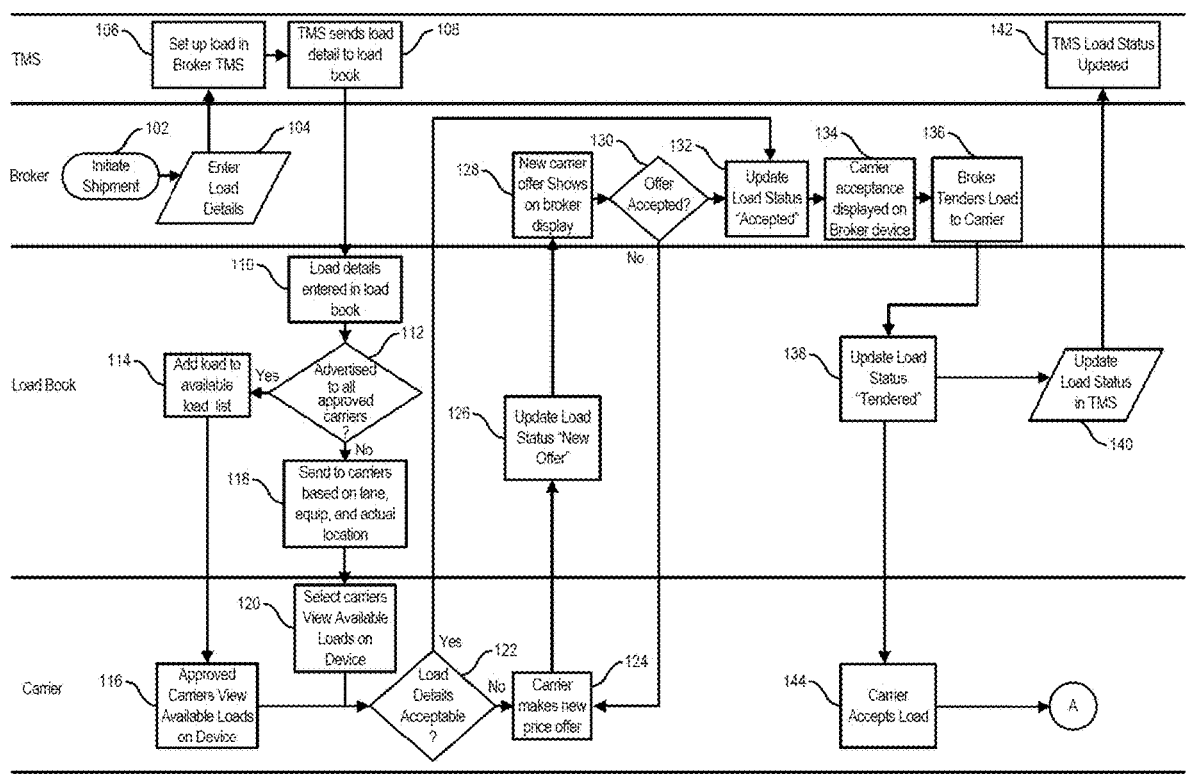

Turning now to FIG. 3D, a broker initiates a shipment (102) by entering load details (104). The load is set up in a Broker TMS DB entry 106. The TMS sends load details to load book (108). The load details are entered into a load book (110). The system checks if the load is to be advertised to all approved carriers (112). If so, the system adds the load to the available load list (114) and approved carriers view available loads to bid on their computer or mobile phone (116). From 112, if specific carriers from a selected list of Private Networks are to be used, the system sends bidding data to carriers based on airway, equipment, and location, among others (118). The carriers or vehicle 10s in the selected list of 118 then can review and prepare bids in response to the request (120). From 116 or 120, the vehicle 10 checks if the load details are acceptable (122) and if so accepts and proceeds to 132. Otherwise the vehicle 10/carrier proposes a new price (124) and change the load status to "New Offer" (126). The broker display picks up the new carrier/vehicle 10 offer (128) and makes a decision. If the offer is rejected in 130, the price negotiation is continued in 124 and otherwise the system proceeds to 132 and updates the load status as "Accepted". The carrier acceptance is also displayed on the broker device (134) and the broker tenders the load to the carrier or vehicle 10 (136) and the status is correspondingly updated as "Tendered" (138) The system then updates load status in TMS (140) and the TMS load status is updated (142). The carrier then accepts the load (144) and the broker initiates a load confirmation (146) and the broker TMS generates the load confirmation (148), or alternatively the system generates a load confirmation indication (150). In either case the carrier receives a digital load confirmation (152). The carrier electronically signs the load confirmation (154) and the load status is updated in the TMS (156), as completed in 158. From 154, if the carrier confirms pick up in a mobile app (160), the system updates the load status in the TMS (162), and the TMS load status is updated (164). From 146, the system determines if tracking is required (170), and if so, the system notifies the carrier that tracking is needed (172). In response the carrier turns on location broadcasting on the vehicle carrying the load (174). From 170 or 174, the broker decides if tracking is to be enabled (180) and if so, sets a tracking interval (182). The load book is updated as the system pings the carrier device and updates the current location (184) based on the device location sent at the predetermined interval (188), and the most recent carrier location is shown on the broker screen (186). From 180, the system also checks if the broker desires the vehicle call feature to be enabled (190). If so, the load book is updated to reflect that calls or text messaging (SMS) result is logged (192). Correspondingly, the carrier/vehicle responds to calls or messages from the shipper or broker (194). When the carrier arrives that the delivery location (196), the system checks if tracking is enabled (198) and if so, the system recognizes the carrier arrival at the delivery location (200) and updates the arrival of the shipment on the broker screen (202). Otherwise, the carrier confirms load delivery in the phone app (204), and updates the load status to "Delivered" (206), and the load delivery status is displayed on the broker screen (208). The system also sends a signal to update the TMS (210), and the TMS status is updated (212).

Figure 3E:
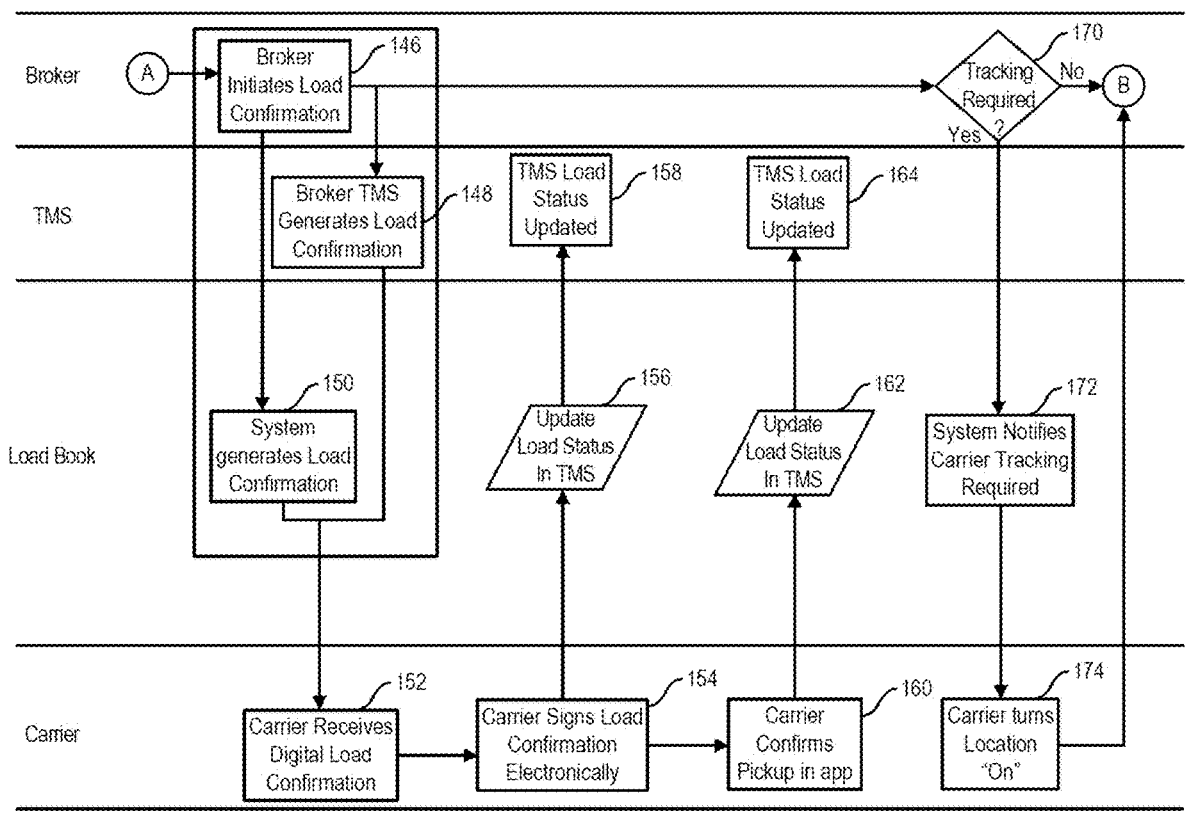

Turning to FIG. 3E, from 204, the system updates the TMS with a "Load Delivered" status (220). The load delivery information is displayed on the broker screen (222) and the TMS load status is also updated (224). The load book sub-system also prompts the carrier for a freight bill of lading (BOL) (226). The BOL works as a receipt of freight services, a contract between a freight carrier and shipper and a document of title. The bill of lading is a legally binding document providing the flight control system 80 and the carrier all the details needed to process the freight shipment and invoice it correctly. In one embodiment, the freight bill of lading is automatically generated based on the shipment details entered during the quoting and booking process. The bill of lading should be provided to the carrier on pick up and will be delivered to the consignee on delivery. The BOL can include the following:

- Shipper's and receiver's/consignee's names and complete addresses.
- PO or special account numbers used between businesses for order tracking.
- Special instructions for the carrier to ensure prompt delivery.
- The date of the shipment.
- The number of shipping units.
- Type of packaging, including cartons, pallets, skids and drums.
- A note if commodity is a Department of Transportation hazardous material. Special rules and requirements apply when you are shipping hazardous materials.
- A description of the items being shipped, include the material of manufacture and common name.
- The freight classification for the items being shipped.
- The exact weight of the shipment. The weight of each commodity is listed separately if multiple commodities are being shipped.
- The declared value of the goods being shipped.

The carrier can photograph a signature confirming the delivery as proof in the app (228), and sends the photo of the signed BOL from the app (230). The system formats that BOL and photo updates the load status (232). The broker screen shows the "Signed BOL" status (234). Next, the system checks if the receipt is acceptable (236). If so, the broker pays the carrier in the TMS (238) and approves payment or releases the funds to the system to pay the carrier (242). Otherwise the broker manually resolves the issue with the carrier (240). The load book correspondingly approves payment or releases the funds to the system to pay the carrier (244) and the system pays the carrier based on contract requirement (246). The load-book system updates the load status (248), and sets case as closed and sends the file to a data mart (252) and stores in the historical data mart (254) and exits. The TMS load status is also updated (250), and from 238 or 246, the funds are posted to the carrier account (260).

Figure 3F:
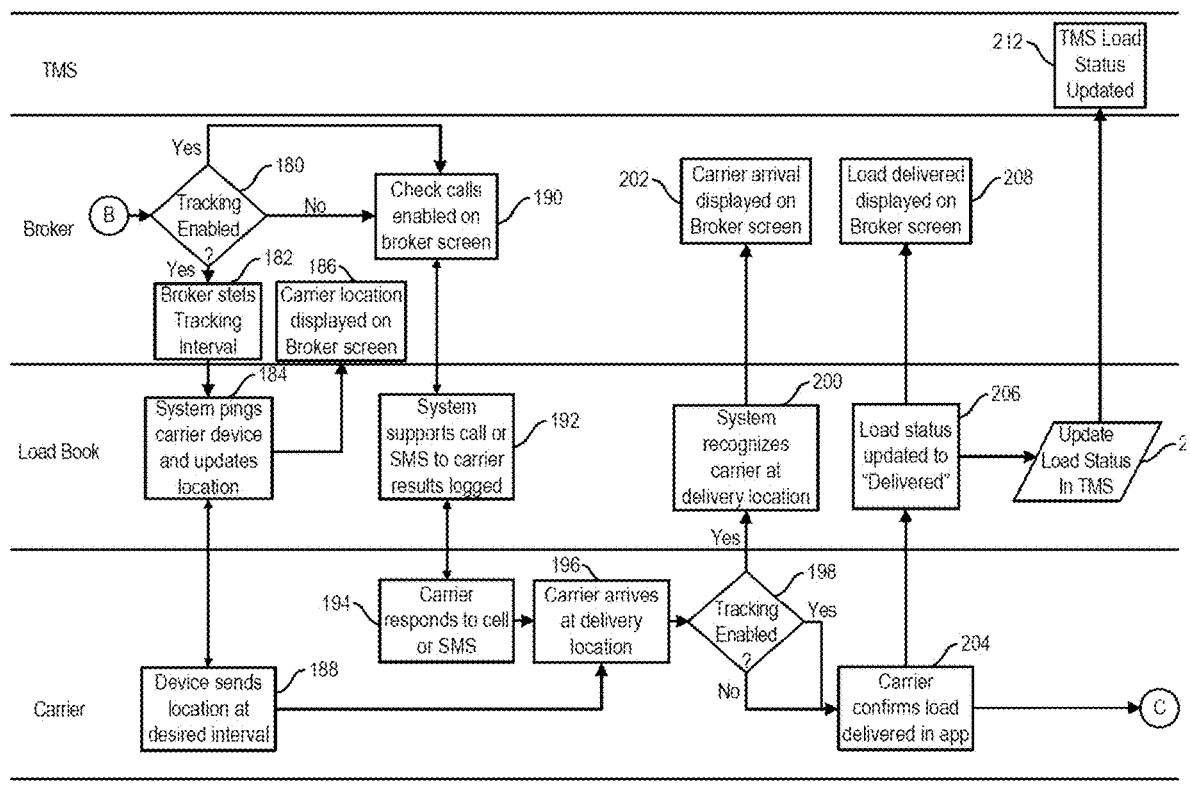
Figure 3G:
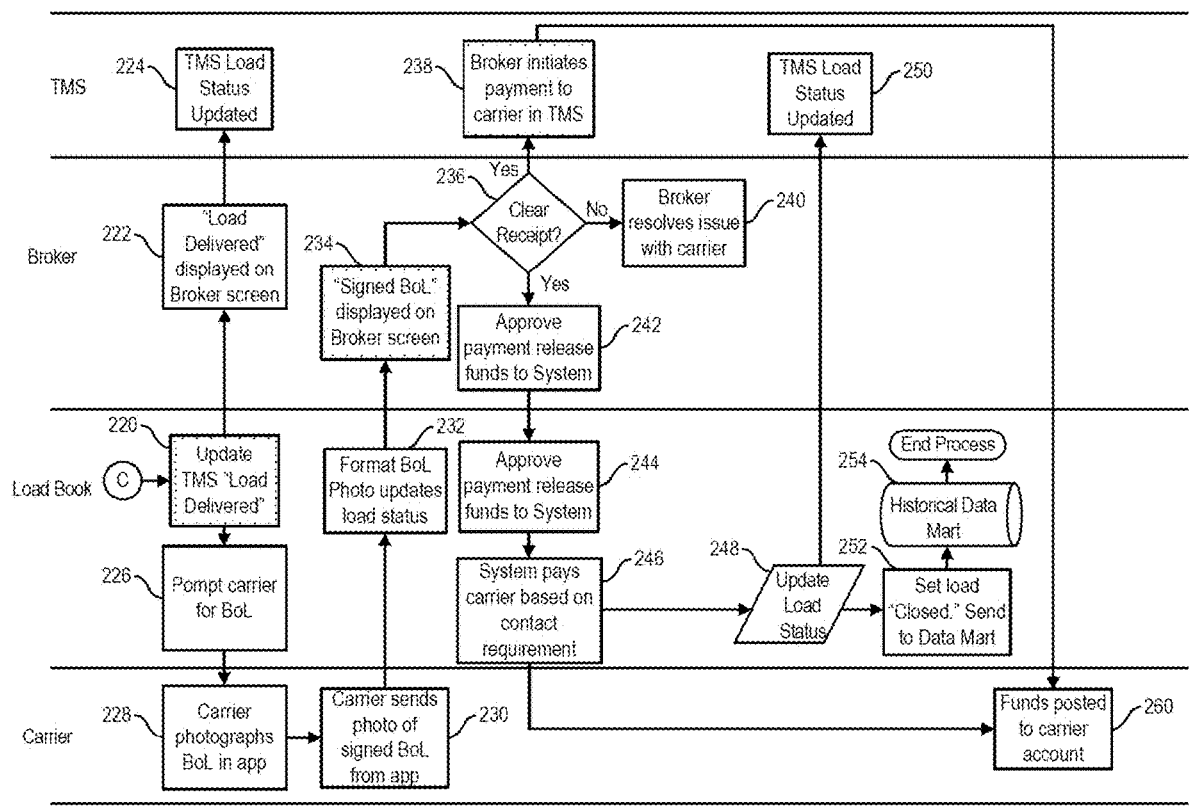
Figure 3H:
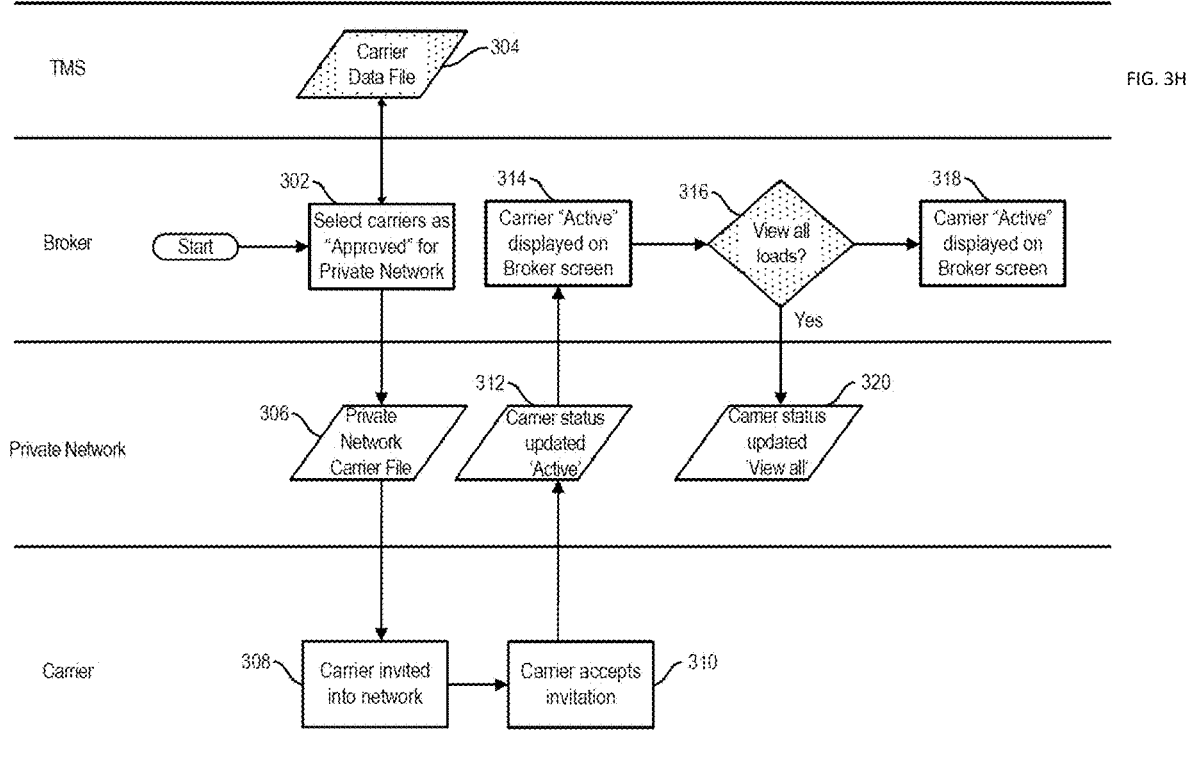
Figure 31:
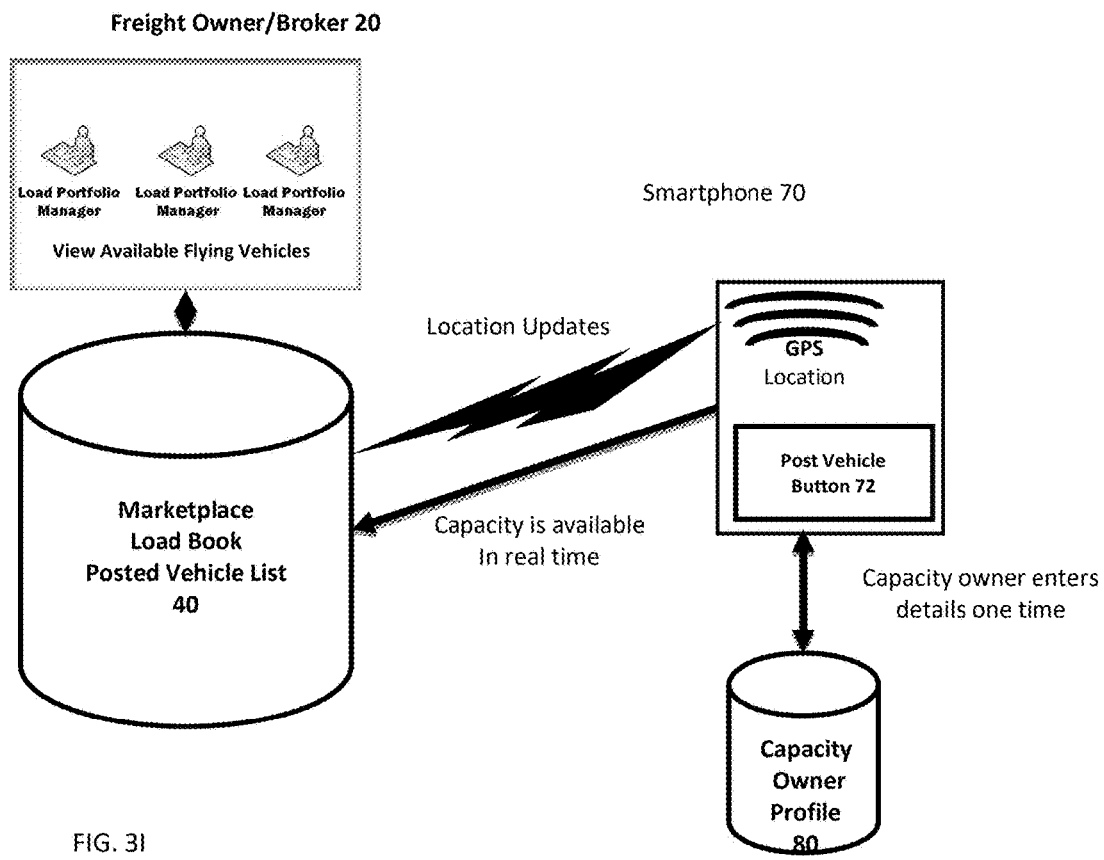

FIGS. 3F and 3G show exemplary processes for adding a carrier to a private network and the public network, respectively. In FIG. 3H, a broker selects one or more carriers as "Approved" for one or more private networks (302). The TMS updates its carrier data file (304), and the private network files are updated (306). The carrier receives an invitation to join the network (308). If the carrier accepts in 310, the private network carrier status is updated as "Active" (312). The carrier active indication is displayed on the broker screen (314). The process then checks if the broker wishes to see all loads (316), and if not, the "Carrier Active" is displayed on the broker screen (318) and otherwise the private networks are requested with a status update for all loads (320).

FIG. 3I shows an exemplary process to add carriers to an approved network. In one embodiment, the TMS contains the carrier data file (402) which is consulted when the broker marks a new carrier as "Approved" for the vehicle loads (404). The status is updated as "Approved" (406) and Vehicleload data is updated (408). Eventually, the broker needs to ship a load and searches for posted vehicles (410), and the "Approved" vehicle is displayed in a differentiated way on a map display (412). For example, "Approved" vehicles can be displayed as green color vehicles and the remaining vehicles are in black color, as illustrated by FIG. 1C. The broker can select one of the Approved vehicles (414) and if so the process allows the broker to tender the load to the carrier (416). On the carrier side, the carrier can update the system when the tender is received (418).

In one embodiment, the system collects information in advance from the capacity owner, who would note the type of equipment, the desired amount of deadhead miles needed to reposition the equipment, the desired destination and the amount the capacity owner needed to be profitable when moving the freight. With this information already captured and stored in a carefully designed web based platform, the capacity owner's exact location is gleaned from his/her smartphone (or electronic handheld device) and then would be transmitted to the freight owner through the available cell network to the freight owners web portal with 'one click' of a digital button on the capacity owner's handheld device. Thus the capacity owner would post his/her available capacity to a transportation marketplace with a large number of freight owner members in a matter of milliseconds making the capacity available for use by a ready and willing freight owner population. In addition, should the capacity owner reposition his/her vehicle, the GPS would track the smartphone location and transmit it back to the transportation marketplace, keeping the freight owners up to date on the location of the empty capacity.

Vehicle 10s and customers/brokers who have entered into a transaction can rate each other at the end of the transaction. A Feedback score is then attached to each member profile. The Feedback score is one of the most important pieces of a Feedback Profile. The Feedback score is the number in parentheses next to a member's username, and is also located at the top of the Feedback Profile. Next to the Feedback score, the user or member may also see an icon such as a vehicle with colors. The number of positive, negative, and neutral Feedback ratings a member has received over time are part of the Feedback score. For each transaction, vehicle 10s and shippers/brokers can choose to rate each other by leaving Feedback. Shippers/Brokers can leave a positive, negative, or a neutral rating, plus a short comment. Vehicle 10s can leave a positive rating and a short comment.

The system can support one or more features or functions on a website hosted by the third party. The third party website may, for example, provide one or more promotional, marketplace or payment functions that are supported by the relevant applications of the freight marketplace 40.

The marketplace 40 itself, or one or more parties that transact via the marketplace 40, may operate loyalty programs that are supported by one or more loyalty/promotions applications. For example, a shipper or broker may earn loyalty or promotions points for each transaction established and/or concluded with a particular vehicle 10 or carrier, and be offered a reward for which accumulated loyalty points can be redeemed.

The Vehicle Web site host may be configured to enable the user to view reputation information (e.g., feedback) with respect to another user. The user may request to view the reputation information associated with the opposite transacting party. Alternatively, the user may be presented with the relevant reputation information associated with the opposite transacting party responsive to the user's request to enter into a transaction with another user. The overall view may be provided to the user according to the requesting user's preferences stored in "User Preferences". A view of associated reputation information is then retrieved from the feedback score table stored in "Feedback Score" and the feedback left score table stored in "Feedback Left Score". If the user desires details, then the details may be presented (e.g., in paginated format) utilizing "Feedback Detail History Overall" and "Feedback Detail History". The user may be enabled selectively to access reputation information according to criteria such as promptness of payment information, quality of performance information, timeliness of performance information, or promptness of response information as well as according to other criteria. Other criteria may be, but not limited to, shipping, packaging, item accurately described, promptness of leaving feedback, was the item returned by the shipper, was there a non-payment, when was the item received, etc.

In another aspect, a method includes communicating to one or more vehicles over one or more wireless networks; receiving a delivery request from a company specifying a pickup location, a package, and a delivery location; directing a vehicle 10 to pick up the package at the pickup location and to deliver the package to the delivery location, wherein the company computer generates a flight plan to the vehicle based on the delivery request.

The drone method can further include receiving a second delivery request from a second company specifying a second pickup location, a second package, and a second delivery location; selecting a second vehicle 10 of the one or more vehicles 10 for the delivery requests; and directing the second vehicle 10 to pick up the second package at the second pickup location and to deliver the second package to the second delivery location, wherein the air traffic control system provides a second flight plan to the second vehicle 10 based on the second delivery request. The process assigns the vehicle 10 a specified flying airway and ensuring the vehicle 10 is within the specified flying airway based on the communicating. The method can further include receiving photographs and/or video of the delivery location subsequent to delivery of the package; and providing the photographs and/or video as a response to the delivery request. The directing can include providing a delivery technique comprising one of landing, dropping via a tether, dropping to a doorstep, dropping to a mailbox, dropping to a porch, and dropping to a garage.

In another aspect, a computer-implemented method to match a flying vehicle to a company with a load to ship, comprising:
  identifying one or more carriers as a preferred vendor or a private network in a database;
  tracking a geographical location of a vehicle from the private network of vendors;
  determining one or more shipping loads proximal to the geographical location of the vehicle, each shipping load having a shipping profile;
  retrieving a vehicle profile;
  comparing the vehicle profile with each shipping profile to identify one or more matching loads; and
  notifying a vehicle flight control system of matching loads.

Implementations may include one or more steps of: sending a notification to the device of a nearby position of the load, the nearby position of the load related to one or more categories of interest, the notification sent in response to proximity of the geographical location of the device relative to the position of the load.
  specifying the category of interest manually or learning the category of interest automatically.
  applying geo-fencing to trigger proximity of the vehicle flight control system device to the position of the load.
  automatically discovering new loads or points of interest in proximity to the vehicle flight control system device based on a detected change in the geographical location of the vehicle flight control system device.
  creating and updating a repository that includes a category of interest in association with the vehicle flight control system device, geolocation information for movable loads, temporary loads, and new loads.
  creating and presenting a list of points of interest on the vehicle flight control system device as the notification to the vehicle flight control system 80 and for vehicle flight control system interaction.
  collecting feedback on delivery performance.
  requesting generic rating information related to a load delivery.
  requesting specific rating information related the plurality of performance categories.

In yet another aspect, method to expedite a shipping transaction on behalf of a shipper, comprising:
  using a freight broker computer or mobile device, identifying a list of vehicles driving between a source and a destination;
  determining one or more favorite vehicle 10s from a favorite vehicle 10 list;
  sharing transaction information only with favorite vehicle 10s for pricing negotiation;
  negotiating an expedited agreement based on the shared transaction information; and
  selecting one of the favorite vehicle 10s for the shipping transaction.

Implementations may include one or more of:
  displaying the favorite vehicle 10s and the source.
  displaying the favorite vehicle 10s and the destination.
  automatically notifying vehicle 10s near the source to bid on the shipping transaction.

automatically notifying favorite vehicle 10s near the source to bid on the shipping transaction.

providing financial information relating to the transaction.

communicating transaction information with mobile devices associated with the favorite vehicle.

rating the favorite vehicle by the shipper or a broker.

periodically replenishing the favorite vehicle 10 list by selecting a highly rated vehicle 10 not in the favorite vehicle list.

determining a selected vehicle below a predetermined rating threshold and removing the selected vehicle from the favorite vehicle list.

Aerial Product Pickup/Delivery

In one aspect, a flying vehicle includes: a cab to contain products to be delivered; a propulsion unit having a rotating blade and an engine to rotate the blade; a rail from a cab top extending toward one external side of the cab, the cab having a moveable actuator coupled to the propulsion unit to move the propulsion unit between a first position above the cab during lift-off and a second position during lateral (forward or backward) flight.

Implementations may include one or more of the following.

The drone delivery service can manage delivery for a variety of providers enabling drone delivery for smaller providers. Further, the ATC system can be used to schedule, manage, and coordinate pickup, distribution, delivery, and returns.

FIG. 4A-4B shows exemplary views of a drone or UAV with releasable product clamps. This embodiment is similar to those in FIGS. 1A-1B, except the embodiment is focused on carrying a container. For parcel transport, a plurality (such as 4) cabins can be linked together for increased capacity. The vehicle 10 has a propulsion unit 12 having a rotating blade and an engine to rotate the blade. The vehicle includes a rail 16 from a container top extending toward one external side of the container. The rail or the cab has a moveable actuator coupled to the propulsion unit 12 to move the propulsion unit 12 between a first position above the cab during lift-off and a second position behind or in front of the container during forward flight or backward flight. The container can be secured to the propulsion unit 12 with robotic grabber 8 that can automatically secure or release the container during drop off. Alternatively, the propulsion unit 12 can be manually strapped to the container for low cost.

FIG. 4C shows the control electronics. Since the parcel delivery has a cost constraint, the drone offloads processing to edge computers on the cellular network. 5G networks have low latency so the processing can be done and returned in time to navigate the drone. The control is low cost and includes one or more cameras 85, accelerometer/gyroscope 86, a motor flight control system 80 with motor 87, a cellular/wifi transceiver 87, and a processor serving as flight control system 80. The processor optionally controls a heater 83 that provides heat to an optional balloon 85 to cause the drone to float mid air and reduces power required by the motor 87. The drone communicates and is controlled by a plurality of ATC 89 located on cell towers or Wifi communication towers, among others.

The ATC 89 can maintain data such as location information received and updated periodically from each of the plurality of vehicles 10, and wherein the location information is correlated to coordinates and altitude. The location information can be determined based on a combination of triangulation by the plurality of cell towers and a determination by the vehicle 10 based on a location identification network. The processing for the delivery application authorization and management can include checking the coordinates and the altitude based on a flight plan, for each of the plurality of vehicles 10. The checking the coordinates and the altitude can further include assuring each of the plurality of vehicles 10 is in a specified flying airway.

In one embodiment, the ATC 89 utilizing wireless networks and concurrently supporting delivery application authorization and management includes the processor and the network interface communicatively coupled to one another; and the memory storing instructions that, when executed, cause the processor to: communicate, via the network interface, with a plurality of vehicles 10 via a plurality of cell towers associated with the wireless networks, wherein the plurality of vehicles 10 each include hardware and antennas adapted to communicate to the plurality of cell towers; maintain data associated with flight of each of the plurality of vehicles 10 based on the communicating; process the maintained data to perform a plurality of functions associated with air traffic control of the plurality of vehicles 10; and process the maintained data to perform a plurality of functions for the delivery application authorization and management for each of the plurality of vehicles 10.

For delivery drones, the airway management aims to manage deliveries efficiently while secondarily to ensure collision avoidance. The ATC can implement various routing techniques to allow the vehicles 10 to use associated airway to arrive and deliver packages. Thus, one aspect of airway management, especially for delivery applications, is efficiency since efficient routing can save time, fuel, etc. which is key for deliveries.

The delivery airway covers all flight phases which include preflight, takeoff, en route, descent, and landing. Again, the airway includes coordinates (e.g., GPS, etc.), altitude, speed, and heading at a specified time. As described herein, the vehicle 10 is configured to communicate to the ATC, during all of the flight phases, such as via the transceivers and communication networks. The ATC is configured to monitor and manage/control the airway as described herein. The objective of this management is to avoid collisions, avoid obstructions, avoid flight in restricted areas or areas with no network coverage, etc.

During preflight, the vehicle 10 is configured to communicate with the ATC for approvals (e.g., flight plan, destination, the flying airway, etc.) and notification thereof, for verification (e.g., weather, delivery authorization, etc.), and the like. The key aspect of the communication during the preflight is for the ATC to become aware of the flying airway, to ensure it is open, and to approve the vehicle 10 for takeoff. Other aspects of the preflight can include the ATC coordinating the delivery, coordinating with other systems, etc. Based on the communication from the vehicle 10 (as well as an operator, scheduler, etc.), the ATC can perform processing to make sure the airway is available and if not, to adjust accordingly.

During takeoff, the vehicle 10 is configured to communicate with the ATC for providing feedback from the vehicle 10 to the ATC. Here, the ATC can store and process the feedback to keep up to date with the current situation in airspace under control, for planning other airway, etc. The feedback can include speed, altitude, heading, etc. as well as other pertinent data such as location (e.g., GPS, etc.), temperature, humidity, wind, and any detected obstructions during takeoff. The detected obstructions can be managed by the ATC as described herein, i.e., temporary obstructions, permanent obstructions, etc.

Once airborne, the vehicle 10 is en route to the destination and the ATC is configured to communicate with the ATC for providing feedback from the vehicle 10 to the ATC. Similar to takeoff, the communication can include the same feedback. Also, the communication can include an update to the airway based on current conditions, changes, etc. The vehicle 10 is continually in data communication with the ATC via the networks.

As the destination is approached, the ATC can authorize/instruct the vehicle 10 to begin the descent. Alternatively, the ATC can pre-authorize based on reaching a set point. Similar to takeoff and en-route, the communication in the descent can include the same feedback. The feedback can also include information about the landing spot as well as processing by the ATC to change any aspects of the landing based on the feedback. The landing can include a physical landing or hovering and releasing cargo.

The landing authorization and management can be at the home base of the vehicle 10, at a delivery location, and/or at a pickup location. The ATC can control and approve the landing. For example, the ATC can receive photographs and/or video from the vehicle 10 of the location (home base, delivery location, pickup location). The ATC can make a determination based on the photographs and/or video, as well as other parameters such as wind speed, temperature, etc. to approve the landing.

For example, a vehicle 10 from the delivery operator can fly to various distribution/pickup locations as instructed by the ATC over wireless networks for package pickup and delivery to various delivery locations, e.g., homes, offices, etc. The delivery operator can provide a delivery service which supports multiple different distribution/pickup locations such as for different companies. That is, the delivery service can support various companies in a geographic region, supported by the ATC 89. The delivery service can be for smaller companies who cannot build their own drone fleet. For example, the delivery service can be similar to parcel delivery services, albeit via the vehicles 10. Of course, other embodiments are contemplated. Also, it is contemplated that the vehicle 10 can handle multiple packages at the same time, including from different distribution/pickup locations and with different delivery locations. The vehicle 10 and camera 85 can aim to drop the package in front of a door. Further, if the camera 85 detects that the blade may cause personal injury, the vehicle 10 performs emergency shutdown of the motor 87, even if it means damage to the vehicle and to the content it carries to avoid personal injury.

As shown in FIG. 4D, a warehouse system 51 routes the container of the vehicle 10 through various assembly stations to put the content to be delivered into the container. The warehouse 51 has an area may be designated for the loading and unloading of pods carrying parcels to be transported by drones to other exchange stations in order to reach a final destination. The warehouse system is connected to a passenger terminal such as terminal 50 (FIG. 2A) so that items from long range ports or terminals such as Oakland/LA ports using rail/truck transport to the warehouse 51. It will be appreciated that "terminals" or "public transportation infrastructure terminals" as used herein are intended to include, but are not limited to, bus stops, train stations, harbors, shipyards, monorail stations, airports, vehicle charging stations, and subway stations. Furthermore, it will be appreciated that "vehicles" or "public transportation infrastructure vehicles" as used herein are intended to include, but are not limited to, trains, buses, cars, monorails, subways, flight control system 80, bullet trains, boats, subways, and planes. Moreover, it will be appreciated that "drones" as used herein are intended to include Unmanned Aerial Vehicles ("UAVs"), quadcopters, quadrotors, unmanned aircraft, and multirotor unmanned aerial vehicles. The system includes a support structure 20, a horizontal track 30 connected to the support structure 20, wherein the track 30 is positioned above ground level, wherein the track 30 includes a plurality of airways thereon including bypass airways. A loading station 40 is accessible from the first bypass airway and an unloading station accessible from the second bypass airway. The support structure 20 is used to support the track 30 above a ground level, which includes the ground surface, water surface, city obstructions, or various other structures extending from the ground. The support structure 20, because of the many types of terrain that the support structure 20 can encounter, may take on a variety of shapes and configurations, as well as be comprised of various types of materials. In one embodiment, the support structure 20 includes a pair of vertical columns spaced apart to allow a vehicle 10 to travel between. A horizontal structure or beam may be connected at the upper end of the two columns 21, forming an inverted U-shaped configuration. The track 30 will then be attached to the horizontal structure and the carrier vehicle 10 suspended therefrom. It is appreciated that in this configuration, multiple structures may be located along the track 30, including a number of support structures 20 deemed necessary to support the track 30 and carried vehicles 10 traveling along the track 30. The support structure 20 may also include a cable support system supporting the vertical beams overhead.

In some embodiments, the delivery system employs a "top-down" architecture that centrally determines the drone delivery routes, vehicles, terminals, and drones utilized for public infrastructure facilitated drone delivery. For example, in such a "top-down" based delivery system, the delivery system determines the packages and drones that are placed on specific vehicles, and which packages depart from certain terminals at certain times at the beginning of each day before delivery commences.

In other embodiments, the delivery system employs an "emergent" or "bottom-up" architecture that uses rules to govern behavior of the delivery system. For example, in an "emergent" based delivery system, local servers determine drone delivery routes (e.g., once a package and a drone arrive at a terminal, a server on the terminal parses through local geolocation data to determine a drone delivery route). Moreover, in an example "emergent" based delivery system, individual components of the delivery system recalculate the next delivery "step" after each previous "step" is completed (e.g., once a drone delivers a package and returns to a terminal, the delivery system determines a next vehicle arriving at the terminal that needs more drones to deliver packages, and the system will then send an instruction to the drone to board the identified vehicle when the identified vehicle arrives at the terminal). In example "emergent" embodiments, the delivery system identifies a vehicle to pick up a drone from a terminal after delivery based on one or more of: a minimum time for a vehicle to arrive at the terminal, number of packages on board each vehicle, and number of drones on board each vehicle.

Drone offload exchange stations comprises a set of loading bays, each loading bay may have one or more separate loading docks for drones to drop off pods. Backup docks may be implemented in exchange stations that expect a higher volume of drone traffic enable multiple drones to drop-off pods simultaneously. It should be understood that although eight loading bays are illustrated in this embodiment, it may be possible to have as few or as many loading bays as needed as space allows. Loading bays may be arranged in such a fashion that they may be located towards the direction of respective exchange station designation. This may reduce the number of flight paths crossing as drones take off and fly to their designated exchange stations. Drones may land at a target loading bay, and after offloading all pods, may park in a designated drone parking area, a 4-pod drone bay, or a 1-pod drone bay. This embodiment only utilizes one of each drone bay, but it may be possible to have as many as needed to provide space for drones that may be on standby. In a future embodiment in which drones of various shapes and sizes are introduced, there may be more parking areas designated for each drone type, or one area may be designated for mixed drone parking.

While it is generally simple to consolidate numerous packages and move large numbers of parcels between large freight stations, it is often much less efficient to transport smaller numbers of goods to their final destinations. In various example embodiments described herein, drones (e.g., Unmanned Aerial Vehicles or "UAVs") are utilized to increase the efficiency of "last mile" delivery. Given the limitations of battery technologies, drones have a limited range and often need to be recharged once their batteries, or another energy source, are depleted. This has the potential to limit the areas in which drone delivery is possible to locations within a short distance of warehouses or freight stations. Furthermore, various example embodiments described herein can lessen drone traffic, which may be an eyesore as well as a safety risk. Example embodiments contemplate the use of existing public transportation infrastructure to deliver packages and drones to a particular public infrastructure terminal (e.g., a bus stop) where drone delivery commences, which can highly extend the effective range of drone delivery systems and alleviate some drone traffic.

Moreover, example embodiments described herein can lower setup costs of drone delivery by utilizing existing infrastructure. For example, a bus traveling along an existing bus route can deliver drones and packages to a bus stop within a predetermined radius of a package destination, and one or more drones can deliver one or more packages from the bus stop to the package destination.

Various example embodiments, using drones to deliver packages, allow for package delivery in areas difficult to reach. For example, various embodiments allow for package delivery to a roof, windowsill of a multi-story building or apartment, a backyard, a user-specified geolocation, or directly to a current user geolocation based on a geolocation of a user device (e.g., as determined via a GPS component of a mobile device such as a cellphone).

To initiate the process of drone delivery, in some embodiments, the delivery system receives a request, submitted by a user, to deliver an item using a drone (e.g., when the user purchases or posts an offer to sell the item on an e-commerce website). In a specific example, once the user submits his or her payment information on an e-commerce website, the user is directed to a shipping options page that prompts the user to input a delivery address and provides the user with an option for drone delivery of the item. In such example embodiments, the delivery system receives this request for drone delivery of the item including location information of a drop-off destination. In some embodiments, the drop-off destination is a set physical location, such as a home address or an office address. In some embodiments, the drop-off destination is linked to geolocation data detected at a user device of the user (e.g., a smartphone, a wearable device, or a user's personal vehicle). For example, the user downloads an application on her smartwatch and provides permission via the application for the delivery system to access the geolocation data detected at the smartwatch of the user, and the delivery system uses the geolocation data of the smartwatch as the drop-off destination.

In some embodiments, the delivery system communicates an instruction to cause the package to be transported by the vehicles to a final terminal (e.g., a bus stop, train depot, or subway station). In example embodiments, the drone delivery system determines a drone delivery route and communicates an instruction to the drone to deliver the package to the drop-off destination via the determined drone delivery route.

In various embodiments, the delivery system accesses public infrastructure information including public infrastructure terminal locations and public infrastructure vehicle route information (e.g., "vehicle route information"). In some embodiments, the vehicle route information includes timing information or scheduling information.

Consistent with some embodiments, once the system determines the drop-off destination and a specified delivery time or range of times, the delivery system identifies a public infrastructure terminal from which the drone delivers the package to the drop-off destination. For example, the delivery system identifies a particular public infrastructure terminal closest or near closest in distance to the desired drop-off destination. In this example, the delivery system designates the identified closest terminal as the terminal from which the drone will deliver the package. In some embodiments, once the delivery system identifies the closest terminal, the delivery system communicates an instruction to transport the package to the identified public infrastructure terminal (e.g., the delivery system sends a message to a warehouse that has the package with an instruction to transport the package to the identified closest terminal).

In example embodiments, the delivery system receives an indication that the package has arrived at the identified public infrastructure terminal (e.g., a final terminal). In certain embodiments, the delivery system receives the indication that the package has arrived in response to a physical identifier affixed to the package (e.g., a Radio Frequency Identification (RFID) tag, an optical barcode, or a smart tag) that uniquely identifies the package being detected at the identified public infrastructure terminal. In other embodiments, the indication is received in response to an operator, administrator, or manager of the delivery system inputting data into the delivery system for each package that is brought to the identified public infrastructure terminal.

In various embodiments, the delivery system determines a drone delivery route from the identified public infrastructure terminal to the drop-off destination based on public infrastructure information (e.g., public transportation infrastructure data including public infrastructure terminal locations and public infrastructure vehicle route information). In an example where drone delivery is facilitated by trains and train routes, the delivery system determines a drone delivery route by finding a minimum or near-minimum route distance between an identified train depot and the drop-off destination. In further examples, the delivery system determines a three-dimensional delivery trajectory (e.g., defining the longitude, latitude, and altitude along the route) to guide the drone over power lines, above bridges, and around heavily forested areas.

Once the delivery system determines a drone delivery route, in various example embodiments, the delivery system communicates, to the drone, an instruction for the drone to deliver the package from the identified public infrastructure terminal to the drop-off destination using the drone delivery route. Once the delivery system communicates an instruction to the drone to deliver the package, in example embodiments, the drone picks up the package and flies along the determined drone delivery route to drop off the package at the drop-off destination.

In one process arrival and unloading of a drone carrying pods at a drone offload exchange station according to the embodiment of FIG. 4E. The process is similar for both 1-pod and 4-pod drones. First, a drone carrying content/pods arrives at a drone offload exchange station (202). At 204, the drone flies towards a first loading bay where it may drop off one or more pods. For efficiency purposes, incoming drones may unload pods in loading bays in ascending order according to slot numbers of their respective loading bay dock. In some cases, drones may drop off pods at a transit bay instead of a loading bay if a passenger in a pod has his exchange station as their final stop. In another case, if a passenger is flying to their final stop after the present exchange station, the pod may be dropped off at a 1-pod drone bay to catch a drone to their final stop. At 206, the drone descends to the first loading bay and unlatches from pods that are designated for drop-off at the present loading bay. At step 208, after unloading of pods is completed at the present loading bay, the drone ascends to a safe flying altitude. At step 210, if the drone is still carrying pods, the process may return to step 204 and repeat steps 204 to 210 for as many different loading bays as necessary to drop off all pods. Once pod drop-off has been completed, step 212 is reached, and a quick analysis is performed to decide whether the drone needs to be charged. If the power supply is at sufficient levels, the drone may be directed to park in a respective drone bay. In the case in which no other drone is available, the drone may be directed by exchange station manage control to a loading bay to pick up pods to fly to a next exchange station. From 212, if a charge is needed, in 216 the drone may be directed to a charging bay, and docks into an open spot to receive a charge.

FIG. 4F shows an exemplary process to use computer vision to deliver the package to a door or a designated spot:
  Upload a flight plan to the flight control system of the vehicle and get authorization (221)
  Lift vehicle into the air in a vertical takeoff and landing mode (222)
  Transition the vehicle from the vertical takeoff and landing mode to a forward flight mode (223)
  Transport the vehicle to the desired destination location (224)
  Use camera/computer vision to detect a door or a designated delivery spot and navigate drone to the door/designated landing spot (225)
  Transition vehicle from the forward flight mode to the vertical takeoff and landing mode (226)
  Land vehicle at destination, deliver the package and return to base (227)

In one embodiment, the drone locks the content so thieves cannot take the package, and only after the user signs on a web site or a mobile app or a smartwatch app to acknowledge delivery, and then the drone releases the package and returns to base.

In another embodiment, a buyer car trunk can be remotely opened and the drone can use computer vision to drop the package into the car trunk, hover near the car, and notify the user to lock the trunk before returning to base.

Autonomous Flying Taxi Service

In one aspect, a flying vehicle includes: a cab with an optional passenger seat with optional steering control; a propulsion unit having a rotating blade and an engine to rotate the blade; a rail from a cab top extending toward one external side of the cab, the cab having a moveable actuator coupled to the propulsion unit to move the propulsion unit between a first position above the cab during lift-off and a second position during lateral (forward or backward) flight, the cab responding to a taxi request to ferry a customer to a destination.

In another aspect, a navigation method includes receiving a service request with a pickup location and a destination from a passenger; selecting a vehicle proximal to the passenger; picking up the passenger and transporting the passenger with the vehicle by: querying nearby vehicles for nearby vehicle travel plans; generating a travel plan for the vehicle based on the destination and the nearby vehicle travel plans; generating a travel path free of conflict and communicating travel plan to a traffic control system; executing the travel plan upon receiving an approval from the traffic control system.

In yet another aspect shown in FIG. 5A, an exemplary method to provide taxi or on-demand transportation services includes:
  receiving a service request with a pickup location and a destination from a passenger;
  selecting a vehicle proximal to the passenger;
  picking up the passenger and transporting the passenger with the vehicle by:
    querying nearby vehicles for nearby vehicle travel plans;
    generating a travel plan for the vehicle based on the destination and the nearby vehicle travel plans;
    generating a travel path free of conflict and communicating travel plan to a traffic control system;
    executing the travel plan upon receiving an approval from the traffic control system.

Implementations can include one or more of the following sub operations:
  The vehicle can resubmit the travel plan if rejected.
  Implementations may include one or more of the following.

FIG. 5B shows an exemplary process for matching flying vehicles to loads. From the start 20, the process runs a load matching engine 22 that receives posted vehicle data 24 and an active load list 26. The load match engine checks if the vehicle meets load criteria 28 and if not the next vehicle is tested for a matching load. If the load criteria is met, the process checks if the vehicle is available in 30 and if not the process loops back to 22 to process the next vehicle. If available, the process sends an available load list to the flight control system or vehicle owner web portal in 32. The available loads are displayed in 34-36. The flying vehicle owner then reviews the load and calls the load owner to negotiate price in 38. Next, if the load owner books the vehicle in 40, the load list is updated and vehicle is removed from the available list in 42 and the vehicle data is posted. Meanwhile, vehicle location is posted in the vehicle data 24 based on GPS and smartphone location transmissions in 44.

FIG. 5C shows an exemplary system to match shippers to flying vehicles, while FIG. 5B shows an exemplary system to match a flying vehicle with prospective customers. FIG. 5D shows an exemplary process to match shippers to flying vehicles. The process includes determining one or more flying vehicles proximal to a geographical location of a shipping load, each shipping load having a shipping profile (102). The process then retrieves a profile of each nearby vehicle and comparing the vehicle profile with the shipping profile to identify one or more matching vehicles (104). The process then contacts matching vehicle flight control system 80(s) about the shipping load (106).

FIG. 5E shows a corresponding user interface for a flying vehicle 4 looking for a customer. In FIG. 5B, a number of shipping prospects 6 are sent to the flying vehicle. The flying vehicle can retrieve each prospect's desired load capacity, type of load, the start and destination addresses, and desired delivery date and contact the prospect and/or provide a quote if there is a match.

FIG. 5F shows an exemplary process to match flying vehicles to shippers. The process includes tracking a geographical location of a mobile device associated with a vehicle (110). The process determines one or more shipping loads proximal to the geographical location of the mobile device, each shipping load having a shipping profile (112). The process also includes retrieving a vehicle profile (114) and comparing the vehicle profile with each shipping profile to identify one or more matching loads (116). The process then messages a dispatching computer on the mobile device of matching loads (118). The process can include ratings by flying vehicles and shippers of their respective performance. Posting capacity can be done without the time consuming search of vehicle boards. The information is centralized so that once done, the flying vehicle availability, profile, and capacity information can be viewed by a variety of uses and available much sooner to the freight owner. Once the freight owner sees the available capacity, he/she could immediately engage the capacity owner and negotiate for his/her services. Thus, the capacity owner would not have to wait long for a booking and would be able to again be generating revenue from the engagement of the transportation asset. The system helps flying vehicles find perfect client ahead of time. Flying vehicles can build loyalty with large shipper or freight brokerage who pays well and who needs services regularly. The rating system allows flying vehicles and shippers to operate on the basis of quality and service rather than being completely focused on getting the cheapest rate all the time.

Vehicle Sharing or Rental

In one aspect, a flying vehicle includes: a cab that can be rented by its owner to nearby passengers (network of passenger); a propulsion unit having a rotating blade and an engine to rotate the blade; a rail from a cab top extending toward one external side of the cab, the cab having a moveable actuator coupled to the propulsion unit to move the propulsion unit between a first position above the cab during lift-off and a second position during lateral (forward or backward) flight.

In another aspect, a method of sharing autonomous flying vehicle includes: associating a unique identifier associated with a flight control system with a sharing server; periodically analyzing a location of the flight control system based on a geospatial data associated with the location of the flight control system 80; listing the flight control system on a sharing network; processing a payment of a renter of the flight control system in a threshold radial distance from the flight control system when the flight control system is predictable at the non-transitory location for a predictably available period of time; instructing the flight control system to navigate to the location of the renter; periodically updating the owner and the renter based on at least one of a time in transit, time to arrival, time to destination, and a payment earned status.

Implementations may include one or more of the following. A company or individual may own and/or lease a flight control system 10 as detailed below. In one aspect, a method of a flying vehicle sharing server includes associating a unique identifier associated with a flight control system with the flying vehicle sharing server, periodically analyzing a location of the flight control system based on a geospatial data associated with the location of the flight control system 80, and declaring a non-transitory location of the flight control system based on a predictable behavior algorithm. The method permits an owner of the flight control system to list the flight control system on a flying vehicle sharing network. In addition, the method processes a payment of a renter of the flight control system in a threshold radial distance from the flight control system when the flight control system is predictable at the non-transitory location for a predictably available period of time. Furthermore, a financial account of the owner of the flight control system is credited with the payment of the renter of the flight control system in the threshold radial distance from the flight control system when the flight control system is predictable at the non-transitory location for a predictably available period of time.

The unique identifier of the flight control system may be a license plate of the vehicle, and/or a social networking profile of the user in a geo-spatial social community. The method may include automatically recommending connections to the owner of the flight control system based on the non-transitory location. The connections may be associated with other users of the geo-spatial social community based on other users of the geo-spatial social community sharing a common interest with the owner in the threshold radial distance from the non-transitory location, and/or other flight control system of the geo-spatial social community whose owners share the common interest with the owner in the threshold radial distance from the non-transitory location. The method may include automatically instructing the flight control system 80 car to navigate to the location of the renter, and/or periodically updating the owner and/or the renter based on a time in transit, a time to arrival, time to destination, and/or the payment earned status. A criteria associated with a flying vehicle listing data including a description, a photograph, a video, a rental fee, a category, a vehicle make, a vehicle model, and/or a functional status may be processed.

In addition, an availability chart may be populated when the flight control system associated with the listing criteria is posted. The availability chart may include an operation area radius, a start timing, an end timing, an hours per day, and/or an hour per user. The method may further include determining that the flying vehicle listing data is generated by the verified user of the neighborhood broadcast system when validating that the flying vehicle listing data is associated with the mobile device. It may be determined that an application on the mobile device is communicating the flying vehicle listing data to the flying vehicle sharing network when the flying vehicle listing data may be processed.

The verified user may be associated with a verified user profile in the flying vehicle sharing network through the application on the mobile device. The flying vehicle listing data generated through the mobile device may be presented as a flying vehicle sharing alert pushpin of the flying vehicle listing data in a geospatial map surrounding pre-populated residential and/or business listings in a surrounding vicinity, such that the flying vehicle sharing alert pushpin of the flying vehicle listing data may automatically presented on the geospatial map in addition to being presented on the set of user profiles having associated verified addresses in the threshold radial distance from the set of geospatial coordinates associated with the flying vehicle listing data generated through the mobile device of the verified user of the flying vehicle sharing server.

The flying vehicle listing data generated through the mobile device may be radially distributed through an on-page posting, an electronic communication, and/or a push notification delivered to desktop and/or mobile devices associated with users and/or their user profiles around an epicenter defined at the set of geospatial coordinates associated with the flying vehicle listing data that may be generated through the mobile device to all subscribed user profiles in a circular geo-fenced area (defined by the threshold distance from the set of geospatial coordinates associated with the flying vehicle listing data generated through the mobile device) through the radial algorithm of the flying vehicle sharing network that measures a distance away of each address associated with each user profile from the current geospatial location at the epicenter.

The method may include permitting the verified user to drag and/or drop the flying vehicle sharing alert pushpin on any location on the geospatial map, and/or automatically determining a latitude and/or longitude associated a placed location. The method may further include automatically notifying a user, a business, and/or a flying vehicle rental agency in a surrounding geospatial area to the set of geospatial coordinates associated with the flying vehicle listing data generated through the mobile device. The geospatial coordinates may be extracted from a metadata associated with the flying vehicle listing data generated through the mobile device when verifying that the set of geospatial coordinates associated with the flying vehicle listing data generated through the mobile device are trusted based on the claimed geospatial location of the verified user of the flying vehicle sharing server.

A relative match between a persistent clock associated with the flying vehicle sharing server and/or a digital clock of the mobile device may be determined to determine that the timestamp associated with the creation date and/or time of the flying vehicle listing data generated through the mobile device may accurate and/or therefore trusted. A publishing of the flying vehicle listing data generated through the mobile device may be automatically deleted on a set of user profiles having associated verified addresses in the threshold radial distance from the set of geospatial coordinates associated with the flying vehicle listing data generated through the mobile device of the verified user of the flying vehicle sharing server based on a flying vehicle sharing alert expiration time.

The method may also include geocoding a set of residential addresses each of which may be associated with a resident name in a neighborhood surrounding the mobile device. The set of residential addresses each associated with the resident name may be pre-populated as the set of user profiles in the threshold radial distance from the claimed geospatial location of the verified user of the flying vehicle sharing server in a neighborhood curation system communicatively coupled with the flying vehicle sharing server. The verified user may be permitted to modify content in each of the set of user profiles. The modified content may be tracked through the neighborhood curation system. A reversible history journal associated with each of the set of user profiles may be generated such that a modification of the verified user can be undone on a modified user profile page.

An editing credibility of the verified user may be determined based on an edit history of the verified user and/or a community contribution validation of the verified user by other users of the neighborhood curation system. The method may include automatically publishing the flying vehicle listing data generated through the mobile device to a set of user profiles having associated verified addresses in a threshold radial distance from the claimed geospatial location of the verified user of the flying vehicle sharing server using the radial algorithm.

A claim request of the verified user generating the flying vehicle listing data generated through the mobile device to be associated with an address of the neighborhood curation system may be processed. It may be determined if the claimable neighborhood in the neighborhood curation system may be associated with a private neighborhood community in the claimable neighborhood of the neighborhood curation system. The verified user may be associated with the private neighborhood community in the claimable neighborhood of the neighborhood curation system if the private neighborhood community has been activated by the verified user and/or a different verified user. The verified user may be permitted to draw a set of boundary lines in a form of a geospatial polygon such that the claimable neighborhood in a geospatial region surrounding the claim request may create the private neighborhood community in the neighborhood curation system if the private neighborhood community may be inactive.

The method may verify the claim request of the verified user generating the flying vehicle listing data generated through the mobile device to be associated with a neighborhood address of the neighborhood curation system when the address may be determined to be associated with a work address and/or a residential address of the verified user. The flying vehicle listing data generated through the mobile device may be simultaneously published on the private neighborhood community associated with the verified user generating the flying vehicle listing data generated through the mobile device in the threshold radial distance from the address associated with the claim request of the verified user of the neighborhood curation system when automatically publishing the flying vehicle listing data generated through the mobile device on a set of user profiles having associated verified addresses in a threshold radial distance from the claimed geospatial location of the verified user of the flying vehicle sharing server based on a set of preferences of the verified user using the radial algorithm.

The renter and/or other renters may be permitted to view the rating and/or the review provided by the flight control system 80 car owner for each of the renters based on a participation criteria set by the flight control system 80 car owner and/or the renter, such that each renter may able to view ratings and/or reviews of each participating candidate for the rental associated with the flying vehicle listing data. Each renter for the rental of the flight control system associated with the flying vehicle listing data may be permitted to communicate with each other and/or form social connections with each other based on the participation criteria set by the flight control system 80 car owner and/or the renter, such that each renter may able to form social connections with each participating candidate for the rental associated with the flying vehicle listing data.

The method may also include permitting participating flight control system owners in the flying vehicle sharing server to see previous ratings, comments, reviews, prescreen questions, and/or background checks of across a plurality of renters applying for a plurality flight control system 80 car rentals through the flying vehicle sharing server (such that different flight control system 80 car owners benefit from previous diligence of at one of the previous ratings, comments, reviews, prescreen questions, and/or background checks by participating flight control system 80 car owners with each renter that has previously rented through the flying vehicle sharing server). A summary data may be provided to the flight control system 80 car owner generating the flying vehicle listing data generated through the mobile device of how many user profile pages were updated with an alert of the flying vehicle listing data generated through the mobile device when publishing the flying vehicle listing data generated through the mobile device in the private neighborhood community and/or the set of user profiles having associated verified addresses in the threshold radial distance from the claimed geospatial location of the verified user of the flying vehicle sharing server based on the set of preferences of the verified user.

The flying vehicle listing data generated through the mobile device may be live broadcasted to the different verified user and/or other verified users in the private neighborhood community (and/or currently within the threshold radial distance from the current geospatial location) through the flying vehicle sharing server through a multicast algorithm such that a live broadcast multicasts to a plurality of data processing systems associated with each of the different user and/or the other verified users simultaneously (when the mobile device of the verified user generating the live-broadcast enables broadcasting of the flying vehicle listing data generated through the mobile device to any one of a geospatial vicinity around the mobile device of the verified user generating the broadcast and/or in any private neighborhood community in which the verified user has a non-transitory connection). The different verified user and/or other verified users in the private neighborhood community may be permitted to bi-directionally communicate with the verified user generating the broadcast through the flying vehicle sharing server.

Any private neighborhood community in which the verified user has a non-transitory connection may be a residential address of the verified user and/or a work address of the verified user that has been confirmed by the flying vehicle sharing server as being associated with the verified user. The threshold distance may be between 0.2 and/or 0.4 miles from the set of geospatial coordinates associated with the flying vehicle listing data generated through the mobile device to optimize a relevancy of the live-broadcast. The flying vehicle sharing server may include a crowd-sourced moderation algorithm in which multiple neighbors in a geospatial area determine what content contributed to the flying vehicle sharing server persists and/or which may be deleted.

The flying vehicle sharing server may permit users to mute messages of specific verified users to prevent misuse of the flying vehicle sharing server. The flying vehicle sharing server may permit the flying vehicle listing data to be disseminated to adjacent neighborhoods that have been claimed by different users in a manner such that the flying vehicle listing data may optionally disseminated to the surrounding claimed neighborhoods based on a preference of the verified user. A claimed neighborhood of the verified user may be activated based on a minimum number of other verified users in the threshold radial distance that have been verified through a primary residential address associated with each of the other verified users through a postcard verification, a utility bill verification, a privately-published access code, and/or a neighbor vouching method. Access to the flying vehicle listing data may be restricted to the claimed neighborhood of the verified user. Access to the flying vehicle listing data may denied to users having verified addresses outside the claimed neighborhood of the verified user.

In another aspect, the method of the flight control system includes communicating a unique identifier associated with the flight control system with a flying vehicle sharing server and periodically determining a location of the flight control system based on a geospatial data associated with the location of the flight control system 80. The method further includes automatically setting a navigation route of the flight control system when the flight control system is located at a non-transitory location of the flight control system based on a predictable behavior algorithm. In addition, a payment of a renter of the flight control system in a threshold radial distance from the flight control system is processed when the renter is picked up by the flight control system 80. A unique identifier associated with a flight control system may be associated with the flying vehicle sharing server. A location of the flight control system may be periodically analyzed based on a geospatial data associated with the location of the flight control system 80. A non-transitory location of the flight control system may be declared based on a predictable behavior algorithm. An owner of the flight control system may be permitted to list the flight control system on a flying vehicle sharing network, wherein the flight control system 80 car navigation route automatically instructed to navigate to the location of the renter.

In yet another aspect, a system includes a network and an autonomous vehicle to automatically set a navigation route of the autonomous vehicle to a location of a renter of the autonomous vehicle when the autonomous vehicle is located at a non-transitory location of the autonomous vehicle based on a predictable behavior algorithm. The system also includes a flying vehicle sharing server communicatively coupled with the autonomous vehicle to credit a financial account of an owner of the autonomous vehicle with a payment of the renter of the autonomous vehicle in the threshold radial distance from the autonomous vehicle when the autonomous vehicle is predictable at the non-transitory location for a predictably available period of time.

A unique identifier associated with a flight control system may be associated with the flying vehicle sharing server. A location of the flight control system may be periodically analyzed based on a geospatial data associated with the location of the flight control system 80. A non-transitory location of the flight control system may be declared based on a predictable behavior algorithm. An owner of the flight control system may be permitted to list the flight control system on a flying vehicle sharing network, wherein the flight control system 80 car navigation route automatically instructed to navigate to the location of the renter.

The unique identifier may be a license plate of the autonomous vehicle, and/or a social networking profile of the user in a geo-spatial social community. A connection recommendation module may automatically recommend connections to the owner of the autonomous vehicle based on the non-transitory location. The connections may be associated with other users of the geo-spatial social community based on other users of the geo-spatial social community sharing a common interest with the owner in the threshold radial distance from the non-transitory location, and/or other autonomous vehicles of the geo-spatial social community whose owners share a common interest with the owner in the threshold radial distance from the non-transitory location. A navigation module may automatically instruct the autonomous vehicle to navigate to the location of the renter. An update module may periodically update the owner and/or the renter based on time in transit, time to arrival, time to destination, and/or the payment earned status.

A criteria module may process a criteria associated with a flying vehicle listing data including a description, a photograph, a video, a rental fee, a category, a vehicle make, a vehicle model, and/or a functional status. A charting module may populate an availability chart when the autonomous vehicle associated with the listing criteria is posted. The availability chart may include an operation area radius, a start timing, an end timing, an hours per day, and/or an hours per user. A validation module may determine that the flying vehicle listing data is generated by the verified user of the neighborhood broadcast system when validating that the flying vehicle listing data is associated with the mobile device. An application module may determine that an application on the mobile device is communicating the flying vehicle listing data to the flying vehicle sharing network when the flying vehicle listing data is processed.

An association module may associate the verified user with a verified user profile in the flying vehicle sharing network through the application on the mobile device. A pushpin module may present the flying vehicle listing data generated through the mobile device as a flying vehicle sharing alert pushpin of the flying vehicle listing data in a geospatial map surrounding pre-populated residential and/or business listings in a surrounding vicinity (such that the flying vehicle sharing alert pushpin of the flying vehicle listing data may be automatically presented on the geospatial map in addition to being presented on the set of user profiles having associated verified addresses in the threshold radial distance from the set of geospatial coordinates associated with the flying vehicle listing data generated through the mobile device of the verified user of the flying vehicle sharing server).

The flying vehicle listing data generated through the mobile device may be radially distributed through an on-page posting, an electronic communication, and/or a push notification delivered to desktop and/or mobile devices associated with users and/or their user profiles around an epicenter defined at the set of geospatial coordinates associated with the flying vehicle listing data generated through the mobile device to all subscribed user profiles in a circular geo-fenced area (defined by the threshold distance from the set of geospatial coordinates associated with the flying vehicle listing data generated through the mobile device) through the radial algorithm of the flying vehicle sharing network that may measure a distance away of each address associated with each user profile from the current geospatial location at the epicenter. A placement module may permit the verified user to drag and/or drop the flying vehicle sharing alert pushpin on any location on the geospatial map, and/or automatically determine a latitude and/or a longitude associated a placed location. A notification module may automatically notify a user, a business, and/or a flying vehicle rental agency in a surrounding geospatial area to the set of geospatial coordinates associated with the flying vehicle listing data generated through the mobile device.

An extraction module may extract the geospatial coordinates from a metadata associated with the flying vehicle listing data generated through the mobile device when verifying that the set of geospatial coordinates associated with the flying vehicle listing data generated through the mobile device are trusted based on the claimed geospatial location of the verified user of the flying vehicle sharing server. A matching module may determine a relative match between a persistent clock associated with the flying vehicle sharing server and/or a digital clock of the mobile device to determine that the timestamp associated with the creation date and/or time of the flying vehicle listing data generated through the mobile device may accurate and/or therefore trusted. A deletion module may automatically delete a publishing of the flying vehicle listing data generated through the mobile device on a set of user profiles having associated verified addresses in the threshold radial distance from the set of geospatial coordinates associated with the flying vehicle listing data generated through the mobile device of the verified user of the flying vehicle sharing server based on a flying vehicle sharing alert expiration time.

A plotting module may geocode a set of residential addresses each associated with a resident name in a neighborhood surrounding the mobile device. A data-seeding module may prepopulate the set of residential addresses each associated with the resident name as the set of user profiles in the threshold radial distance from the claimed geospatial location of the verified user of the flying vehicle sharing server in a neighborhood curation system communicatively coupled with the flying vehicle sharing server. A modification module may permit the verified user to modify content in each of the set of user profiles. A discovery module may track the modified content through the neighborhood curation system. An undo module may generate a reversible history journal associated with each of the set of user profiles such that a modification of the verified user can be undone on a modified user profile page. A reputation module may determine an editing credibility of the verified user based on an edit history of the verified user and/or a community contribution validation of the verified user by other users of the neighborhood curation system. A publication module may automatically publish the flying vehicle listing data generated through the mobile device to a set of user profiles having associated verified addresses in a threshold radial distance from the claimed geospatial location of the verified user of the flying vehicle sharing server using the radial algorithm.

A claiming module may process a claim request of the verified user generating the flying vehicle listing data generated through the mobile device to be associated with an address of the neighborhood curation system. A private-neighborhood module may determine if the claimable neighborhood in the neighborhood curation system may be associated with a private neighborhood community in the claimable neighborhood of the neighborhood curation system. An association module may associate the verified user with the private neighborhood community in the claimable neighborhood of the neighborhood curation system if the private neighborhood community has been activated by the verified user and/or a different verified user. A boundary module may permit the verified user to draw a set of boundary lines in a form of a geospatial polygon such that the claimable neighborhood in a geospatial region surrounding the claim request may create the private neighborhood community in the neighborhood curation system if the private neighborhood community may inactive.

An address type module may verify the claim request of the verified user generating the flying vehicle listing data generated through the mobile device to be associated with a neighborhood address of the neighborhood curation system when the address is determined to be associated with a work address and/or a residential address of the verified user. A concurrency module may simultaneously publish the flying vehicle listing data generated through the mobile device on the private neighborhood community associated with the verified user generating the flying vehicle listing data generated through the mobile device in the threshold radial distance from the address associated with the claim request of the verified user of the neighborhood curation system (when automatically publishing the flying vehicle listing data generated through the mobile device on a set of user profiles having associated verified addresses in a threshold radial distance from the claimed geospatial location of the verified user of the flying vehicle sharing server based on a set of preferences of the verified user using the radial algorithm).

A communication module may automatically initiate a video communication and/or an audio communication between the mobile device of the owner of the autonomous vehicle and/or another mobile device of the renter through the flying vehicle sharing server based on the profile of the renter associated with the flying vehicle listing data through the flying vehicle sharing server. A review module may permit the renter and/or other renters to view the rating and/or the review provided by the owner of the autonomous vehicle for each of the renters based on a participation criteria set by the owner of the autonomous vehicle and/or the renter, such that each renter may be able to view ratings and/or reviews of each participating candidate for the rental associated with the flying vehicle listing data. A social connection module may permit each renter for the rental of the autonomous vehicle associated with the flying vehicle listing data to communicate with each other and/or form social connections with each other based on the participation criteria set by the owner of the autonomous vehicle and/or the renter, such that each renter may able to form social connections with each participating candidate for the rental associated with the flying vehicle listing data.

A diligence module may permit participating owners of the autonomous vehicles in the flying vehicle sharing server to see previous ratings, comments, reviews, prescreen questions, and/or background checks of across a plurality of renters applying for a plurality autonomous vehicle rentals through the flying vehicle sharing server such that different owner of the autonomous vehicles benefit from previous diligence of at one of previous ratings, comments, reviews, prescreen questions, and/or background checks by participating owner of the autonomous vehicles with each renter that has previously rented through the flying vehicle sharing server. A summary module may provide a summary data to the owner of the autonomous vehicle generating the flying vehicle listing data generated through the mobile device of how many user profile pages were updated with an alert of the flying vehicle listing data generated through the mobile device when publishing the flying vehicle listing data generated through the mobile device in the private neighborhood community and/or the set of user profiles having associated verified addresses in the threshold radial distance from the claimed geospatial location of the verified user of the flying vehicle sharing server based on the set of preferences of the verified user.

A live broadcast module may live broadcast the flying vehicle listing data generated through the mobile device to the different verified user and/or other verified users in the private neighborhood community and/or currently within the threshold radial distance from the current geospatial location through the flying vehicle sharing server through a multicast algorithm such that a live broadcast multicasts to a plurality of data processing systems associated with each of the different user and/or the other verified users simultaneously (when the mobile device of the verified user generating the live-broadcast enables broadcasting of the flying vehicle listing data generated through the mobile device to any one of a geospatial vicinity around the mobile device of the verified user generating the broadcast and/or in any private neighborhood community in which the verified user has a non-transitory connection).

A bi-directional communication module may permit the different verified user and/or other verified users in the private neighborhood community to bi-directionally communicate with the verified user generating the broadcast through the flying vehicle sharing server. Any private neighborhood community in which the verified user has a non-transitory connection may be a residential address of the verified user and/or a work address of the verified user that has been confirmed by the flying vehicle sharing server as being associated with the verified user. The threshold distance may be between 0.2 and/or 0.4 miles from the set of geospatial coordinates associated with the flying vehicle listing data generated through the mobile device to optimize a relevancy of the live-broadcast. The flying vehicle sharing server may include a crowd-sourced moderation algorithm in which multiple neighbors in a geospatial area may determine what content contributed to the flying vehicle sharing server persists and/or which may be deleted. The flying vehicle sharing server may permit users to mute messages of specific verified users to prevent misuse of the flying vehicle sharing server.

The flying vehicle sharing server may permit the flying vehicle listing data to be disseminated to adjacent neighborhoods that have been claimed by different users in a manner such that the flying vehicle listing data may be optionally disseminated to the surrounding claimed neighborhoods based on a preference of the verified user. A claimed neighborhood of the verified user may be activated based on a minimum number of other verified users in the threshold radial distance that have been verified through a primary residential address associated with each of the other verified users through a postcard verification, a utility bill verification, a privately-published access code, and/or a neighbor vouching system. Access to the flying vehicle listing data may be restricted to the claimed neighborhood of the verified user. Access to the flying vehicle listing data may be denied to users having verified addresses outside the claimed neighborhood of the verified user.

Implementations may include the following actions: populating an availability chart when the flight control system associated with a listing criteria is posted, wherein the availability chart includes at least one of an operation area radius, a start timing, an end timing, an hours per day, an hours per user; determining that the automotive listing data is generated by a verified user of a neighborhood broadcast system when validating that the automotive listing data is associated with a mobile device; determining that an application on the mobile device is communicating the automotive listing data to the automobile sharing network when the automotive listing data is processed; associating the verified user with a verified user profile in the automobile sharing network through the application on the mobile device; and presenting the automotive listing data generated through the mobile device as an automobile sharing alert pushpin of the automotive listing data in a geospatial map surrounding pre-populated residential and business listings in a surrounding vicinity, such that the automobile sharing alert pushpin of the automotive listing data is automatically presented on a geospatial map in addition to being presented on a set of user profiles having associated verified addresses in the threshold radial distance from a set of geospatial coordinates associated with the automotive listing data generated through the mobile device of the verified user of the automobile sharing server; wherein the automotive listing data generated through the mobile device is radially distributed through at least one of an on-page posting, an electronic communication, and a push notification delivered to desktop and mobile devices associated with users and their user profiles around an epicenter defined at the set of geo spatial coordinates associated with the automotive listing data generated through the mobile device to all subscribed user profiles in a circular geo-fenced area defined by a threshold distance from the set of geospatial coordinates associated with the automotive listing data generated through the mobile device through a radial algorithm of the automobile sharing network that measures a distance away of each address associated with each user profile from a current geospatial location at the epicenter. The unique identifier of the flight control system is at least one of a license plate of the flight control system 80, and a social networking profile of a user in a geo-spatial social community. Other actions include automatically recommending connections to the owner of the flight control system based on the non-transitory location, wherein a set of connections are associated with other users of the geo-spatial social community based on at least one of: other users of the geo-spatial social community sharing a common interest with the owner in the threshold radial distance from the non-transitory location, and other flight control system 80 of the geo-spatial social community whose owners share a common interest with the owner in the threshold radial distance from the non-transitory location. One implementation includes processing a claim request of the verified user generating the automotive listing data generated through the mobile device to be associated with an address of the neighborhood curation system; determining if a claimable neighborhood in the neighborhood curation system is associated with a private neighborhood community in the claimable neighborhood of the neighborhood curation system; associating the verified user with the private neighborhood community in the claimable neighborhood of the neighborhood curation system if the private neighborhood community has been activated by at least one of the verified user and a different verified user; permitting the verified user to draw a set of boundary lines in a form of a geospatial polygon such that the claimable neighborhood in a geospatial region surrounding the claim request creates the private neighborhood community in the neighborhood curation system if the private neighborhood community is inactive; verifying the claim request of the verified user generating the automotive listing data generated through the mobile device to be associated with a neighborhood address of the neighborhood curation system when the address is determined to be associated with at least one of a work address and a residential address of the verified user; and simultaneously publishing the automotive listing data generated through the mobile device on the private neighborhood community associated with the verified user generating the automotive listing data generated through the mobile device in the threshold radial distance from the address associated with the claim request of the verified user of the neighborhood curation system when automatically publishing the automotive listing data generated through the mobile device on the set of user profiles having associated verified addresses in the threshold radial distance from the claimed geospatial location of the verified user of the automobile sharing server based on a set of preferences of the verified user using the radial algorithm. Another implementation includes automatically downloading a set of profiles to the mobile device, wherein the owner of the flight control system is the verified user; automatically initiating at least one of a video communication and an audio communication between the mobile device of the owner of the flight control system and another mobile device the renter through the automobile sharing server based on the profile of the renter associated with the automotive listing data through the automobile sharing server; permitting the renter and other renters to view at least one of the rating and the review provided by the owner of the flight control system for each of the renters based on a participation criteria set by at least one of the owner of the flight control system and the renter, such that each renter is able to view ratings and reviews of each participating candidate for a rental associated with the automotive listing data; permitting each renter for the rental of the flight control system associated with the automotive listing data to communicate with each other and form social connections with each other based on the participation criteria set by at least one of the owner of the flight control system and the renter, such that each renter is able to form social connections with each participating candidate for the rental associated with the automotive listing data; permitting participating owner of the flight control system 80 in the automobile sharing server to see at least one of previous ratings, comments, reviews, prescreen questions, and background checks of across a plurality of renters applying for a plurality flight control system rentals through the automobile sharing server such that different owners of the flight control system 80 benefit from previous diligence of at one of the previous ratings, comments, reviews, prescreen questions, and background checks by participating owner of the flight control system 80 with each renter that has previously rented through the automobile sharing server; and providing a summary data to the owner of the flight control system generating the automotive listing data generated through the mobile device of how many user profile pages were updated with an alert of the automotive listing data generated through the mobile device when publishing the automotive listing data generated through the mobile device in at least one of the private neighborhood community and the set of user profiles having associated verified addresses in the threshold radial distance from the claimed geospatial location of the verified user of the automobile sharing server based on the set of preferences of the verified user. Yet other implementation includes live broadcasting the automotive listing data generated through the mobile device to the different verified user and other verified users in at least one of the private neighborhood community and currently within the threshold radial distance from a current geospatial location through the automobile sharing server through a multicast algorithm such that a live broadcast multicasts to a plurality of data processing systems associated with each of a different user and the other verified users simultaneously when the mobile device of the verified user generating the live-broadcast enables broadcasting of the automotive listing data generated through the mobile device to any one of a geospatial vicinity around the mobile device of the verified user generating a broadcast and in any private neighborhood community in which the verified user has a non-transitory connection; and permitting the different verified user and other verified users in at least one of the private neighborhood community to bi-directionally communicate with the verified user generating the broadcast through the automobile sharing server, wherein any private neighborhood community in which the verified user has the non-transitory connection is at least one of the residential address of the verified user and the work address of the verified user that has been confirmed by the automobile sharing server as being associated with the verified user, wherein a threshold distance is between 0.2 and 0.4 miles from the set of geospatial coordinates associated with the automotive listing data generated through the mobile device to optimize a relevancy of the live-broadcast, wherein the automobile sharing server includes a crowd-sourced moderation algorithm in which multiple neighbors to a geospatial area determine what content contributed to the automobile sharing server persists and which is deleted, wherein the automobile sharing server permits users to mute messages of specific verified users to prevent misuse of the automobile sharing server, wherein the automobile sharing server permits the automotive listing data to be disseminated to adjacent neighborhoods that have been claimed by different users in a manner such that the automotive listing data is optionally disseminated to the surrounding claimed neighborhoods based on a preference of the verified user, wherein a claimed neighborhood of the verified user is activated based on a minimum number of other verified users in the threshold radial distance that have been verified through a primary residential address associated with each of the other verified users through at least one of a post card verification, a utility bill verification, a privately-published access code, and a neighbor vouching method, wherein access to the automotive listing data is restricted to the claimed neighborhood of the verified user, and wherein access to the automotive listing data is denied to users having verified addresses outside the claimed neighborhood of the verified user.

Edge Computing with Low Latency

In one aspect, a flying vehicle includes: a cab with a flight control unit communicating with processors in the edge (ATC through edge computing); a propulsion unit having a rotating blade and an engine to rotate the blade; a rail from a cab top extending toward one external side of the cab, the cab having a moveable actuator coupled to the propulsion unit to move the propulsion unit between a first position above the cab during lift-off and a second position during lateral (forward or backward) flight.

Implementations may include one or more of the following. The ATC 89 preferably uses edge computing, preferably a low latency high speed network such as ultrawideband network, WiMAx, or 5G/6G networks. For example, an edge computing "Intelligent Edge Network," or iEN runs on an internal cloud network with virtualized network functions that are managed by a virtual infrastructure manager. Multi-access edge computing software run on servers in one of the operator's C-RAN hubs with AI-powered object recognition software. The latency speeds obtained through the company's edge computing can be from 15-5 ms. The system remotely send the right software to the correct C-RAN or SAP computing location to provide a localized service. The only way to reduce latency speeds is to ensure that computing requests are crunched geographically close to the user and removing remote hops is the key to lowering network latency.

In yet another aspect, a system includes a cellular transceiver to communicate with a predetermined target; one or more antennas coupled to the 5G transceiver each electrically or mechanically steerable to the predetermined target; a processor to control a directionality of the one or more antennas in communication with the predetermined target; and an edge processing module coupled to the processor and the one or more antennas to provide low-latency computation for the predetermined target.

Implementations can include one or more of the following. The processor calibrates a radio link between a transceiver in the housing and a client device. The processor is coupled to fiber optics cable to communicate with a cloud-based radio access network (RAN) or a remote RAN. The processor calibrates a connection by analyzing RSSI and TSSI and moves the antennas until predetermined cellular parameters are reached. The edge processing module comprises at least a processor, a graphical processing unit (GPU), a neural network, a statistical engine, or a programmable logic device (PLD). The edge processing module is embedded in the antenna housing. The edge processing module can be a pole, a building, or a light. The cellular transceiver can be a 5G transceiver. The processor coordinates beam sweeping by the one or more antennas with radio nodes or user equipment (UE) devices based upon service level agreement, performance requirement, traffic distribution data, networking requirements or prior beam sweeping history. The beam sweeping is directed at a group of autonomous vehicles or a group of virtual reality devices. A neural network coupled to a control plane, a management plane, and a data plane to optimize 5G parameters. One or more cameras and sensors in the housing to capture security information. Edge sensors mounted on the housing of the antenna can include LIDAR and RADAR. A camera can perform individual identity identification. The edge processing module streams data to the predetermined target to minimize loading the target. The edge processing module shares workload with a core processing module located at a head-end and a cloud module located at a cloud data center, each processing module having increased latency and each having a processor, a graphical processing unit (GPU), a neural network, a statistical engine, or a programmable logic device (PLD). An edge learning machine in the housing to provide local edge processing for Internet-of-Things (IOT) sensors with reduced off-chip memory access. The edge learning machine uses pre-trained models and modifies the pre-trained models for a selected task. A cellular device for a person crossing a street near a city light or street light can emit a person to vehicle (P2V) or a vehicle to person (V2P) safety message. A cloud trained neural network whose network parameters are down-sampled and filter count reduced before transferring to the edge neural network.

In yet another aspect, a system includes: a cellular transceiver to communicate with a predetermined target including a flying vehicle; one or more antennas coupled to the 5G transceiver each electrically or mechanically steerable to the predetermined target; a processor to control a directionality of the one or more antennas in communication with the predetermined target; and an edge processing module coupled to the processor and the one or more antennas to provide low-latency computation for the predetermined target.

Implementations may include one or more of the following. The processor calibrates a radio link between a transceiver in the housing and a client device. The processor is coupled to fiber optics cable to communicate with a cloud-based radio access network (RAN) or a remote RAN. The processor calibrates a connection by analyzing RSSI and TSSI and moves the antennas until predetermined cellular parameters are reached. The edge processing module comprises at least a processor, a graphical processing unit (GPU), a neural network, a statistical engine, or a programmable logic device (PLD). The edge processing module and the antenna comprise one unit. The unit comprises a pole, a building, or a light. The cellular transceiver comprises a 5G transceiver. The processor coordinates beam sweeping by the one or more antennas with radio nodes or user equipment (UE) devices based upon service level agreement, performance requirement, traffic distribution data, networking requirements or prior beam sweeping history. The beam sweeping is directed at a group of autonomous vehicles or a group of virtual reality devices. A neural network coupled to a control plane, a management plane, and a data plane to optimize 5G parameters. One or more cameras and sensors in the housing can capture security information. Ege sensors including LIDAR and RADAR. The edge processing module streams data to the predetermined target to minimize loading the target. The edge processing module shares workload with a core processing module located at a head-end and a cloud module located at a cloud data center, each processing module having increased latency and each having a processor, a graphical processing unit (GPU), a neural network, a statistical engine, or a programmable logic device (PLD).

Beam Sweeping with Low Latency

In one aspect, a system includes a cellular transceiver to communicate with a predetermined target including a flying vehicle; one or more antennas coupled to the 5G transceiver each electrically steerable to the predetermined target; and a processor to generate an antenna beam sweeping command based upon traffic distribution data, device networking requirements or a prior beam sweeping history to focus at least one beam for communication with the predetermined target.

In another aspect, a flying vehicle includes: a cab with an optional passenger seat with optional steering control; a propulsion unit having a rotating blade and an engine to rotate the blade; a rail from a cab top extending toward one external side of the cab, the cab having a moveable actuator coupled to the propulsion unit to move the propulsion unit between a first position above the cab during lift-off and a second position during lateral (forward or backward) flight.

Implementations can include one or more of the following. The traffic distribution data may be generated by collecting traffic data from radio nodes and/or UE devices, or the networking requirements may include, for example, service requirements associated with one or more applications (vehicular or reality application) on one or more UE devices. The processor calibrates a radio link between a transceiver in the housing and a client device. The processor is coupled to fiber optics cable to communicate with a cloud-based radio access network (RAN) or a remote RAN. The processor calibrates a connection by analyzing RSSI and TSSI and moves the antennas until predetermined cellular parameters are reached. The cellular transceiver can be a 5G transceiver. The processor coordinates beam sweeping by the one or more antennas with radio nodes or user equipment (UE) devices based upon service level agreement, performance requirement, traffic distribution data, networking requirements or prior beam sweeping history. The beam sweeping is directed at a group of autonomous vehicles or a group of virtual reality devices. A neural network (NN) can be used to determine the beam sweeping. The NN can be connected to a control plane, a management plane, and a data plane to optimize 5G parameters. One or more cameras and sensors in the housing can capture security information. Edge sensors mounted on the housing of the antenna can include LIDAR and RADAR and such data can be sent at top priority to vehicles passing by. A camera can perform individual identity identification. The edge processing module streams data to the predetermined target to minimize loading the target. The edge processing module shares workload with a core processing module located at a head-end and a cloud module located at a cloud data center, each processing module having increased latency and each having a processor, a graphical processing unit (GPU), a neural network, a statistical engine, or a programmable logic device (PLD). An edge learning machine in the housing to provide local edge processing for Internet-of-Things (IOT) sensors with reduced off-chip memory access. The edge learning machine uses pre-trained models and modifies the pre-trained models for a selected task. A cellular device for a person crossing a street near a city light or street light can emit a person to vehicle (P2V) or a vehicle to person (V2P) safety message. A cloud trained neural network whose network parameters are down-sampled and filter count reduced before transferring to the edge neural network. An edge processing module can be connected to the processor and the one or more antennas to provide low-latency computation for the predetermined target. The edge processing module can be at least a processor, a graphical processing unit (GPU), a neural network, a statistical engine, or a programmable logic device (PLD). The edge processing module is embedded in the antenna housing. The edge processing module can be part of a pole, a building, or a light. The processor can run code including requesting a portion of a network for a group of devices, checking for available resources to satisfy the request and assigning a network slice deployment layout satisfying the requested portion of the network including antenna level layout, and managing resources at the antenna level as part of the requested portion of the network to provide communication for the group. The request can be for enhanced services for autonomous vehicles. The request can be for reality applications such as virtual reality or augmented reality. Upon request, the system determines a candidate network slice deployment layout that satisfies the network level requirements and network layouts of a service request and costs associated with a candidate network resource and/or a candidate network slice deployment layout, which is used as a basis to optimally use available network resources. The system coordinates, authorizes, releases and/or engages network resources in network. The system obtains network slice deployment layout descriptors corresponding to a network slice deployment layout and the system may manage the provisioning of the network slice deployment layout to satisfy the service request. The system may perform various functions such as, for example, network slice life cycle management, configuration management (e.g., policies, isolation of management), performance management (e.g., service level agreement (SLA) management, service assurance and programmability), service mapping. The system updates in real time network resource device regarding availability of network resources based on the current state of network resources in network and provisioned network resources that support service requests. The system can respond to the request with a monetary cost associated with a candidate network slice deployment layout, quality-of-service values associated with the candidate network slice deployment layout (e.g., minimum value and/or maximum value pertaining to latency, bandwidth, reliability, etc.) and/or other information representative of the configuration and/or service such as virtual network resource, non-virtual network resource, cloud, 5G RAN access, for example. The method includes storing network resource and capability information pertaining to network resources of a network and generating network level requirement information that would support the network service. The method includes creating end-to-end network slice deployment information that includes parameters to provision an end-to-end network slice deployment layout in the network that supports the network service.

Network Slicing for Groups of Devices

In one aspect, a flying vehicle is part of a vehicular network, the vehicle having a cab with a flight control system that communicates through dedicated private wireless services aside only for members of the vehicular network; a propulsion unit having a rotating blade and an engine to rotate the blade; a rail from a cab top extending toward one external side of the cab, the cab having a moveable actuator coupled to the propulsion unit to move the propulsion unit between a first position above the cab during lift-off and a second position during lateral (forward or backward) flight.

A method to manage a cellular network includes requesting a portion of a network for a group of flying vehicles, checking for available resources to satisfy the request and assigning a network slice deployment layout satisfying the requested portion of the network including antenna level layout, and managing resources at the antenna level as part of the requested portion of the network to provide communication for the group.

In one implementation, the request can be for enhanced services for autonomous vehicles. The request can be for reality applications such as virtual reality or augmented reality. Upon request, the system determines a candidate network slice deployment layout that satisfies the network level requirements and network layouts of a service request and costs associated with a candidate network resource and/or a candidate network slice deployment layout, which is used as a basis to optimally use available network resources. The system coordinates, authorizes, releases and/or engages network resources in network. The system obtains network slice deployment layout descriptors corresponding to a network slice deployment layout and the system may manage the provisioning of the network slice deployment layout to satisfy the service request. The system may perform various functions such as, for example, network slice life cycle management, configuration management (e.g., policies, isolation of management), performance management (e.g., service level agreement (SLA) management, service assurance and programmability), service mapping. The system updates in real time network resource device regarding availability of network resources based on the current state of network resources in network and provisioned network resources that support service requests. The system can respond to the request with a monetary cost associated with a candidate network slice deployment layout, quality-of-service values associated with the candidate network slice deployment layout (e.g., minimum value and/or maximum value pertaining to latency, bandwidth, reliability, etc.) and/or other information representative of the configuration and/or service such as virtual network resource, non-virtual network resource, cloud, 5G RAN access, for example. The method includes storing network resource and capability information pertaining to network resources of a network and generating network level requirement information that would support the network service. The method includes creating end-to-end network slice deployment information that includes parameters to provision an end-to-end network slice deployment layout in the network that supports the network service.

Learning System Plane

In one aspect, a flying vehicle includes: a cab; a propulsion unit having a rotating blade and an engine to rotate the blade; and a 5G network with a neural network to optimize computation and transmission.

In another aspect, a system to optimize data flow in a 5G network, includes a neural network plane; a control plane coupled to the neural network plane; a management plane coupled to the neural network plane; a data plane coupled to the neural network plane, wherein the neural network plane receives cellular network statistics from the data plane for training, and during run-time, the neural network provides operating parameters to the data, control and management planes; and one or more operations sending resource request to the neural network plane for autonomous air vehicle control.

Implementations of the system may include one or more of the following: A moveable surface; and one or more antennas mounted on the moveable surface to change a direction of the antenna to a predetermined target. A pneumatic actuator or electrical motor can be placed under processor control to change the curvature of the lens and to change the directionality of the antenna. The processor can calibrate the RF link between the tower and the client device. The processor can calibrate the connection by examining the RSSI and TSSI and scan the moveable surface until the optimal RSSI/TSSI levels (or other cellular parameters) are reached. The scanning of the target device can be done by moving the actuators up or down. Opposing actuator arrays can be formed to provide two-sided communication antennas. An array of actuators can be used (similar to bee eyes), each antenna is independently steerable to optimize 5G transmission. Fresnel lens can be used to improve SNR. Focus the antenna on BS and UE, and then combine antennas for orthogonal transmissions based on various factors. The focusing of the actuators can be automatically done using processor with iterative changes in the orientation of the antenna by changing the actuators until predetermined criteria is achieved such as the best transmission speed, TSSI, RSSI, SNR, among others. This is similar to the way human vision eyeglass correction is done.

Figure 6:
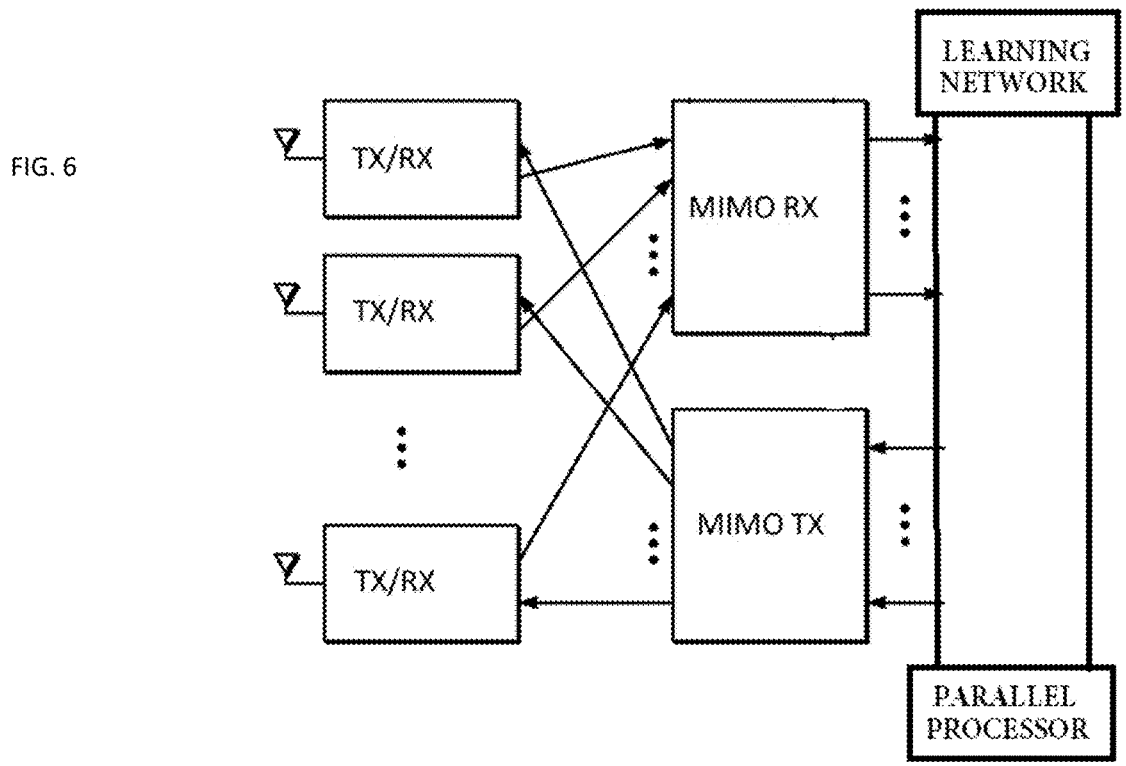
FIG. 6 shows an exemplary edge processing system communicating over UWB transceivers.

FIG. 6 shows an exemplary simplified massive MIMO system with antenna ports for user streams associated with flight control. Each user stream is a spatial stream of data. Each spatial stream that may include data from multiple users that are allocated different frequencies within the same spatial stream, in some embodiments. Further, a given user may be allocated multiple spatial streams, in some embodiments. Therefore, the number of users communicating with the system may or may not correspond to the number of antenna ports. In some embodiments, MIMO RX is configured to perform the functionality of channel estimator, MIMO detector, link quality evaluator, etc. In some embodiments, MIMO TX is configured to perform MIMO precoder.

During operation, a base station selects a number of antennas from among a plurality of available antennas for use in MIMO wireless communications. For example, the system may include 128 antennas but the base station may select to use only 64 antennas during a given time interval based on current operating conditions. The decision of how many antennas to use may be based on user input, a number of users currently in a cell, wireless signal conditions, bandwidth of current communications, desired testing conditions, etc. The base station may select different numbers of antennas at different times, e.g., a larger number during peak communications intervals and a smaller number during trough intervals. The base station determines a number of processing elements for processing received signals from the selected number of antennas. In the illustrated embodiment, this is based on the number of antennas selected and one or more threshold throughput values. In some embodiments, this determination may be based on any of various appropriate parameters in addition to and/or in place of the parameters, including without limitation: the processing capacity of each processing element, the amount of data per sample or entry for various information, a sampling rate, the number of spatial streams, number of users, etc. Determining the number of processing elements may include determining a number of parallel receive chains for MIMO RX. In some embodiments, each receive chain includes a configurable MIMO core and a configurable linear decoder. The base station processes incoming wireless communications using the determined number of processing elements. This may include applying a MIMO signal estimation techniques such as MMSE, ZF, or MRC and decoding received data streams. After processing, the decoded data from the determined number of processing elements may be reformatted and routed and transmitted to appropriate destinations (e.g., via another network such as a carrier network, the Internet, etc.). In some embodiments, the base station dynamically switches between different MIMO signal estimation techniques, e.g., based on user input, operating conditions, or any of various appropriate parameters.

The neural network control of the MIMO system may, in some embodiments, facilitate testing of MIMO base stations, reduce power consumption during MIMO communications, allow for flexibility in capacity, allow for flexibility in MIMO signal estimation, allow routing around defective processing elements or antennas, etc. In some embodiments, the base station may also be dynamically or statically customized for a wide variety of operating conditions and/or research needs and may be configured for real-time processing.

FIG. 7A shows an exemplary 5G control system that uses learning machines or neural networks to improve performance. The neural network plane provides automated intelligence to select the best operations given particular mobile device or wireless client needs. By enabling both client and infrastructure intelligence, the 5G networked system could reason about the deficiencies it suffers from, and improve its reliability, performance and security. By pushing more network knowledge and functions to the end host, the 5G clients could play more active roles in improving the user-experienced reliability, performance and security. The neural plane sits above the data plane, control plane and management plane. The Control Plane makes decisions about how to set up the antenna settings and where traffic is sent. Control plane packets are destined to or locally originated by the router itself. The control plane functions include the system configuration, management, and exchange of routing table information. The route controller exchanges the topology information with other routers and constructs a routing table based on a routing protocol, for example, RIP, OSPF or BGP. Control plane packets are processed by the router to update the routing table information. It is the signaling of the network. Since the control functions are not performed on each arriving individual packet, they do not have a strict speed constraint and are less time-critical. The Data Plane or Forwarding Plane Forwards traffic to the next hop along the path to the selected destination network according to control plane logic. Data plane packets go through the router. The routers/switches use what the control plane built to dispose of incoming and outgoing frames and packets. The management plane configures, monitors, and provides management, monitoring and configuration services to, all layers of the network stack and other parts of the system. It should be distinguished from the control plane, which is primarily concerned with routing table and forwarding information base computation.

On the client side, the system collect runtime, fine-grained information (protocol states, parameters, operation logic, etc.) from full-stack cellular protocols (physical/link layer, radio resource control, mobility management, data session management) inside the 5G device or phone, and such information is provided to the neural network plane. One embodiment extracts cellular operations from signaling messages between the device and the network. These control-plane messages regulate essential utility functions of radio access, mobility management, security, data/voice service quality, to name a few. Given these messages, it further enables in-device analytics for cellular protocols. The system infers runtime protocol state machines and dynamics on the device side, but also infer protocol operation logic (e.g., handoff policy from the carrier) from the network. The system collects raw cellular logs from the cellular interface to the device user-space at runtime, and then parses them into protocol messages and extracts their carried information elements. The parsed messages are then fed to the analyzer which aims to unveil protocol dynamics and operation logics. Based on the observed messages and the anticipated behavior model (from cellular domain knowledge), the analyzer infers protocol states, triggering conditions for state transitions, and protocol's taken actions. Moreover, it infers certain protocol operation logic (e.g., handoff) that uses operator-defined policies and configurations. It offers built-in abstraction per protocol and allows for customize these analyzers. On the management plane, the system captures full-stack network information on all-layer operations (from physical to data session layer) over time and in space. This is achieved by crowdsourcing massive network data from mobile devices temporally and spatially. An instability analyzer reports base station stability and reachability to avoid getting stuck in a suboptimal network. The instability analyzer models the decision logic and feeds this model with real configurations collected directly from the device and indirectly from the serving cell, as well as dynamic environment settings created for various scenarios. For example, antenna parameters (pointing direction, frequency, and RSSI/TSSI and channel) are captured to identify optimal settings for a particular device/client. The system can model cellular protocols is derived from the 5G standards for each protocol. This works particularly well for non-moving client devices such as 5G modems/routers and mobile phones that operate within a house or office most of the time, for example. When the mobile device is on the move, population data can be used to optimize antenna and communication parameters to derive the optimal connection for the device or client. For example, the neural network layer can identify clients using the Ultra Reliable Low Latency Communications specification (such as full car automation, factory automation, and remote-controlled surgery where reliability and responsiveness are mandatory) and control the 5G network to respond to URLLC requests by delivering data so quickly and reliably that responsiveness will be imperceptibly fast by selecting appropriate antenna parameters and settings for URLLC from the tower to the client device.

In addition to the neural network plane, the logical function architecture includes a data plane, a control plane, and a management plane. The control plane includes a software defined topology (SDT) logical entity configured to establish a virtual data-plane logical topology for a service, a software defined resource allocation (SDRA) logical entity configured to map the virtual data-plane topology to a physical data-plane for transporting service-related traffic over the wireless network, and a software defined per-service customized data plane process (SDP) logical entity configured to select transport protocol(s) for transporting the service-related traffic over a physical data-plane of the wireless network. The management plane may include entities for performing various management related tasks. For example, the management plane may include an infrastructure management entity adapted to manage spectrum sharing between different radio access networks (RANs) and/or different wireless networks, e.g., wireless networks maintained by different operators. The management plane may also include one or more of a data and analytics entity, a customer service management entity, a connectivity management entity, and a content service management entity, which are described in greater detail below.

The neural network plane works with network functions virtualization (NFV) to design, deploy, and manage networking services. It is a complementary approach to software-defined networking (SDN) for network management. While SDN separates the control and forwarding planes to offer a centralized view of the network, NFV primarily focuses on optimizing the network services themselves. The neural network plane automates the optimization level to the next automation and efficiency.

A virtual service specific serving gateway (v-s-SGW) can be done. The v-s-SGW is assigned specifically to a service being provided by a group of wirelessly enabled devices, and is responsible for aggregating service-related traffic communicated by the group of wirelessly enabled devices. In an embodiment, the v-s-SGW provides access protection for the service-related traffic by encrypting/decrypting data communicated over bearer channels extending between the v-s-SGW and the wirelessly-enabled devices. The v-s-SGW may also provide a layer two (L2) anchor point between the group of wirelessly-enabled devices. For example, the v-s-SGW may provide convergence between the different wireless communication protocols used by the wirelessly-enabled devices, as well as between different wireless networks and/or RANs being access by the wirelessly-enabled devices. Additionally, the v-s-SGW may perform at least some application layer processing for the service related traffic communicated by the wirelessly-enabled devices. Aspects of this disclosure further provide an embodiment device naming structure. For the v-s-SGW. Specifically, a v-s-SGW initiated on a network device is assigned a local v-u-SGW ID. Outgoing packets from the v-u-SGW ID include the local v-u-SGW ID and a host ID of the network device. Accordingly, recipients of those outgoing packets can learn the local v-u-SGW ID and the host ID associated with a particular v-s-SGW, and thereafter send packets to the v-s-SGW by including the local v-u-SGW ID and the host ID in the packet header.

Location tracking as a service (LTaaS) can be provided. The LTaaS feature may track locations of user equipment (UEs) via a device location tracking as a service (LTaaS) layer such that the locations of UEs are dynamically updated in a LTaaS layer as the UEs move to different locations in the wireless networks. In some embodiments, the LTaaS layer consists of a centralized control center. In other embodiments, the LTaaS layer consists of a set of distributed control centers positioned in the wireless network, e.g., an application installed on a network device, such as a gateway or AP. In yet other embodiments, the LTaaS layer comprises both a central controller center and regional control centers. In such embodiments, the central control center may be updated periodically by the regional control centers, which may monitor UE movement in their respective wireless networks. In embodiments, the LTaaS layer may monitor general locations of the UEs. For example, the LTaaS layer may associate the UE's location with a network device in a specific wireless network, e.g., an access point, a serving gateway (SGW), etc.

Content may be cached in network devices of wireless network or radio access network (RAN) in anticipation that a mobile device or user will want to access the content in the future. In some embodiments, a content forwarding service manager (CFM) may select content to be pushed to a caching location in the wireless network based on the popularity of available content stored in one or more application servers. The network device may comprise a virtual information-centric networking (ICN) server of an ICN virtual network (VN), and may be adapted to provide the cached content to a virtual user-specific serving gateway (v-u-SGW) of the served user equipment (UE) upon request. Notably, the cached content is stored by the network device in an information-centric networking (ICN) format, and the v-u-SGW may translate the cached content from the ICN format to a user-specific format upon receiving the cached content pursuant to a content request. The v-u-SGW may then relay the cached content having the user-specific format to a served UE. After the content is pushed to the network device, the content forwarding service manager (CFM) may update a content cache table to indicate that the content has been cached at the network device. The content cache table may associate a name of the content with a network address of the network device or the virtual IVN server included in the network device. The ICN VN may be transparent to the served UE, and may be operated by one of the wireless network operators or a third party. These and other aspects are described in greater detail below.

The management plane 310 may include entities for performing various management related tasks. In this example, the management plane 330 includes a data and analytics entity 311, an infrastructure management entity 312, customer service management entity 313, a connectivity management entity 314, and a content service management entity 315. The data and analytics entity 311 is configured to provide data analytics as a service (DAaaS). This may include manage on-demand network status analytics and on-demand service QoE status analytics for a particular service, and providing a data analytics summary to a client. The infrastructure management entity 312 may manage spectrum sharing between different radio access network (RANs) in a wireless network, or between wireless networks maintained by different operators. This may include wireless network integration, management of RAN backhaul and access link resources, coordination of spectrum sharing among co-located wireless networks, access management, air interface management, and device access naming and network node naming responsibilities.

The customer service management entity 313 may provide customer service functions, including managing customer context information, service-specific quality of experience (QoE) monitoring, and charging responsibilities. The connectivity management entity 314 may provide location tracking as a service (LTaaS) over the data plane of the wireless network. The connectivity management entity 314 may also have other responsibilities, such as establishing customized and scenario aware location tracking scheme, establishing software defined and virtual per-mobile user geographic location tracking schemes, and triggering user specific data plane topology updates. The content service management entity 315 may manage content caching in the wireless network. This may include selecting content to be cached in RAN, selecting caching locations, configuring cache capable network nodes, and managing content forwarding. In some embodiments, the management plane may also include a security management entity that is responsible for network access security (e.g., service-specific security, customer device network access protection, etc.), as well as inter-domain and intra-domain wireless network security.

The control plane 320 may include entities for performing various control related tasks. In this example, the control plane includes a software defined topology (SDT) logical entity 322, a software defined resource allocation (SDRA) logical entity 324, and a software defined per-service customized data plane process (SDP) logical entity 326. The SDT entity 322, the SDRA logical entity 324, and the SDP logical entity 326 may collectively configure a service-specific data plane for carrying service-related traffic. More specifically, the software defined topology (SDT) logical entity 322 is configured to establish a virtual data-plane logical topology for a service. This may include selecting network devices to provide the service from a collection of network devices forming the data plane 330. The software defined resource allocation (SDRA) logical entity 324 is configured to map the virtual data-plane topology to a physical data-plane for transporting service-related traffic over the wireless network. This may include mapping logical links of the virtual data-plane topology to physical paths of the data plane. The software defined per-service customized data plane process (SDP) logical entity 326 is configured to select transport protocol(s) for transporting the service-related traffic over a physical data-plane of the wireless network. The transport protocols may be selected based on various criteria. In one example, the SDP logical entity selects the transport protocol based on a characteristic of the service-related traffic, e.g., business characteristics, payload volume, quality of service (QoS) requirement, etc. In another example, the SDP logical entity selects the transport protocol based on a condition on the network, e.g., loading on the data paths, etc.

The SDT entity 322, the SDRA logical entity 324, and the SDP logical entity 326 communicate with the neural network plane to optimize the system configuration (including antenna pointing/setting/redundancy assignment, among others), and they may also have other responsibilities beyond their respective roles in establishing a service-specific data plane. For example, the SDT entity 322 may dynamically define key functionality for v-s-SGWs/v-u-SGWs, as well as enable mobile VN migration and provide mobility management services. As another example, the SDRA logical entity 324 may embed virtual network sessions, as well as provide radio transmission coordination. One or both of the SDT entity 322 and the SDRA logical entity 324 may provide policy and charging rule function (PCRF) services.

The SDT entity 322, the SDRA logical entity 324, and the SDP logical entity 326 may collectively configure a service-specific data plane for carrying service-related traffic. Specifically, the SDT entity 322 establishes a virtual data-plane logical topology for the service, the SDRA logical entity 324 maps the virtual data-plane topology to a physical data-plane path for transporting service-related traffic over the wireless network, and the SDP logical entity 326 select transport protocol(s) for transporting the service-related traffic over the physical data-plane.

In one example, the neural network can automatically allocate functions in a mobile network based at least in part on utilization levels. For example, various components of the 5G network can include, but are not limited to, a network exposure function (NEF), a network resource function (NRF), an authentication server function (AUSF), an access and mobility management function (AMF), a policy control function (PCF), a session management function (SMF), a unified data management (UDM) function, a user plane function (UPF), and/or an application function (AF). For example, some or all of the functions discussed herein can provide utilization levels, capability information, locality information, etc., associated with the various functions to a network resource function (NRF) (or other component), for example, such that the NRF or other component can select a particular function of a plurality of possible components providing the same function based on the utilization levels of the particular component. Thus, the system, devices, and techniques broadly apply to selecting network functions, and is not limited to a particular context or function, as discussed herein.

The neural network plane improves the functioning of a network by taking a global management view to optimize the network by reducing network congestion, dropped packets, or dropped calls due to overutilization of resources. Further, the systems, devices, and techniques can reduce a size of components (e.g., processing capacity) by obviating or reducing any need to over-allocate resources to ensure spare capacity to reduce congestion. Further, selecting functions based on utilization levels can reduce signaling overhead associated with dynamically allocating a size of a virtual instance. In some instances, the architecture described herein facilitates scalability to allow for additional components to be added or removed while maintaining network performance. In some instances, optimal functions can be selected in connection with handovers (e.g., intracell or intercell) to balance a load on network functions to provide improved Quality of Service (QoS) for network communications. These and other improvements to the functioning of a computer and network are discussed herein.

In one example, the neural network plane interacts with a user equipment (UE), an access and mobility management function (AMF), a network resource function (NRF), a session management function (SMF), and a user plane function (UPF). The UE can transmit a registration request to the AMF. At a same or different time as the registration request, the UPF can transmit utilization information to the NRF, which in turn communicates with the neural network plane. In some instances, the utilization information can include information including, but not limited to: CPU utilization level; memory utilization level; active or reserved bandwidth; a number of active sessions; a number of allowable sessions; historical usage; instantaneous usage; dropped packets; packet queue size; delay; Quality of Service (QoS) level, antenna efficiency, antenna setting; and the like. Further, the utilization information can include a status of the UPF (e.g., online, offline, schedule for maintenance, etc.). In some instances, the UPF can transmit the utilization info at any regular or irregular interval. In some instances, the UPF can transmit the utilization info in response to a request from the NRF, and/or in response to a change in one or more utilization levels above or below a threshold value.

Next, the UE can transmit a session request to the AMF, which in turn can transmit the session request to the SMF. In some instances, the session request can include a request to initiate a voice communication, a video communication, a data communication, and the like, by and between the UE and other services or devices in the network. The SMF in turn talks to the neural network plane for management. Based on its learned optimization, the neural network plane communicates instructions to the SMF. At least partially in response to receiving command from the neural network plane, the SMF can transmit a UPF query to the NRF. In some instances, the UPF query can include information including, but not limited to: a type of session requested by the UE (e.g., voice, video, bandwidth, emergency, etc.); services requested by the UE; a location of the UE; a location of a destination of the session requested by the UE; a request for a single UPF or a plurality of UPFs; and the like.

In some instances, at least partially in response to receiving the UPF query, the NRF can provide a UPF response to the SMF. In some instances, the UPF response can include one or more identifiers associated with one or more UPFs that are available to provide services to the UE. In some instances, the UPF response can be based at least in part on the session request and/or on the utilization info received from the UPF (as well as other UPFs, as discussed herein).

Based at least in part on the UPF response, the SMF can select a UPF (e.g., in a case where a plurality of UPF identifiers are provided to the SMF) or can utilize the UPF provided by the NRF for a communication session. The SMF can select a UPF and can transmit a UPF selection to the UPF that has been selected and/or designated to provide communications to the UE.

At least partially in response to the UPF selection, the UPF can provide services to the UE. As discussed herein, the UPF can facilitate data transfer to and/or from the UE to facilitate communications such as voice communications, video communications, data communications, etc. In this manner, the neural network plane incorporates intelligence in providing services to requests in a way that optimizes system hardware and software resources and overall cost.

Next, an example process is disclosed for selecting a network function, such as a user plane function, based on utilization information learned by the neural network. The example process can be performed by the neural network in conjunction with the network resource function (NRF) (or another component), in connection with other components discussed herein. First, the neural network receives utilization information associated with one or more network functions, such as one or more user planes. Although discussed in the context of a UPF, this process apply equally to other network functions, such as a network exposure function (NEF), a policy control function (PCF), a unified data management (UDM), an authentication server function (AUSF), an access and mobility management function (AMF), a session management function (SMF), an application function (AF), and the like. In one example, user planes in a network can transmit utilization information to the NRF. In some instances, the NRF can request utilization information from various UPFs (or any network function) on a regular schedule, upon receipt of a request to initiate a communication, and then forwarding such information to the neural network plane for training, for example. In some instances, the UPF (or any network function) can transmit utilization information upon determining that a utilization level has changed more than a threshold amount compared to a previous utilization level. In some instances, utilization information can include, but is not limited to, one or more of: CPU utilization (e.g., % utilization), bandwidth utilization, memory utilization, number of allowable sessions, number of active sessions, historical utilization information, expected utilization levels, latency, current QoS of active sessions, and the like. Further, in some instances, the neural network can receive capability information associated with the user plane(s) (or any network function), location information associated with the user plane(s) (or any network function), etc. Such utilization information, capability information, location information, etc. can be stored in a database accessible by the NRF.

Next, the process can include receiving a request for a network function, such as a user plane, the request associated with a user equipment. For example, a request can be received from a session management function (SMF) or an access and mobility management function (AMF) (or any network function) for a user plane (or any network function) to initiate a communication for a user equipment. In some instances, the request can indicate a number of user planes (or any network function) to be provided by the NRF (e.g., one or many). In some instances, the request can include information associated with the communication, such as a type of the communication, locations of the UE and/or the destination of the communication, specialized services (e.g., video encoding, encryption, etc.) requested in association with the communication, a bandwidth of the communication, a minimum QoS of the communication, and the like. In some instances, the request can be based at least in part on a request initiated by the UE and provided to the AMF, SMF, or any network function.

Operations by the neural network plane includes determining one or more network functions (e.g., user planes) based at least in part on the request and the utilization level. For example, the neural network plane can include determining that a first user plane (or any network function) is associated with a first utilization level (e.g., 80% CPU utilization) and a second user plane (or any network function) is associated with a second utilization level (e.g., 30% utilization level). Further the neural network can include determining that the first utilization level is above a utilization threshold (e.g., 70% or any value) such that addition assignments of UEs to the UPF (or any network function) may degrade the quality of connections associated with first UPF (or any network function). Accordingly, the neural network can determine that the first UPF (or any network function) is to be selected to provide data traffic for the UE.

As can be understood herein, there may be a variety of learning algorithms or ways to determine which user planes (or any network function) are to be selected as available for communication. In some instances, the neural network can include determining that the utilization level of the second user plane (or any network function) (e.g., 30%, discussed above) is lower than the utilization level of the first user plane (or any network function) (e.g., 80%, discussed above), and accordingly, can determine that the second user plane (or any network function) is to be selected for the communication.

The neural network determines a plurality of user planes (or any network function) that are available for a communication (e.g., that have a utilization level below a threshold value). In some instances, the user planes (or any network function) can be selected based on a proximity to the UE, capabilities requested by the UE, etc. In some instances, the operation 506 can include ranking or prioritizing individual ones of the plurality of user planes (or any network function) as most appropriate to be selected for the communication. The neural network then provides an identification of the one or more user planes (or any network function) to a session management function (SMF) (or any selecting network function) to facilitate a communication with the user equipment. For example, the operation by the neural network can include providing an address or other identifier corresponding to one or more UPFs (or any one or more network functions) to an SMF (or any selecting network function) in the network. In the case where one user plane (or any network function) is provided, the SMF (or any selecting network function) may utilize the explicit user plane (or any network function) identified by the NRF. In the case where more than one user plane (or any network function) is provided, the identification may include additional information to allow the SMF (or any selecting network function) to select a user plane (or any network function), as discussed herein.

In another example for selecting a user plane function based on utilization information during a handover performed by the neural network (or another component), in connection with other components discussed herein. As usual, the neural network has utilization information associated with one or more user planes which provide utilization information to NRF that in turn sends the info to the neural network layer. Upon receiving a request for a user plane, the neural network plane can include providing a first selection of at least one first user plane based at least in part on the request and utilization information. The operation can include the providing, allocating, and/or selecting at least one user plane based on utilization information to balance a load across a plurality of available user planes. In some instances, the operation 606 can include establishing a communication for the UE at a first radio access network (RAN) utilizing the first user plane. The neural network can receive an indication of a handover request. For example, as a UE moves about an environment, a signal quality can decrease between the UE and the first RAN. Accordingly, the neural network can automatically change antenna parameters first based on learned parameters, and if that does not change signal quality, the neural network can determine that a handover should occur, based on one or more of, but not limited to: signal strength of an anchor connection (e.g., a signal strength of the first RAN); signal strength of a target RAN (e.g., a signal strength of a second RAN); latency; UE speed/direction; traffic level(s); QoS; etc. In some instances, the neural network determines that a new user plane is required/desired based at least in part on the indication of the handover request. The neural network plane can provide a second selection of at least one second user plane based at least in part on the handover request and utilization information. For example, the at least one second user plane can include user planes suitable and available to facilitate a communication with the UE. In some instances, the above operations can be repeated as a UE moves about an environment (and/or in response to initiate a handover based on UPF maintenance, for example). That is, the operations can be repeated continuously or periodically to determine a user plane to facilitate a communication while balancing a load of the user planes.

The neural network plane can automatically configure the direction of antennas and combine antennas in a massive MIMO antenna by first focusing the antenna on the UE device (which optimizes the directionality of the wireless link between the BS and the UE), and then transmitting first pilot signals via each of multiple antennas of the UE; receiving antenna combining information from a base station (BS), the antenna combining information for combining the multiple antennas into one or more antenna groups and an orthogonal sequence allocated to each of the one or more antenna groups; and transmitting second pilot signals to the BS using the allocated orthogonal sequences, wherein the second pilot signals are used for estimating downlink channels from the BS to the UE, wherein the antenna combining information is determined based on correlation of each of the multiple antennas obtained from the first pilot signals, and wherein a same orthogonal sequence is applied to a second pilot signal transmitted via one or more of the multiple antennas belonging to a same antenna group. The neural network can send a preferred antenna combination that is sent to the BS based on one or more of the following: 1) minimize a correlation between effective channels of the one or more antenna groups, 2) an amount of data to be transmitted, 3) second pilot signals. The second pilot signals can be captured during different time periods than a time period during which a UE of belonging to a second UE group transmits the second pilot signals. The 1st pilot signal can be transmitted by the UE even after the UE configure the antenna combination. In this case, the base station may configure new antenna combination based on the previous antenna combination (mapping between one logical channel and another logical channel). Based on this, the base station may determine antenna combining information and transmit it to the UE and to make each of the logical (effective) channels become orthogonal to each other. The neural network plane monitors performance and can automatically reconfigure or modify antenna combination when the SINR of the received signals become poor over a predetermined period of time. Based on this request, the base station may receive the antenna combining information again and transmit it to the UE. The neural network plane may determine the antenna combining information to minimize the biggest correlation value between the effective channels. Or, it may determine to make the biggest correlation value between the effective channels less than a threshold value. By doing this, the base station may prevent the antenna groups from being aligned in the same direction. In another example, suppose there are 2 UEs (UE a and UE b) and that the UE a has lots of data to be transmitted/received while there are little for UE b. In this case, the neural network provides more effective channels to UE a while UE b gets fewer number of effective channels. In another example, the UE may determine the preferred antenna combining method based on the ACK/NACK of the received data. When the number of effective channels increases, the more diversity gain can be acquired. So, the UE of this example request more number of effective channels when the decoding results of the received data is NACK for certain number of time. Otherwise, the UE may request less number of effective channels. In still another example, the UE may determine the preferred antenna combining method based on the estimated channel information. The above preferred antenna combining methods of the UE can be controlled and granted by the network. The neural network may consider not only the UE transmitted this preferred antenna combining method, but other UEs within the cell.

In one implementation, FIG. 7B shows an exemplary learning machine to automatically adjust the position/aim of the antennas to optimize data transmission performance and/or coverage. As noted earlier, 4G systems have range but lack speed. 5G systems have speed but require more antennas and generally lack the range of 4G systems. To optimize performance, a learning machine is used to automatically track a mobile device and adjust the best arrangement for the antenna arrays. The process is as follows:

Collect performance data from subsystems (see above) such as: Spatial and Modulation Symbols, RSSI, TSSI, CSI (channel state information), and attributes on channel matrix and error vector magnitude, for example Extract features and train learning machine to optimize spectral efficiency and energy efficiency of the wireless system During live communication, extract features from live 5G data and select antenna orientation/setting/params based on client device, resources available, and tower network properties for optimum transmission.

FIG. 7C show exemplary learning machine details. While the learning machine optimizes all resources, details on the antenna are discussed next, with the expectation that other resource allocations. The learning machine turn the antenna arrays "smart" so that the best antenna linkage between transceivers is achieved. Further, when one of the antenna elements in the array fails, beamforming and beam steering performance of the array degrades gracefully. Such an objective is achieved by reconfiguring the array when an element is found to be defective, by either changing the material properties of the substrate or by applying appropriate loading in order to make the array functional again. One embodiment changes the excitation coefficient for each array element (magnitude and phase) to optimize for changes due to the environment surrounding an array antenna. Using learning machines, one can train the antenna array to change its elements' phase or excitation distribution in order to maintain a certain radiation pattern or to enhance its beam steering and nulling properties and solve the direction of arrival (DOA) as well.

The neural network control of the MIMO antennas provides significant gains that offer the ability to accommodate more users, at higher data rates, with better reliability, while consuming less power. Using neural network control of large number of antenna elements reduces power in a given channel by focusing the energy to targeted mobile users using precoding techniques. By directing the wireless energy to specific users, the power in channel is reduced and, at the same time, interference to other users is decreased.

In addition to controlling the 5G operation, the neural network can be used to provide local edge processing for IOT devices. A striking feature about neural networks is their enormous size. To reduce the size of the neural networks for edge learning while maintaining accuracy, the local neural network performs late down-sampling and filter count reduction, to get high performance at a low parameter count. Layers can be removed or added to optimize the parameter efficiency of the network. In certain embodiments, the system can prune neurons to save some space, and a 50% reduction in network size has been done while retaining 97% of the accuracy. Further, edge devices on the other hand can be designed to work on 8 bit values, or less. Reducing precision can significantly reduce the model size. For instance, reducing a 32 bit model to 8 bit model reduces model size. Since DRAM memory access is energy intensive and slow, one embodiment keeps a small set of register files (about 1 KB) to store local data that can be shared with 4 MACs as the leaning elements). Moreover, for video processing, frame image compression and sparsity in the graph and linear solver can be used to reduce the size of the local memory to avoid going to off chip DRAMs. For example, the linear solver can use a non-zero Hessian memory array with a Cholesky module as a linear solver.

In another embodiment, original full neural network can be trained in the cloud, and distillation is used for teaching smaller networks using a larger "teacher" network. Combined with transfer learning, this method can reduce model size without losing much accuracy. In one embodiment, the learning machine is supported by a GPU on a microprocessor, or to reconfigure the FPGA used as part of the baseband processing as neural network hardware.

It should also be appreciated that, while the antenna system of the present invention is primarily intended for 5G/6G systems, it can be used in space-borne communication applications, radar, as well as other terrestrial applications, or in any application requiring a large, lightweight, stowable antenna.

Contemplated Variations

Even though the present disclosure has depicted and described vehicles having a particular structural configuration, it should be understood by those skilled in the art that the vehicle 10 of the present disclosure may alternatively have other structural configurations.

Even though the present disclosure has depicted and described the vehicle as a VTOL cabin having distributed propulsion systems with independent propulsion assemblies on top and bottom of the vehicle, it should be understood by those skilled in the art that the vehicle can be an aircraft with distributed propulsion systems with independent propulsion assemblies attached to a frame using a combination of mid wing configuration, high wing configuration and/or low wing configuration.

Even though the present disclosure has depicted and described the vehicle with distributed propulsion systems with independent propulsion assemblies having blades of a uniform design, it should be understood by those skilled in the art that aircraft of the present disclosure may have distributed propulsion systems with independent propulsion assemblies having blades with different designs. The vehicle alternative can be an aircraft with a vertical takeoff and landing mode and a forward flight mode.

Even though the present disclosure uses blades, it is contemplated that prorotors can be used. A proprotor is a spinning airfoil that is used as both an airplane-style propeller and a helicopter-style rotor during the same flight. Proprotors are typically used on vertical takeoff and landing (VTOL) aircraft. Proprotor blades with different designs can be used. As described herein, significantly more thrust is required during vertical takeoff and landing as compared to forward flight. When maximum thrust is required during vertical takeoff and landing, all propulsion assemblies are operated with the larger proprotor blades with generally having greater lift efficiency and enabling operations with heavier payloads. When reduced thrust is required during forward flight, however, the larger propulsion assemblies could be shut down to conserve power with smaller propulsion assemblies operating to provide all the required thrust, thereby increasing aircraft endurance. As discussed herein, when large propulsion assemblies are shut down, the associated proprotor blades may passively fold or be feathered to reduce drag and further improve aircraft endurance. As an alternative or in addition to having proprotor blades of different length, proprotor blades of a distributed propulsion system of the present disclosure could also have different blade twist, different angles of attack in fixed pitch embodiments, different pitch types such as a combination of fixed pitch and variable pitch prorotor blades, different blade shapes and the like.

Even though the present disclosure has depicted and described a helicopter like design, the inventor contemplates that the vehicle can be aircraft having straight wings, and it should be understood by those skilled in the art that aircraft of the present disclosure may have wings having alternate designs. The wings can be polyhedral wings with wing member having anhedral sections and dihedral sections. The aircraft can have distributed propulsion systems with independent propulsion assemblies having proprotor with a uniform number of proprotor blades, but it should be understood by those skilled in the art that aircraft of the present disclosure may have distributed propulsion systems with independent propulsion assemblies having proprotors with different numbers of blades When smaller propulsion assemblies are shut down, the associated proprotor blades may passively fold or be feathered to reduce drag and improve aircraft endurance.

Advantages may include one or more of the following. The air vehicle can travel point to point and can save energy relative to a car because the air vehicle does not need to travel on roads which may zigzag along the way to account for obstacles such as mountains. Further, once in the air, it takes less energy to move forward in the air than on the road. Navigation is simplified due to reduced obstacles. The vehicle is a fresh start with all autonomous vehicles and the navigation system does not need to address legacy vehicles driven by less predictable humans. The system is also distributed to provide scalability to a level unheard of in aviation management, namely a control tower is local using either a lead vehicle designated as control tower, or a lead wireless station designated as the control tower, so that many more vehicles can be managed.

What is claimed is:

1. A transportation method for transporting a payload with one or more objects or people, comprising:
   providing a vehicle having a propulsion unit movably coupled to a frame enclosing the payload between a first position during lift-off and a second position during flight;
   determining a control gesture as captured by a plurality of cameras or sensors in the vehicle; and
   determining one or more vehicle control options based on a computer model, a current state of the vehicle and an environment of the vehicle.

2. The method of claim 1, comprising, based on LIDAR, radar, and camera images, generating with a processor performing image processing to create one or more 3D models for navigation purposes.

3. The method of claim 1, comprising crowd-sourcing 3D models and generating a high resolution 3D map of the environment.

4. The method of claim 1, comprising generating a multi-dimensional model of a vehicle operating in a 3D model of the environment.

5. The method of claim 1, comprising determining a hand control gesture as captured by a plurality of cameras or sensors in the vehicle.

6. The method of claim 1, wherein the propulsion unit is configured such that, with at least one surface oriented vertically, the propulsion unit is operable to maintain vehicle altitude and stability.

7. The method of claim 1, comprising determining vehicle control options based on the model, a current state of the vehicle and the environment of the vehicle; and controlling the vehicle to operate based on the model and the 3D model.

8. The method of claim 1, comprising a processor communicating with at least one communication tower (edge processor) or with another vehicle to receive sensor data and create a 3D model of the environment.

9. The method of claim 1, comprising providing one or more processors and one or more sensors located on one or more radio or cellular towers provide low latency edge processing capability, including machine learning processors to offload processing by the minimize cost of vehicle.

10. The method of claim 1, comprising slice processing a wireless network to provide dedicated wireless link for vehicular navigation and communication.

11. The method of claim 1, comprising attaining altitude with the propulsion unit, at least one surface elongate along a first axis, and a seat configured to support a pilot, the altitude attained using lift provided by thrust from the propulsion unit, at least one surface oriented vertically, and the seat facing a first direction.

12. The method of claim 1, comprising a cab connected to the propulsion unit and the at least one surface and rotatably connected to a seat such that the seat, while facing the first direction, rotates with respect to the first axis, the frame, and the at least one surface.

13. The method of claim 1, comprising controlling thrust from the propulsion unit to rotate the at least one surface and the frame about a first axis such that the at least one surface acquires a horizontal velocity in the first direction and generates vertical lift sufficient for the apparatus to transition, from maintaining altitude using lift from the propulsion unit, to maintain altitude using lift generated by the at least one surface.

14. The method of claim 1, comprising counter-rotating a seat with respect to a first axis and a cab to counter a rotation of the at least one surface and a cab and maintain the seat facing the first direction.

15. A transportation method, comprising:
    attaining altitude with a propulsion unit, at least one surface along a first axis, and a seat configured to support a pilot in a frame, the altitude attained using lift provided by thrust from the propulsion unit, with the seat facing a first direction, wherein the at least one surface rotates with respect to the first axis;
    controlling thrust from the propulsion unit to rotate the at least one surface and the frame about a first axis such that the at least one surface acquires a horizontal velocity in the first direction and generates vertical lift sufficient for the frame to transition, from maintaining altitude using lift from the propulsion unit, to maintaining altitude using lift generated by the at least one surface.

16. The method of claim 15, comprising determining a hand control gesture as captured by a plurality of cameras or sensors in the vehicle, wherein a sequence of finger, palm or hand movements represents a control request; and determining one or more control options based on a computer model, a current state of the frame and the environment of the frame.

17. A system, comprising:
    means for attaining altitude with a propulsion unit, at least one surface along a first axis, and a seat configured to support a pilot in a frame, the altitude attained using lift provided by thrust from the propulsion unit, with the seat facing a first direction, wherein the at least one surface rotates with respect to the first axis;
    means for controlling thrust from the propulsion unit to rotate the at least one surface and the frame about a first axis such that the at least one surface acquires a horizontal velocity in the first direction and generates vertical lift sufficient for the frame to transition, from maintaining altitude using lift from the propulsion unit, to maintaining altitude using lift generated by the at least one surface.

18. The method of claim 17, comprising determining a hand control gesture as captured by a plurality of cameras or sensors in the vehicle, wherein a sequence of finger, palm or hand movements represents a control request; and determining one or more control options based on a computer model, a current state of the frame and the environment of the frame.

19. A system, comprising:
    an air propulsion unit coupled to a cab and at least one surface along a first axis the cab including a seat configured to support a pilot in a frame, the altitude attained using lift provided by thrust from the propulsion unit, at least one surface oriented vertically, and the seat facing a first direction, the propulsion unit coupled to the frame and the at least one surface and rotatably coupled to the seat such that the seat, while facing the first direction, rotates with respect to the first axis, the frame, and the at least one surface;

a processor to control thrust from the propulsion unit to rotate the at least one surface and the frame about a first axis such that the at least one surface acquires a horizontal velocity in the first direction and generates vertical lift sufficient for the frame to transition, from maintaining altitude using lift from the propulsion unit, to maintaining altitude using lift generated by the at least one surface.

20. The method of claim 19, comprising determining one or more vehicle control options based on a computer model, a current state of the frame and an environment surrounding the frame.

\* \* \* \* \*